(12) United States Patent
Jiang et al.

(10) Patent No.: US 12,425,583 B2
(45) Date of Patent: Sep. 23, 2025

(54) SYSTEMS AND METHODS FOR PREDICTING CODING UNITS IN IMAGES

(71) Applicant: ZHEJIANG DAHUA TECHNOLOGY CO., LTD., Zhejiang (CN)

(72) Inventors: Dong Jiang, Hangzhou (CN); Jucai Lin, Hangzhou (CN); Jun Yin, Hangzhou (CN); Feiyang Zeng, Hangzhou (CN); Cheng Fang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 490 days.

(21) Appl. No.: 17/645,982

(22) Filed: Dec. 25, 2021

(65) Prior Publication Data

US 2022/0124326 A1   Apr. 21, 2022

Related U.S. Application Data

(63) Continuation of application No. PCT/CN2020/094832, filed on Jun. 8, 2020.

(30) Foreign Application Priority Data

Jun. 25, 2019  (CN) .......................... 201910555585.6
Jun. 25, 2019  (CN) .......................... 201910555597.9
(Continued)

(51) Int. Cl.
*H04N 19/117*   (2014.01)
*H04N 19/105*   (2014.01)
(Continued)

(52) U.S. Cl.
CPC ......... *H04N 19/117* (2014.11); *H04N 19/105* (2014.11); *H04N 19/159* (2014.11);
(Continued)

(58) Field of Classification Search
None
See application file for complete search history.

(56) References Cited

U.S. PATENT DOCUMENTS 11,445,216 B2 *   9/2022   Yoo ....................... H04N 19/117
11,770,548 B2 *   9/2023   Jiang ...................... H04N 19/11
                                                              375/240.02
(Continued)

FOREIGN PATENT DOCUMENTS

CA   3115194 A1 *   4/2020   .......... H04N 19/105
CN   102740077 A    10/2012
(Continued)

OTHER PUBLICATIONS

STIC provided Machine Translation in English of WO2018/026219 A1 relied upon in the Rejection (Year: 2018).*
(Continued)

*Primary Examiner* — Tyler W. Sullivan
(74) *Attorney, Agent, or Firm* — METIS IP LLC

(57) ABSTRACT

An image coding system is provided. The system may determine a coding unit in an image and divide the coding unit into a plurality of coding sub-units. For at least one coding sub-unit of the plurality of coding sub-units, the system may determine multiple reference lines of the at least one coding sub-unit. The system may determine a target prediction mode associated with one of the at least one coding sub-unit. The system may determine a predicted coding sub-unit corresponding to the one of the at least one coding sub-unit based on the target prediction mode and the multiple reference lines of the at least one coding sub-unit.

(Continued)

The system may determine a predicted coding unit corresponding to the coding unit based at least in part on the predicted coding sub-unit.

16 Claims, 16 Drawing Sheets

(30) Foreign Application Priority Data

Jun. 25, 2019 (CN) .......................... 201910555628.0
Jun. 25, 2019 (CN) .......................... 201910556707.3

(51) Int. Cl.
  *H04N 19/159* (2014.01)
  *H04N 19/176* (2014.01)
  *H04N 19/182* (2014.01)
  *H04N 19/82* (2014.01)

(52) U.S. Cl.
  CPC ......... *H04N 19/176* (2014.11); *H04N 19/182* (2014.11); *H04N 19/82* (2014.11)

(56) References Cited

U.S. PATENT DOCUMENTS

| | | | |
|---|---|---|---|
| 2011/0038415 | A1 | 2/2011 | Min et al. |
| 2012/0307894 | A1 | 12/2012 | Chien et al. |
| 2013/0101032 | A1 | 4/2013 | Wittmann et al. |
| 2016/0198185 | A1 | 7/2016 | Oh et al. |
| 2018/0091825 | A1 | 3/2018 | Zhao et al. |
| 2018/0124397 | A1 | 5/2018 | Yoo et al. |
| 2018/0332284 | A1 | 11/2018 | Liu et al. |
| 2019/0116381 | A1 | 4/2019 | Lee et al. |
| 2019/0124339 | A1* | 4/2019 | Young .................. H04N 19/159 |
| 2019/0222839 | A1 | 7/2019 | Jang et al. |
| 2019/0238839 | A1 | 8/2019 | Ikeda |
| 2019/0238842 | A1 | 8/2019 | Ryu et al. |
| 2020/0366931 | A1 | 11/2020 | Ko et al. |
| 2021/0037259 | A1 | 2/2021 | Ko et al. |
| 2021/0297663 | A1* | 9/2021 | Jiang ...................... H04N 19/11 |
| 2021/0392372 | A1* | 12/2021 | Ko ........................ H04N 19/184 |
| 2022/0030226 | A1* | 1/2022 | Lee ....................... H04N 19/117 |
| 2022/0094910 | A1* | 3/2022 | Jiang .................... H04N 19/159 |
| 2022/0167020 | A1* | 5/2022 | Andersson ............. H04N 19/80 |
| 2022/0201286 | A1* | 6/2022 | Tsai ...................... H04N 19/593 |
| 2022/0210430 | A1* | 6/2022 | Yoo ...................... H04N 19/593 |
| 2022/0337814 | A1* | 10/2022 | Heo ..................... H04N 19/117 |
| 2024/0283910 | A1* | 8/2024 | Ko ........................ H04N 19/11 |

FOREIGN PATENT DOCUMENTS

| | | | |
|---|---|---|---|
| CN | 102984523 | A | 3/2013 |
| CN | 106131547 | A | 11/2016 |
| CN | 110290383 | A | 9/2019 |
| EP | 3487177 | A1 | 5/2019 |
| EP | 3496399 | A1 | 6/2019 |
| WO | WO-2018026219 | A1 * | 2/2018 ........... H04N 19/103 |
| WO | 2018101685 | A1 | 6/2018 |
| WO | 2018132380 | A1 | 7/2018 |
| WO | 2018202558 | A1 | 11/2018 |
| WO | 2018208349 | A1 | 11/2018 |
| WO | WO-2020111982 | A1 * | 6/2020 ........... H04N 19/105 |

OTHER PUBLICATIONS

Partial Supplementary European Search Report in European Application No. 20833618.0 mailed on Jul. 20, 2022, 17 pages.
Chen, Jianle et al., Algorithm Description for Versatile Video Coding and Test Model 4 (VTM 4), Joint Video Experts Team (JVET) of ITU-T SG 16 WP 3 and ISO/IEC JTC 1/SC 29/WG 11, 2019, 62 pages.
Geert Van Der Auwera et al., CE3: Intra Reference Sample Interpolation Filter Selection Using MDIS Conditions (Test 3.1.2), Joint Video Experts Team (JVET) of ITU-T SG 16 WP 3 and ISO/IEC JTC 1/SC 29/WG 11, 2018, 14 pages.
Alexey Filippov et al., CE3: A Combination of Tests 3.1.2 and 3.1.4 for Intra Reference Sample Interpolation Filter, Joint Video Experts Team (JVET) of ITU-T SG 16 WP 3 and ISO/IEC JTC 1/SC 29/WG 11, 2018, 5 pages.
ITU-T, Advanced Video Coding for Generic Audiovisual Services, Recommendation ITU-T H.264, 2013, 731 pages.
ITU-T, High Efficiency Video Coding, Recommendation ITU-T H.265, 2015, 635 pages.
Mathias Wien, Variable Block-Size Transforms for H.264/AVC, IEEE Transactions on Circuits & Systems for Video Technology, 13(7): 604-613, 2003.
Mahsa T. Pourazad et al., HEVC: The New Gold Standard for Video Compression: How Does HEVC Compare with H.264/AVC ?. , IEEE Consumer Electronics Magazine, 36-46, 2012.
Yong-Uk Yoon et al., CE3-related: MPM Modifications for Intra Mode Coding, Joint Video Experts Team (JVET) of ITU-T SG 16 WP 3 and ISO/IEC JTC 1/SC 29/WG 11, 2018, 5 pages.
Chang, Yao-Jen et al., Multiple Reference Line Coding for Most Probable Modes in Intra Prediction, 2019 Data Compression Conference (DCC), 559, 2019.
Zhu, Shi-Ping et al., Optimization of Intra-Prediction Mode Decision in New Generation Video Coding, Optics and Precision Engineering, 22(6): 1686-1695, 2014.
International Search Report in PCT/CN2020/094832 mailed on Sep. 16, 2020, 4 pages.
Written Opinion in PCT/CN2020/094832 mailed on Sep. 16, 2020, 5 pages.
First Office Action in Chinese Application No. 201910556707.3 mailed on Jan. 6, 2021, 17 pages.
First Office Action in Chinese Application No. 201910555597.9 mailed on Oct. 19, 2020, 17 pages.
First Office Action in Chinese Application No. 201910555585.6 mailed on Jan. 12, 2021, 12 pages.
The Extended European Search Report in European Application No. 20833618.0 mailed on Oct. 28, 2022, 19 pages.

* cited by examiner

SYSTEMS AND METHODS FOR PREDICTING CODING UNITS IN IMAGES

CROSS-REFERENCE TO RELATED APPLICATIONS

This application is a Continuation of International Application No. PCT/CN2020/094832, filed on Jun. 8, 2020, which claims priority to Chinese Patent Application No. 201910556707.3 filed on Jun. 25, 2019, Chinese Patent Application No. 201910555597.9 filed on Jun. 25, 2019, Chinese Patent Application No. 201910555585.6 filed on Jun. 25, 2019, Chinese Patent Application No. 201910555628.0 filed on Jun. 25, 2019, the contents of each of which are incorporated herein by reference in their entirety.

TECHNICAL FIELD

The present disclosure generally relates to image processing technology, and in particular, to systems and methods for image coding.

BACKGROUND

With the development of communication and multimedia technologies, the exploration of image coding which has improved compression performance and accuracy and reduced data redundancy has developed rapidly nowadays. Commonly, an intra sub-partitions (ISP) mode is widely used in an image coding system. Under the ISP mode, the image coding system may involve multiple operations including coding unit division, reference pixels (or lines) construction, MPM list construction, prediction mode determination, etc. The multiple operations involved by the image coding system under the ISP mode may effect coding quality and coding efficiency. For example, only one reference line closest to a left side (e.g., a left side) and an upper side (e.g., an upper side) of the coding sub-unit is used to determine the prediction mode, which limits the effect of reducing the data redundancy in the image and improving compression performance and accuracy of coding the image. Therefore, it is desirable to provide improved systems and methods for image coding with improved coding quality and coding efficiency.

SUMMARY

An aspect of the present disclosure relates to a system for image coding. The system may include at least one storage medium including a set of instructions and at least one processor in communication with the at least one storage medium. When executing the set of instructions, the at least one processor may be directed to cause the system to determine a coding unit in an image and divide the coding unit into a plurality of coding sub-units. For at least one coding sub-unit of the plurality of coding sub-units, the at least one processor may be directed to cause the system to determine multiple reference lines of the at least one coding sub-unit. The multiple reference lines may include a first reference line closest to the at least one coding sub-unit and one or more second reference lines. The at least one processor may be directed to cause the system to determine one or more most probable modes (MPM) lists associated with at least one coding sub-unit. The one or more MPM lists may include at least one first MPM list corresponding to the first reference line and at least one second MPM list corresponding to the one or more second reference lines. The at least one processor may be directed to cause the system to determine a target prediction mode associated with one of the at least one coding sub-unit based on the one or more MPM lists; determine a predicted coding sub-unit corresponding to the one of the at least one coding sub-unit based on the target prediction mode; and determine a predicted coding unit corresponding to the coding unit based at least in part on the predicted coding sub-unit.

In some embodiments, to divide the coding unit into the plurality of coding sub-units, the at least one processor may be directed to cause the system to determine a division mode of the coding unit. The division mode may be defined by one or more division parameters including at least one of a division direction, a count of the plurality of coding sub-units, or a ratio of lengths of two adjacent boundaries of the coding sub-unit. The at least one processor may be directed to cause the system to divide the coding unit into the plurality of coding sub-units based on the division mode.

In some embodiments, to determine the division mode of the coding unit, the at least one processor may be directed to cause the system to obtain a plurality of candidate division modes; for each of the plurality of candidate division modes, determine a rate-distortion (RD) cost of the coding unit corresponding to the candidate division mode; and determine the division mode of the coding unit from the plurality of candidate division modes based on a plurality of RD costs corresponding to the plurality of candidate division modes.

In some embodiments, for at least one coding sub-unit of the plurality of coding sub-units, to determine the multiple reference lines of the at least one coding sub-unit, the at least one processor may be directed to cause the system to determine whether the at least one coding sub-unit includes a target coding sub-unit and determine, based on a determination whether the at least one coding sub-unit includes the target coding sub-unit, the multiple reference lines of the coding sub-unit. The determining, based on the determination whether the at least one coding sub-unit includes the target coding sub-unit, the multiple reference lines of the coding sub-unit may include determining, in response to the determination that the at least one coding sub-unit includes the target coding sub-unit, the multiple reference lines of the at least one coding sub-unit based on one or more reference lines of the coding unit; or determining, in response to the determination that the at least one coding sub-unit does not include the target coding sub-unit, the multiple reference lines of the at least one coding sub-unit based on at least portion pixels in previous coding sub-unit among the plurality of coding sub-units that has been involved an intra prediction prior to the at least one coding sub-unit.

In some embodiments, to determine, in response to determining that the at least one coding sub-unit does not include the target coding sub-unit, the multiple reference lines of the coding sub-unit based on at least portion pixels in the previous coding sub-unit among the plurality of coding sub-units that has been involved an intra prediction prior to the coding sub-unit, the at least one processor may be directed to cause the system to determine the multiple reference lines of the at least one coding sub-unit based on predicted values of the at least portion pixels in the previous coding sub-unit.

In some embodiments, to determine, in response to determining that the coding sub-unit does not include the target coding sub-unit, the multiple reference lines of the at least one coding sub-unit based on at least portion pixels in the previous coding sub-unit, the at least one processor may be directed to cause the system to determine whether a size parameter of the at least one coding unit is larger than a threshold and determine, based on a determination whether the size parameter of the at least one coding unit exceeds the threshold and the at least portion pixels in the previous coding sub-unit, the multiple reference lines of the at least one coding sub-unit.

In some embodiments, the at least one processor may be directed to cause the system to determine, in response to the determination that the size parameter of the at least one coding unit is less than the threshold, the multiple reference lines of the coding sub-unit based on the predicted values of the at least portion pixels in the previous coding sub-unit.

In some embodiments, the at least one processor may be directed to cause the system to determine, in response to the determination that the size parameter of the at least one coding unit exceeds the threshold, the multiple reference lines of the coding sub-unit based on reconstructed values of the at least portion pixels in the previous coding sub-unit. The reconstructed values may be determined based on predicted values of the at least portion pixels in the previous coding sub-unit.

In some embodiments, each of the multiple reference lines of the at least one coding sub-unit includes a plurality of reference pixels, to determine the multiple reference lines of the at least one coding sub-unit, the at least one processor may be directed to cause the system to determine, for each of the multiple reference lines of the at least one coding sub-unit, a count of the plurality of reference pixels in the reference line based on a size of the at least one coding sub-unit and determine, based on the count of the plurality of reference pixels in the reference line, the reference line.

In some embodiments, to determine the one or more MPM lists associated with at least one coding sub-unit, the at least one processor may be directed to cause the system to, for each of the at least one coding sub-unit, determine a first neighboring block associated with the coding sub-unit and determine a second neighboring block associated with the coding sub-unit. The at least one processor may be directed to cause the system to determine the one or more MPM lists associated with the at least one coding sub-unit based on the first neighboring block and the second neighboring block.

In some embodiments, to determine the first neighboring block adjacent to the coding sub-unit, the at least one processor may be directed to cause the system to determine the first neighboring block closest to the coding unit along a first boundary of the coding unit or determine the first neighboring block closest to the coding sub-unit along the first boundary of the coding sub-unit.

In some embodiments, to determine the second neighboring block adjacent to the coding sub-unit, the at least one processor may be directed to cause the system to determine the second neighboring block closest to the coding unit along a second boundary of the coding unit or determine the second neighboring block closest to the coding sub-unit along the second boundary of the coding sub-unit, wherein the first boundary is adjacent to the second boundary.

In some embodiments, to determine the one or more MPM lists associated with at least one coding sub-unit, the at least one processor may be directed to cause the system to divide the coding unit into a plurality of regions, one of the plurality of regions including the at least one coding sub-unit; determine one or more MPM lists corresponding to the one of the plurality of regions; and designate the one or more MPM lists corresponding to the one of the plurality of regions as the one or more MPM lists associated with the at least one coding sub-unit.

In some embodiments, to determine the one or more MPM lists associated with at least one coding sub-unit, the at least one processor may be directed to cause the system to determine a first adjacent block closest to the one of the plurality of regions along a first boundary of the one of the plurality of regions; determine a second adjacent block closest to the one of the plurality of regions along a second boundary of the one of the plurality of regions; and determine the one or more MPM lists based on the first adjacent block and the second adjacent block.

In some embodiments, to determine the one or more MPM lists associated with at least one coding sub-unit, the at least one processor may be directed to cause the system to determine the at least one second MPM list based on the at least one first MPM list or determine the at least one second MPM list based on a global MPM list corresponding to the one or more second reference lines of the coding unit.

In some embodiments, the global MPM list corresponding to the one or more second reference lines of the coding unit may be determined under a non-intra sub-partitions (ISP) mode.

In some embodiments, to determine, based on the one or more MPM lists, the target prediction mode corresponding to one of the at least one coding sub-unit, the at least one processor may be directed to cause the system to determine, based on the one or more MPM lists, a target candidate list associated with the at least one coding sub-unit and determine, based on the target candidate list, a target prediction mode corresponding to the one of the at least one coding sub-unit.

In some embodiments, to determine, based on the one or more MPM lists, the target candidate list associated with the at least one coding sub-unit, the at least one processor may be directed to cause the system to determine an initial candidate list associated with the at least one coding sub-unit; determine an intermediate candidate list associated with the at least one coding sub-unit by updating the initial candidate list based on adjacent prediction modes of each of prediction modes in the initial candidate list; and determine the target candidate list by updating the intermediate candidate list based on the one or more MPM lists.

In some embodiments, to determine the target candidate list associated with the at least one coding sub-unit by updating the intermediate candidate list based on the one or more MPM lists, the at least one processor may be directed to cause the system to update the intermediate candidate list based on the at least one first MPM list and the at least one second MPM list and designate the updated intermediate candidate list as the target candidate list associated with the at least one coding sub-unit.

In some embodiments, to determine, based on the target prediction mode, the predicted coding sub-unit corresponding to one of the at least one coding sub-unit, the at least one processor may be directed to cause the system to, for each of at least one pixel in the one of the at least one coding sub-unit, determine a preliminary predicted value of the pixel along a prediction direction of the target prediction mode based on multiple reference lines of the one of the at least one coding sub-unit; determine whether the pixel is within a compensation region; designate, in response to determining that the pixel is not within a compensation region, the preliminary predicted value of the pixel as a predicted value of the pixel; determine, in response to determining that the pixel is within a compensation region, a compensation value of the pixel along an opposite direction of the prediction direction based on the one or more one or more reference lines of the coding sub-unit; and determine the predicted value of the pixel based on the preliminary predicted value and compensation predicted value of the pixel. The at least one processor may be directed to cause the system to determine the predicted coding sub-unit corresponding to each of the at least one coding sub-unit based on a plurality of predicted values of the plurality of pixels in the one of the at least one coding sub-unit.

In some embodiments, to determine, based on the target prediction mode, a predicted coding sub-unit corresponding to one of the at least one coding sub-unit, the at least one processor may be directed to cause the system to determine whether a filtering condition is satisfied; perform, in response to determining that the filtering condition is satisfied, a filtering operation on a plurality of reference pixels of each of one or more reference lines of the one of the at least one coding sub-unit to obtain filtered reference pixels; and determine, based on the target prediction mode and the filtered reference pixels, the predicted coding sub-unit corresponding to the one of the at least one coding sub-unit.

In some embodiments, to perform the filtering operation on the plurality of reference pixels of each of the one or more reference lines of the one of the at least one coding sub-unit to obtain the filtered reference pixels, the at least one processor may be directed to cause the system to determine a filter of a type according to at least one of the target prediction mode, a width of the one of the at least one coding sub-unit, or a height of the one of the at least one coding sub-unit and perform the filtering operation on the plurality of reference pixels of each of the one or more reference lines of the one of the at least one coding sub-unit using the filter.

In some embodiments, to determine the filter of the type according to the at least one of the target prediction mode, the width of the one of the at least one coding sub-unit, or the height of the one of the at least one coding sub-unit, the at least one processor may be directed to cause the system to, determine, in response to the target prediction mode is a planar prediction mode or a diagonal prediction mode, a [1 2 1] filter as the filter of the type.

In some embodiments, to determine the filter of the type according to the at least one of the target prediction mode, the width of the one of the at least one coding sub-unit, or the height of the one of the at least one coding sub-unit, the at least one processor may be directed to cause the system to compare at least one of the width of the one of the at least one coding sub-unit or the height of the one of the at least one coding sub-unit with a threshold and designate, based on the comparison, one of a Gaussian filter and a discrete cosine transform-based interpolation filter (DCT-IF) chroma filter as the filter of the type.

In some embodiments, to determine the filter of the type according to the at least one of the target prediction mode, the width of the one of the at least one coding sub-unit, or the height of the one of the at least one coding sub-unit, the at least one processor may be directed to cause the system to compare the width of the one of the at least one coding sub-unit and the height of the one of the at least one coding sub-unit and designate, based at least in part on the comparison, one of a Gaussian filter and a DCT-IF chroma filter as the filter of the type.

In some embodiments, each of the one or more MPM lists may include at least one prediction mode. The at least one prediction mode may include a wide angle prediction mode that is determined based at least in part on a size of the at least one coding sub-unit.

A further aspect of the present disclosure relates to a method implemented on a computing device including at least one processor, at least one storage medium, and a communication platform connected to a network. The method may include determining a coding unit in an image; dividing the coding unit into a plurality of coding sub-units; determining, for at least one coding sub-unit of the plurality of coding sub-units, multiple reference lines of the at least one coding sub-unit. The multiple reference lines may include a first reference line closest to the at least one coding sub-unit and one or more second reference lines. The method may include determining one or more most probable modes (MPM) lists associated with at least one coding sub-unit. The one or more MPM lists may include at least one first MPM list corresponding to the first reference line and at least one second MPM list corresponding to the one or more second reference lines. The method may include determining a target prediction mode associated with one of the at least one coding sub-unit based on the one or more MPM lists; determining a predicted coding sub-unit corresponding to the one of the at least one coding sub-unit based on the target prediction mode; and determining a predicted coding unit corresponding to the coding unit based at least in part on the predicted coding sub-unit.

A still further aspect of the present disclosure relates to a system for image coding. The system may include an acquisition module, a division module, a reference line determination module, an MPM list determination module, a prediction mode determination module, and a prediction module. The acquisition module may be configured to determine a coding unit in an image. The division module may be configured to divide the coding unit into a plurality of coding sub-units. The reference line determination module may be configured to determine, for at least one coding sub-unit of the plurality of coding sub-units, multiple reference lines of the at least one coding sub-unit. The multiple reference lines may include a first reference line closest to the at least one coding sub-unit and one or more second reference lines. The MPM list determination module may be configured to determine one or more most probable modes (MPM) lists associated with at least one coding sub-unit. The one or more MPM lists may include at least one first MPM list corresponding to the first reference line and at least one second MPM list corresponding to the one or more second reference lines. The prediction mode determination module may be configured to determine a target prediction mode associated with one of the at least one coding sub-unit based on the one or more MPM lists. The prediction module may be configured to determine a predicted coding sub-unit corresponding to the one of the at least one coding sub-unit based on the target prediction mode and determine a predicted coding unit corresponding to the coding unit based at least in part on the predicted coding sub-unit.

A still further aspect of the present disclosure relates to a non-transitory computer readable medium including executable instructions. When the executable instructions are executed by at least one processor, the executable instructions may direct the at least one processor to perform a method. The method may include determining a coding unit in an image; dividing the coding unit into a plurality of coding sub-units; determining, for at least one coding sub-unit of the plurality of coding sub-units, multiple reference lines of the at least one coding sub-unit. The multiple reference lines may include a first reference line closest to the at least one coding sub-unit and one or more second reference lines. The method may include determining one or more most probable modes (MPM) lists associated with at least one coding sub-unit. The one or more MPM lists may include at least one first MPM list corresponding to the first reference line and at least one second MPM list corresponding to the one or more second reference lines. The method may include determining a target prediction mode associated with one of the at least one coding sub-unit based on the one or more MPM lists; determining a predicted coding sub-unit corresponding to the one of the at least one coding sub-unit based on the target prediction mode; and determining a predicted coding unit corresponding to the coding unit based at least in part on the predicted coding sub-unit.

A still further aspect of the present disclosure relates to a system for image coding. The system may include at least one storage medium including a set of instructions and at least one processor in communication with the at least one storage medium. When executing the set of instructions, the at least one processor may be directed to cause the system to determine a coding unit in an image and divide the coding unit into a plurality of coding sub-units. For at least one coding sub-unit of the plurality of coding sub-units, the at least one processor may be directed to cause the system to determine multiple reference lines of the at least one coding sub-unit. The multiple reference lines may include a first reference line closest to the at least one coding sub-unit and one or more second reference lines. The at least one processor may be directed to cause the system to determine one or more most probable modes (MPM) lists associated with at least one coding sub-unit. The one or more MPM lists may include at least one first MPM list corresponding to the first reference line and at least one second MPM list corresponding to the one or more second reference lines. The at least one processor may be directed to cause the system to determine a target prediction mode associated with one of the at least one coding sub-unit based on the one or more MPM lists; determine a predicted coding sub-unit corresponding to the one of the at least one coding sub-unit based on the target prediction mode; and determine a predicted coding unit corresponding to the coding unit based at least in part on the predicted coding sub-unit.

A still further aspect of the present disclosure relates to a system for image coding. The system may include at least one storage medium including a set of instructions and at least one processor in communication with the at least one storage medium. When executing the set of instructions, the at least one processor may be directed to cause the system to determine a coding unit in an image and divide the coding unit into a plurality of coding sub-units. For at least one coding sub-unit of the plurality of coding sub-units, the at least one processor may be directed to cause the system to determine multiple reference lines of the at least one coding sub-unit based on at least portion pixels in previous coding sub-unit among the plurality of coding sub-units that has been involved an intra prediction prior to the at least one coding sub-unit. The at least one processor may be directed to cause the system to determine a predicted coding sub-unit corresponding to the one of the at least one coding sub-unit based on the multiple reference lines of the at least one coding sub-unit and determine a predicted coding unit corresponding to the coding unit based at least in part on the predicted coding sub-unit.

A still further aspect of the present disclosure relates to a system for image coding. The system may include at least one storage medium including a set of instructions and at least one processor in communication with the at least one storage medium. When executing the set of instructions, the at least one processor may be directed to cause the system to determine a coding unit in an image and divide the coding unit into a plurality of coding sub-units. For at least one coding sub-unit of the plurality of coding sub-units, the at least one processor may be directed to cause the system to determine multiple reference lines of the at least one coding sub-unit based on a count of a plurality of reference pixels in each of the multiple reference lines. The count of the plurality of reference pixels in each of the multiple reference lines may be determined based on a size of the at least one coding sub-unit. The at least one processor may be directed to cause the system to determine a predicted coding sub-unit corresponding to the one of the at least one coding sub-unit based on the multiple reference lines of the at least one coding sub-unit and a target prediction mode; and determine a predicted coding unit corresponding to the coding unit based at least in part on the predicted coding sub-unit.

A still further aspect of the present disclosure relates to a system for image coding. The system may include at least one storage medium including a set of instructions and at least one processor in communication with the at least one storage medium. When executing the set of instructions, the at least one processor may be directed to cause the system to determine a coding unit in an image and divide the coding unit into a plurality of coding sub-units. For each of the at least one coding sub-unit, the at least one processor may be directed to cause the system to determine one or more most probable modes (MPM) lists associated with the coding sub-unit based on a first neighboring block and a second neighboring block, the first neighboring block closest to the coding unit along a first boundary of the coding unit or the coding sub-unit, the second neighboring block closest to the coding unit along a second boundary of the coding unit or the coding sub-unit. The first boundary may be adjacent to the second boundary. For each of the at least one coding sub-unit, the at least one processor may be directed to cause the system to determine a target prediction mode associated with the coding sub-unit based on the one or more MPM lists and determine a predicted coding sub-unit corresponding to the coding sub-unit based on the target prediction mode. The at least one processor may be directed to cause the system to determine a predicted coding unit corresponding to the coding unit based at least in part on the predicted coding sub-unit.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
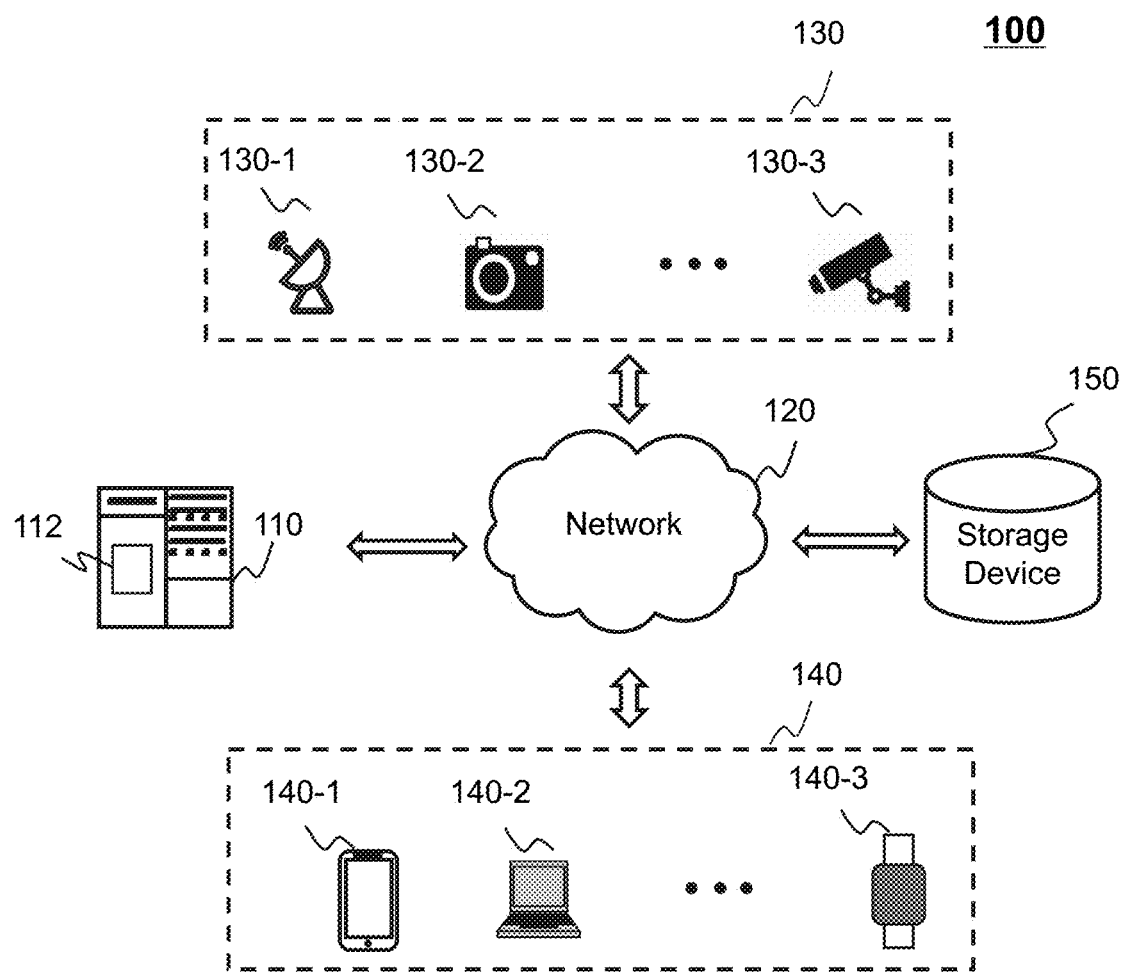
FIG. 1 is a schematic diagram illustrating an exemplary image coding system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expression if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

An aspect of the present disclosure relates to systems and methods for image coding. The system may determine a coding unit in an image and divide the coding unit into a plurality of coding sub-units. For at least one of the plurality of coding sub-units, the system may determine one or more reference lines of the at least one coding sub-unit along a first side (e.g., a left side) and a second side (e.g., an upper side) of the at least one coding sub-unit. The one or more reference lines may include a first reference line (e.g., a reference line with an index 0) closest to the at least one coding sub-unit and one or more second reference lines (e.g., reference lines with index>0). Further, the system may determine one or more most probable modes (MPM) lists associated with the at least one coding sub-unit. The one or more MPM lists may include at least one first MPM list corresponding to the first reference line and at least one second MPM list corresponding to the one or more second reference lines. According to the one or more MPM lists, the system may determine a target prediction mode (e.g., a DC prediction mode, a planar prediction mode, or an angle prediction mode) corresponding to the at least one coding sub-unit. According to the target prediction mode, the system may determine a predicted coding sub-unit corresponding to each of the at least one coding sub-unit. The system may determine a predicted coding unit corresponding to the coding unit based at least in part on the predicted coding sub-unit. Further, the system may code the image based on a plurality of predicted coding units corresponding to a plurality of coding units in the image.

According to the systems and methods of the present disclosure, under an intra sub-partitions (ISP) mode, the at least one first MPM list corresponding to the first reference line and the at least one second MPM list corresponding to the one or more second reference lines are used for determining the target prediction mode corresponding to the at least one coding sub-unit, thereby improving the coding quality, the efficiency, and the accuracy of the image coding.

FIG. 1 is a schematic diagram illustrating an exemplary image coding system according to some embodiments of the present disclosure. As shown, the image coding system 100 may include a server 110, a network 120, an acquisition device 130, a user device 140, and a storage device 150.

The server 110 may be a single server or a server group. The server group may be centralized or distributed (e.g., the server 110 may be a distributed system). In some embodiments, the server 110 may be local or remote. For example, the server 110 may access information and/or data stored in the acquisition device 130, the user device 140, and/or the storage device 150 via the network 120. As another example, the server 110 may be directly connected to the acquisition device 130, the user device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data relating to image coding to perform one or more functions described in the present disclosure. For example, the processing device 112 may determine a coding unit in an image and divide the coding unit into a plurality of coding sub-units. For at least one coding sub-unit of the plurality of coding sub-units, the processing device 112 may determine one or more reference lines and one or more most probable modes (MPM) lists. According to the one or more MPM lists, the processing device 112 may determine a target prediction mode corresponding to the at least one coding sub-unit. As another example, the processing device 112 may determine a predicted coding sub-unit corresponding to one of the at least one coding sub-unit based on the target prediction mode and the one or more reference lines. In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiment, the sever 110 may be unnecessary and all or part of the functions of the server 110 may be implemented by other components (e.g., the acquisition device 130, the user device 140) of the image coding system 100. For example, the processing device 112 may be integrated into the acquisition device 130 or the user device 140 and the functions (e.g., determining the coding unit in the image) of the processing device 112 may be implemented by the acquisition device 130 or the user device 140.

The network 120 may facilitate exchange of information and/or data for the image coding system 100. In some embodiments, one or more components (e.g., the server 110, the acquisition device 130, the user device 140, the storage device 150) of the image coding system 100 may transmit information and/or data to other component(s) of the image coding system 100 via the network 120. For example, the server 110 may obtain an image to be coded from the acquisition device 130 via the network 120. As another example, the server 110 may transmit a coded image to the user device 140 via the network 120. In some embodiments, the network 120 may be any type of wired or wireless network, or a combination thereof. Merely by way of example, the network 120 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof.

The acquisition device 130 may be configured to acquire an image (the "image" herein refers to a single image or a frame of a video). In some embodiments, the acquisition device 130 may include a camera 130-1, a video recorder 130-2, an image sensor 130-3, etc. The camera 130-1 may include a gun camera, a dome camera, an integrated camera, a monocular camera, a binocular camera, a multi-view camera, or the like, or any combination thereof. The video recorder 130-2 may include a PC Digital Video Recorder (DVR), an embedded DVR, or the like, or any combination thereof. The image sensor 130-1 may include a Charge Coupled Device (CCD), a Complementary Metal Oxide Semiconductor (CMOS), or the like, or any combination thereof. The image acquired by the acquisition device 130 may be a two-dimensional image, a three-dimensional image, a four-dimensional image, etc. In some embodiments, the acquisition device 130 may include a plurality of components each of which can acquire an image. For example, the acquisition device 130 may include a plurality of sub-cameras that can capture images or videos simultaneously. In some embodiments, the acquisition device 130 may transmit the acquired image to one or more components (e.g., the server 110, the user device 140, the storage device 150) of the image coding system 100 via the network 120.

The user device 140 may be configured to receive information and/or data from the server 110, the acquisition device 130, and/or the storage device 150 via the network 120. For example, the user device 140 may receive a coded image from the server 110. In some embodiments, the user device 140 may process information and/or data received from the server 110, the acquisition device 130, and/or the storage device 150 via the network 120. For example, the user device 140 may decode the coded image received from the server 110. In some embodiments, the user device 140 may provide a user interface via which a user may view information and/or input data and/or instructions to the image coding system 100. For example, the user may view the decoded image via the user interface. As another example, the user may input an instruction associated with an image coding parameter via the user interface. In some embodiments, the user device 140 may include a mobile phone 140-1, a computer 140-2, a wearable device 140-3, or the like, or any combination thereof. In some embodiments, the user device 140 may include a display that can display information in a human-readable form, such as text, image, audio, video, graph, animation, or the like, or any combination thereof. The display of the user device 140 may include a cathode ray tube (CRT) display, a liquid crystal display (LCD), a light emitting diode (LED) display, a plasma display panel (PDP), a three dimensional (3D) display, or the like, or a combination thereof. In some embodiments, the user device 140 may be connected to one or more components (e.g., the server 110, the acquisition device 130, the storage device 150) of the image coding system 100 via the network 120.

The storage device 150 may be configured to store data and/or instructions. The data and/or instructions may be obtained from, for example, the server 110, the acquisition device 130, and/or any other component of the image coding system 100. In some embodiments, the storage device 150 may store data and/or instructions that the server 110 may execute or use to perform exemplary methods described in the present disclosure. For example, the storage device 150 may store the one or more MPM lists associated with at least one coding sub-unit. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the server 110, the acquisition device 130, the user device 140) of the image coding system 100. One or more components of the image coding system 100 may access the data or instructions stored in the storage device 150 via the network 120. In some embodiments, the storage device 150 may be directly connected to or communicate with one or more components (e.g., the server 110, the acquisition device 130, the user device 140) of the image coding system 100. In some embodiments, the storage device 150 may be part of other components of the image coding system 100, such as the server 110, the acquisition device 130, or the user device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
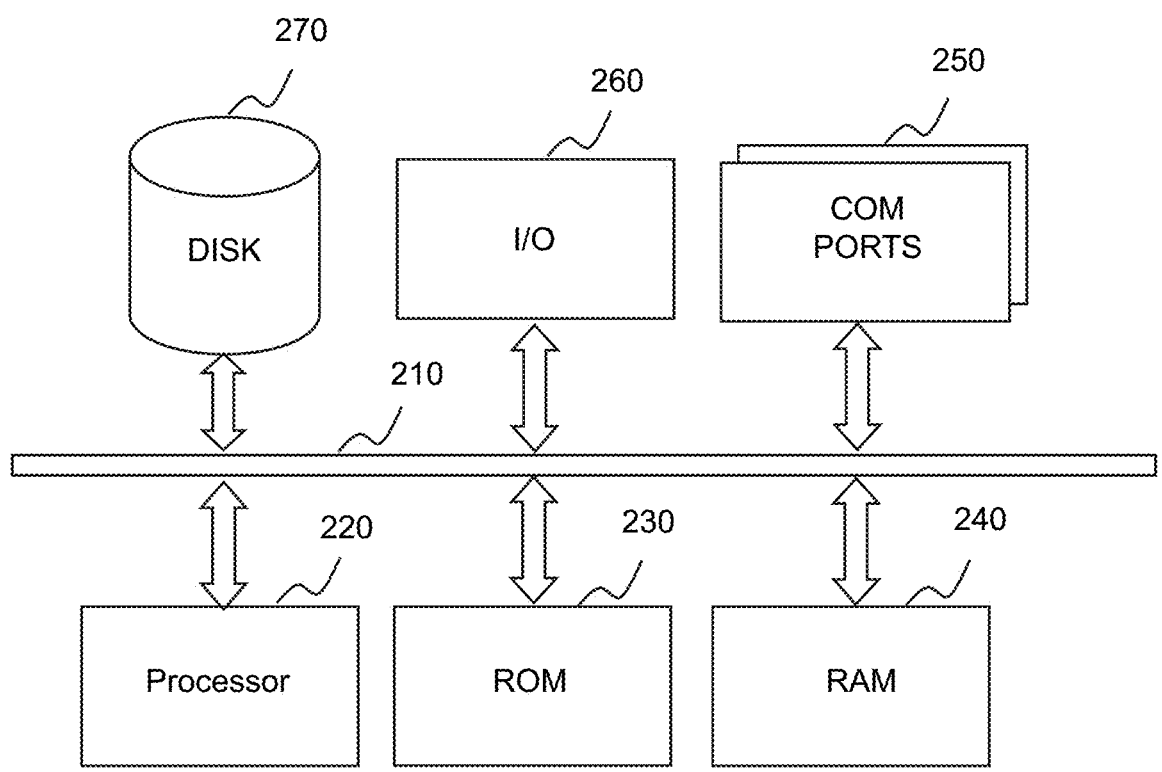
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing device 112 may be implemented on the computing device 200 and configured to perform functions of the processing device 112 disclosed in this disclosure.

The computing device 200 may be used to implement any component of the image coding system 100 as described herein. For example, the processing device 112 may be implemented on the computing device 200, via its hardware, software program, firmware, or a combination thereof. Although only one such computer is shown, for convenience, the computer functions relating to image coding as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B, or the first and second processors jointly execute steps A and B).

Figure 3:
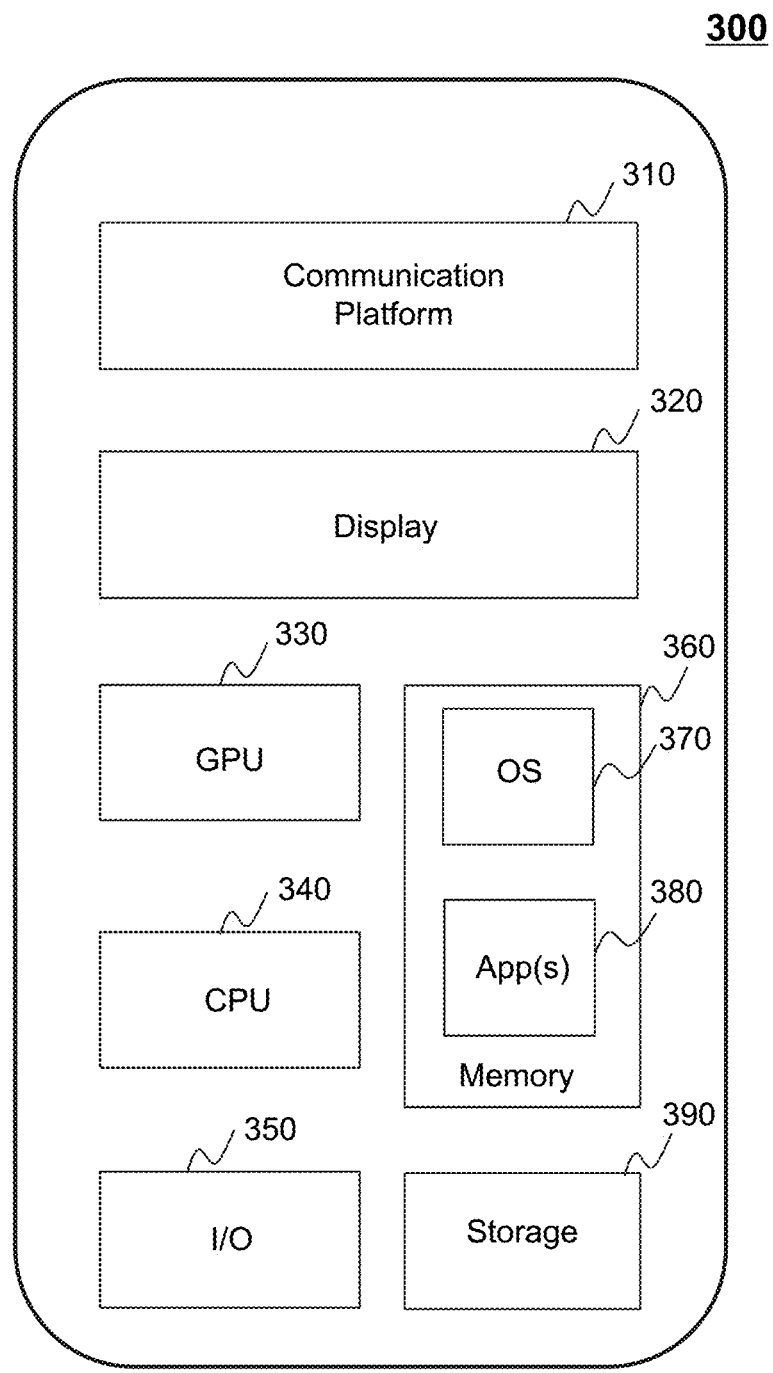
FIG. 3 is a schematic diagram illustrating exemplary hardware and/or software components of an exemplary terminal device according to some embodiments of the present disclosure.

FIG. 3 is a schematic diagram illustrating exemplary hardware and/or software components of an exemplary terminal device according to some embodiments of the present disclosure. In some embodiments, the user device 140 may be implemented on the terminal device 300 shown in FIG. 3.

As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300.

In some embodiments, an operating system 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to image coding or other information from the processing device 112. User interactions may be achieved via the I/O 350 and provided to the processing device 112 and/or other components of the image coding system 100 via the network 120.

Figure 4:
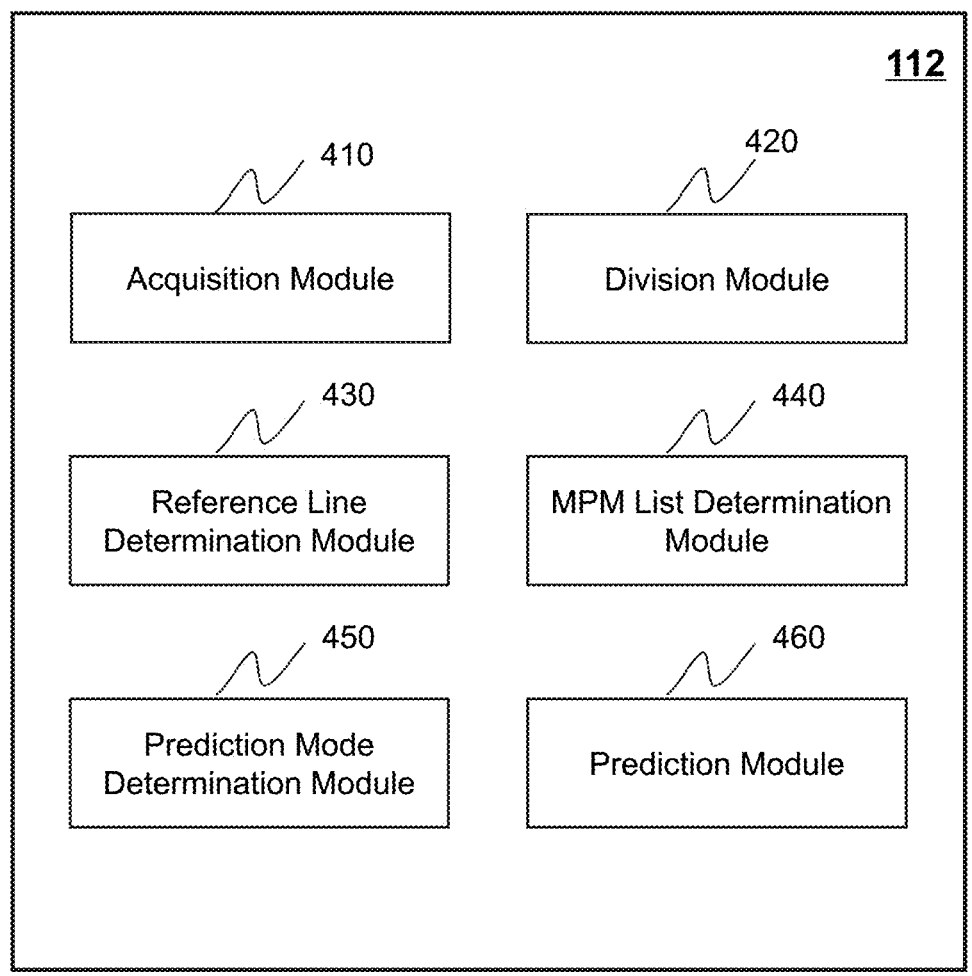
FIG. 4 is a block diagram illustrating an exemplary processing device according to some embodiments of the present disclosure.

FIG. 4 is a block diagram illustrating an exemplary processing device according to some embodiments of the present disclosure. The processing device 112 may include an acquisition module 410, a division module 420, a reference line determination module 430, an MPM list determination module 440, a prediction mode determination module 450, and a prediction module 460.

The acquisition module 410 may be configured to determine a coding unit in an image.

The division module 420 may be configured to divide the coding unit into a plurality of coding sub-units. In some embodiments, the division module 420 may determine a division mode of the coding unit and divide the coding unit into the plurality of coding sub-units based on the division mode. In some embodiments, the division module 420 may obtain a plurality of candidate division modes and randomly select a candidate division mode from the plurality of candidate division modes as the division mode of the coding unit. Additionally or alternatively, for each of the plurality of candidate division modes, the division module 420 may determine a rate-distortion (RD) cost of the coding unit corresponding to the candidate division mode. Further, the division module 420 may determine the division mode of the coding unit from the plurality of candidate division modes based on a plurality of RD costs corresponding to the plurality of candidate division modes.

The reference line determination module 430 may be configured to determine, for at least one of the plurality of coding sub-units, one or more reference lines of at least one coding sub-unit along a first side (e.g., a left side) and a second side (e.g., an upper side) of the at least one coding sub-unit. In some embodiments, the one or more reference lines may include a first reference line closest to the at least one coding sub-unit and one or more second reference lines other than the first reference line.

The MPM list determination module 440 may be configured to determine one or more MPM lists associated with at least one coding sub-unit. In some embodiments, the one or more MPM lists of the at least one coding sub-unit (e.g., one of the plurality of coding sub-units, the one of the plurality of regions) may include at least one first MPM list corresponding to the first reference line (e.g., index 0) closest to the at least one coding sub-unit and at least one second MPM list corresponding to the one or more second reference lines (e.g., index>0) of the at least one coding sub-unit. In some embodiments, the MPM list determination module 440 may determine the at least one second MPM list corresponding to the one or more second reference lines of the at least one coding sub-unit based on the at least one first MPM list corresponding to the first reference line closest to the at least one coding sub-unit. In some embodiments, the MPM list determination module 440 may determine the at least one second MPM list corresponding to the one or more second reference lines (e.g., index>0) of the at least one coding sub-unit based on a global MPM list corresponding to the one or more second reference lines (e.g., index>0) of the coding unit.

The prediction mode determination module 450 may be configured to determine a target prediction mode corresponding to the at least one coding sub-unit (e.g., one of the plurality of coding sub-units, the one of the plurality of regions) based on the one or more MPM lists. In some embodiments, the prediction mode determination module 450 may determine a target candidate list associated with the at least one coding sub-unit based on the one or more MPM lists. For example, the prediction mode determination module 450 may determine an initial candidate list associated with the at least one coding sub-unit. The prediction mode determination module 450 may determine an intermediate candidate list associated with the at least one coding sub-unit by updating the initial candidate list based on adjacent prediction modes of each of prediction modes in the initial candidate list. The prediction mode determination module 450 may determine the target candidate list corresponding to the at least one coding sub-unit by updating the intermediate candidate list based on the one or more MPM lists. Further, the prediction mode determination module 450 may determine the target prediction mode corresponding to each of the at least one coding sub-unit based on the target candidate list.

The prediction module 460 may be configured to determine a predicted coding sub-unit corresponding to each of the at least one coding sub-unit based on the target prediction mode and a predicted coding unit corresponding to the coding unit based at least in part on the predicted coding sub-unit.

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

For example, the prediction module 460 may be divided into a predicted coding sub-unit determination module configured to determine the predicted coding sub-unit corresponding to each of the at least one coding sub-unit and a predicted coding unit determination module configured to determine the predicted coding unit corresponding to the coding unit. As another example, the processing device 112 may also include a transmission module configured to transmit signals (e.g., electrical signals, electromagnetic signals) to one or more components (e.g., the acquisition device 130) of the image coding system 100. As a further example, the processing device 112 may include a storage module (not shown) used to store information and/or data (e.g., the coding unit, the plurality of coding sub-units, the one or more MPM lists, the target prediction mode, the predicted coding sub-unit corresponding to each of the at least one coding sub-unit, the predicted coding unit corresponding to the coding unit) associated with the image coding.

Figure 5:
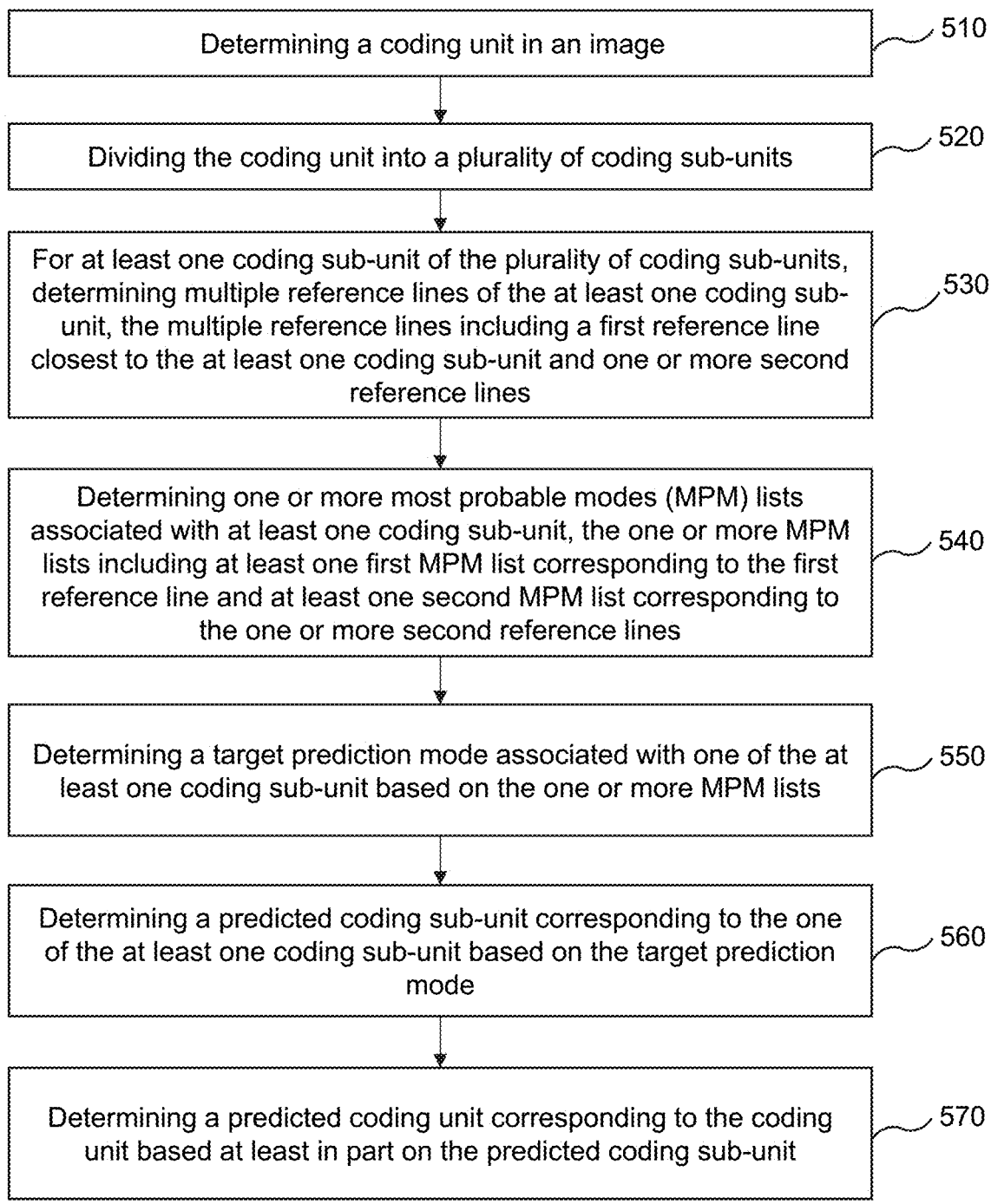
FIG. 5 is a flowchart illustrating an exemplary process for image coding according to some embodiments of the present disclosure.

FIG. 5 is a flowchart illustrating an exemplary process for image coding according to some embodiments of the present disclosure. In some embodiments, the process 500 may be implemented as a set of instructions (e.g., an application) stored in the storage ROM 230 or RAM 240. The processor 220 and/or the modules in FIG. 5 may execute the set of instructions, and when executing the instructions, the processor 220 and/or the modules may be configured to perform the process 500. The operations of the illustrated process presented below are intended to be illustrative. In some embodiments, the process 500 may be accomplished with one or more additional operations not described and/or without one or more of the operations herein discussed. Additionally, the order in which the operations of the process as illustrated in FIG. 5 and described below is not intended to be limiting.

In 510, the processing device 112 (e.g., the acquisition module 410) (e.g., the processing circuits of the processor 220) may determine a coding unit in an image.

In some embodiments, the processing device 112 may obtain the image from the acquisition device 130 (e.g., the camera 130-1, the video recorder 130-2, the sensor 130-3, etc.), the storage device 150, etc. In some embodiments, the image may be a frame in a video collected by the acquisition device 130. The processing device 112 may obtain and/or determine the image (i.e., the frame) from the video. For example, the processing device 112 may perform a framing operation on the video to obtain a plurality of frames in the video. The processing device 112 may obtain one of the plurality of frames as the image. In some embodiments, the image may be in a format of YUV (including a luminance component, a Cb chrominance component, and a Cr chrominance component) or Red-Green-Blue (RGB) that may be converted into the YUV format.

The coding unit may also be referred to be a current block or an encoding block that may refer to a block to be encoded in the image. In some embodiments, the processing device 112 may extract the coding unit from the image. For example, the processing device 112 may divide the image into a plurality of coding units and extract a coding unit from the plurality of coding units. In some embodiments, the coding unit may be a luminance unit and/or a Chrominance unit. In some embodiments, the coding unit may be a quadrilateral region (e.g., a square, a rectangle) with a size and include a plurality of pixels. As used herein, the size of the coding unit may be defined by a height and width of the coding unit. The height of the coding unit may refer to a length of a boundary of the coding unit along a vertical direction. The width of the coding unit may refer to a length of a boundary of the coding unit along a horizontal direction. The height and width of the coding unit may be defined by a count or number of pixels in a column and a row in the coding unit along the vertical direction and the horizontal direction, respectively. In some embodiments, the size of the coding unit may be denoted as w*h that w indicates a width of the coding unit and h indicates a height of the coding unit. The size of the coding unit may include 2 pixels*2 pixels, 4 pixels*4 pixels, 8 pixels*8 pixels, 16 pixels*16 pixels, 32 pixels*32 pixels, 64 pixels*64 pixels, 128 pixels*128 pixels, 4 pixels*8 pixels, 4 pixels*32 pixels, 4 pixels*128 pixels, etc.

In 520, the processing device 112 (e.g., the division module 420) (e.g., the processing circuits of the processor 220) may divide the coding unit into a plurality of coding sub-units. As used herein, a coding sub-unit may also be referred to as an encoding sub-block or a sub-block.

In some embodiments, the processing device 112 may determine whether the coding unit satisfies a division condition. For example, the processing device 112 may determine whether a height and a width of the coding unit are larger than a threshold value. The threshold may be a default setting (e.g., 4 pixels) of the image coding system 100 or may be adjustable under different situations. In response to determining that the height and the width of the coding unit are larger than the threshold value, the processing device 112 may determine that the coding unit satisfies the division condition. In response to determining that the coding unit satisfies the division condition, the processing device 112 may divide the coding unit into the plurality of coding sub-units. In some embodiments, when the w and h may be larger than 4 pixels, the processing device 112 may divide the coding unit into i (i is an integer larger than or equal to 2) coding sub-units and a width and a height of each of the i coding sub-units are integers. For example, when the size of the coding unit is 4 pixels*8 pixels or 8 pixels*4 pixels, the processing device 112 may divide the coding unit into 2 coding sub-units. As another example, when the size of the coding unit is larger than 4 pixels*8 pixels or 8 pixels*4 pixels, the processing device 112 may divide the coding unit into 4 coding sub-units.

In some embodiments, the processing device 112 may determine a division mode of the coding unit and divide the coding unit into the plurality of coding sub-units based on the division mode. As used herein, the division mode may be defined by one or more division parameters. The one or more division parameters may include a division direction, a count of the plurality of coding sub-units, a ratio of lengths of two adjacent boundaries of a coding sub-unit, a size of each of the plurality of coding sub-units, or the like, or any combination thereof. The division direction may include a horizontal direction and/or a vertical direction. When the division direction in the division mode is the horizontal direction, the division mode may be referred to as horizontal division; when the division direction in the division mode is the vertical direction, the division mode may be referred to as vertical direction division. The sizes of at least two of the plurality of sub-units may be the same or different. For example, when the size of the coding unit is 16 pixels*16 pixels, the processing device 112 may divide the coding unit into 4 coding sub-units along the horizontal direction and a size of each of the 4 coding sub-units is 16 pixels*4 pixels or divide the coding unit into 4 coding sub-units along the vertical direction and a size of each of the 4 coding sub-units is 4 pixels*16 pixels. As another example, the processing device 112 may divide the coding unit (16 pixels*16 pixels) into 8 coding sub-units along the horizontal direction and the vertical direction and a size of each of the 8 coding sub-units is 2 pixels*2 pixels.

In some embodiments, the processing device 112 may determine the division mode of the coding unit based on the size of the coding unit. For example, the processing device 112 may determine one or more division parameters of the coding unit based on the height and/or the width of the coding unit. Further, the processing device 112 may determine the count of the plurality of coding sub-units and/or the size of each of the plurality of coding sub-units based on the height and/or width of the coding unit.

In some embodiments, the division mode may be a default setting of the image coding system 100 or may be adjustable under different situations. For example, for a specific coding unit, the processing device 112 may designate a specific division mode (e.g., a specific division direction, a specific count of the plurality of coding sub-units, a specific ratio of lengths of two adjacent boundaries of the coding sub-unit). In some embodiments, the processing device 112 may obtain a plurality of candidate division modes and randomly select a candidate division mode from the plurality of candidate division modes as the division mode of the coding unit. For example, the processing device 112 may determine the plurality of candidate division modes based on the size of the coding unit.

Additionally or alternatively, for each of the plurality of candidate division modes, the processing device 112 may determine a rate-distortion (RD) cost of the coding unit corresponding to the candidate division mode. For example, the processing device 112 may determine the RD cost of the coding unit using a sum of absolute transformed difference (SATD) cost between the coding unit and the predicted coding unit of the coding unit when the current coding unit is predicted by the ISP mode. As another example, the processing device 112 may determine the RD cost of the coding unit using a sum of squared error (SSE) cost between the coding unit and the predicted coding unit of the coding unit when the current coding unit is predicted by the ISP mode. As used herein, the RD cost may indicate the accuracy of the intra prediction of the coding unit under a candidate division mode. For example, the higher the RD cost, the lower the accuracy of the intra prediction of the coding unit may be. In some embodiments, the RD cost of the coding unit may be represented as formula (1) below:

$$RDcost = D + A * R \qquad (1),$$

wherein D and R respectively represent a distortion loss and the number (or count) of bits when a prediction mode is used to predict the coding unit, and A refers to a Lagrange factor.

Further, the processing device 112 may determine the division mode of the coding unit from the plurality of candidate division modes based on a plurality of RD costs corresponding to the plurality of candidate division modes. For example, the processing device 112 may select a candidate division mode that has not a maximum RD cost from the plurality of candidate division modes as the division mode of the coding unit. As another example, the processing device 112 may designate a candidate division mode with a minimum RD cost among the plurality of candidate division modes as the division mode of the coding unit. In some embodiments, the processing device 112 may use a syntax element to indicate the division mode of the coding unit and store the syntax element into the storage device 150. In subsequent operations, the processing device 112 may determine the division mode of the coding unit by obtaining the syntax element from the storage device 150. More descriptions of the division of the coding unit may be found elsewhere in the present disclosure (e.g., FIGS. 6A-8 and the descriptions thereof).

In 530, for at least one of the plurality of coding sub-units, the processing device 112 (e.g., the reference line determination module 430) (e.g., the processing circuits of the processor 220) may determine one or more reference lines of at least one coding sub-unit along a first side (e.g., a left side) and a second side (e.g., an upper side) of the at least one coding sub-unit.

In some embodiments, the processing device 112 may divide the coding unit into the plurality of regions (e.g., regions 1610 and 1620 illustrated in FIG. 16A-C, regions 1711 and 1712 illustrated in FIG. 17A, regions 1721 1722, and 1723 illustrated in FIG. 17B) along a direction. Each of the plurality of regions may include the at least one coding sub-unit of the plurality of coding sub-units. The direction used to divide the coding unit into the plurality of regions may be the same as the division direction in the division mode used to divide the coding unit into the plurality of coding sub-units. The processing device 112 may determine the one or more reference lines of one of the plurality of regions that includes the at least one coding sub-units.

In some embodiments, the at least one sub-coding unit may refer to single one of the plurality of coding sub-units or the one of the plurality of regions that includes the at least one coding sub-units. In some embodiments, for the single one of the plurality of coding sub-units, a side of the coding sub-unit may refer to an area beside a boundary of the coding sub-unit. For example, the first side of a coding sub-unit may refer to a first area beside a first boundary (e.g., a left boundary) of the coding sub-unit and the second side of the coding sub-unit may refer to a second area beside a second boundary (e.g., an upper boundary) of the sub-coding unit. In some embodiments, for one of the plurality of regions, a side of the at least one coding sub-unit may refer to an area beside a boundary of the region.

In some embodiments, the first side and the second side of the at least one sub-coding unit may be physically adjacent rather than parallel to each other. For example, if the first side is the left side of the at least one sub-coding unit, the second side may be the upper side or a lower side of the at least one sub-coding unit, not a right side of the at least one sub-coding unit. In some embodiments, the first side and/or the second side of the at least one sub-coding unit may be determined based on an order of coding the image (e.g., a frame of a video). For example, if the order of coding the image is from the left to the right and from the top to the bottom, the first side may be the left side of the at least one sub-coding unit and the second side may be the upper side of the at least one sub-coding unit or the first side may be the upper side of the at least one sub-coding unit and the second side may be the left side of the at least one sub-coding unit.

In some embodiments, each of the one or more reference lines may include a first portion along the first side of the at least one coding sub-unit and a second portion along the second side of the at least one coding sub-unit. The first portion of a reference line may be parallel to the first boundary of the at least one coding sub-unit. The second portion of the reference line may be parallel to the second boundary of the at least one coding sub-unit. The first portion of the reference line may be connected physically with the second portion of the reference line. The first portion and the second portion that is connected with the first portion may form one of the one or more reference lines.

In some embodiments, the one or more reference lines may include a first reference line closest to the at least one coding sub-unit and one or more second reference lines other than the first reference line. In some embodiments, each of the one or more reference lines may be identified with an index (e.g., index 0, index1, index2, index3). The larger the index of a reference line is, the greater the distance between the reference line and the at least one coding sub-unit may be. In some embodiments, the index 0 may indicate the first reference line closest to the at least one coding sub-unit and the index>0 (e.g., index1, index2, index3) may indicate the one or more second reference lines.

In some embodiments, each of the one or more reference lines of the at least one coding sub-unit may include a plurality of reference pixels and the processing device 112 may determine a count (or a number) of the plurality of reference pixels in each of the one or more reference lines based on a size of the at least one coding sub-unit or a size of the coding unit. For example, for the single one of the plurality of coding sub-units, the processing device 112 may determine a count (or a number) of a plurality of reference pixels in the first portion of the reference line based on a height of the coding sub-unit or a height of the coding unit; the processing device 112 may determine a count (or a number) of the plurality of reference pixels in the second portion of the reference line based on a width of the coding sub-unit or a width of the coding unit. As another example, for one of the plurality of regions, the processing device 112 may determine a count (or a number) of the plurality of reference pixels in the first portion of the reference line based on a height of the region; the processing device 112 may determine a count (or a number) of the plurality of reference pixels in the second portion of the reference line based on a width of the region. More descriptions of the one or more reference lines of the at least one coding sub-unit may be found elsewhere in the present disclosure (e.g., FIGS. 11A-11C, FIGS. 16A-16C, and the descriptions thereof).

In some embodiments, for one of the plurality of the coding sub-units, the processing device 112 may determine whether the coding sub-unit is a target coding sub-unit. Further, the processing device 112 may determine, based on a determination whether the coding sub-unit is the target coding sub-unit, one or more reference lines of the coding sub-unit. In response to the determination that the coding sub-unit is the target coding sub-unit, the processing device 112 may determine the one or more reference lines of the coding sub-unit based on one or more reference lines of the coding unit. In response to the determination that the coding sub-unit is not the target coding sub-unit, the processing device 112 may determine the one or more reference lines of the coding sub-unit based on at least portion pixels in a previous coding sub-unit among the plurality of coding sub-units that has been involved an intra prediction prior to the coding sub-unit. More descriptions of determining the one or more reference lines of the coding sub-unit may be found elsewhere in the present disclosure (e.g., FIG. 9, FIG. 11, and the descriptions thereof).

In some embodiments, for one of the plurality of regions, the processing device 112 may determine the one or more reference lines of the region based on one or more reference lines of the at least one coding sub-unit included in the region. More descriptions of determining the one or more reference lines of the region may be found elsewhere in the present disclosure (e.g., FIG. 15, FIG. 16, and the descriptions thereof).

In 540, the processing device 112 (e.g., the MPM list determination module 440) (e.g., the processing circuits of the processor 220) may determine one or more MPM lists associated with at least one coding sub-unit.

In some embodiments, each of the one or more MPM lists may include at least one prediction mode. The at least one prediction mode may include a DC prediction mode, a planar prediction mode, an angle prediction mode, etc. The angle prediction mode may include a normal angle prediction mode and a wide angle prediction mode. In some embodiments, each normal angle prediction mode may correspond to a specific sequence number (e.g., 0-h illustrated in FIG. 13). For a specific coding sub-unit, whether one or more wide angle prediction modes are used to predict the coding sub-unit may be determined based at least in part on a size (e.g., a width, a height) of the coding sub-unit. For example, whether the one or more wide angle prediction modes are used to predict the coding sub-unit may be determined based on a ratio of the width of the coding sub-unit and the height of the coding sub-unit. In the above embodiments, the size of the coding sub-unit may be used to determine whether the one or more wide angle prediction modes are used to predict the coding sub-unit, thereby improving the compression performance of coding the image. More descriptions of the prediction modes may be found elsewhere in the present disclosure (e.g., FIG. 13 and the descriptions thereof).

In some embodiments, the determining the one or more MPM lists associated with the at least one coding sub-unit may include determining the one or more MPM lists corresponding to at least one of the at least one coding sub-unit. In some embodiments, for a specific coding sub-unit of the at least one coding sub-unit, and the processing device 112 may determine a first neighboring block (also referred to as a first adjacent block) and a second neighboring block (also referred to as a second adjacent block) associated with the specific coding sub-unit. Further, the processing device 112 may determine the one or more MPM lists corresponding to the specific coding sub-unit based on the first neighboring block and the second neighboring block. More descriptions of determining the one or more MPM lists for a specific coding sub-unit based on the first neighboring block and the second neighboring block of the specific coding sub-unit may be found elsewhere in the present disclosure (e.g., FIG. 12 and the descriptions thereof). As used herein, an MPM list corresponding to a specific coding sub-unit determined based on the first neighboring block and the second neighboring block of the specific coding sub-unit may also be referred to as an individualized MPM list.

In some embodiments, for the specific coding sub-unit of the at least one coding sub-unit, the processing device 112 may determine one or more MPM lists corresponding to one of the plurality of regions that includes the at least one coding sub-unit. The processing device 112 may designate the one or more MPM lists corresponding to the one of the plurality of regions as at least a portion of the one or more MPM lists corresponding to the specific coding sub-unit. As used herein, an MPM list corresponding to a specific coding sub-unit determined based on the one or more MPM lists corresponding to a region in a coding unit may also be referred to as a local MPM list. In some embodiments, the processing device 112 may determine a first adjacent block (e.g., L1 and L2 illustrated in FIG. 17A and FIG. 17B) closest to the one of the plurality of regions that includes the specific coding sub-unit along a first boundary of the one of the plurality of regions and a second adjacent block (e.g., A1 and A2 illustrated in FIG. 17A and FIG. 17B) closest to the one of the plurality of regions along a second boundary of the one of the plurality of regions. Further, the processing device 112 may determine one or more MPM lists corresponding to the one of the plurality of regions based on the first adjacent block and the second adjacent block and designate the one or more MPM lists corresponding to the one of the plurality of regions as the one or more MPM lists corresponding to the at least one coding sub-unit. More descriptions of determining the one or more MPM lists corresponding to the one of the plurality of regions may be found elsewhere in the present disclosure (e.g., FIG. 15 and the descriptions thereof).

In some embodiments, the MPM lists corresponding to a specific coding sub-unit may include one or more individualized MPM lists, one or more local MPM lists, or the like, or a combination thereof.

In some embodiments, the processing device 112 may determine the one or more MPM lists associated with the at least one coding sub-unit based on the division direction in the division mode of the coding unit. For example, when the division direction is a horizontal direction, the processing device 112 may determine the one or more MPM lists under the horizontal division. As another example, when the division direction is a vertical direction, the processing device 112 may determine the one or more MPM lists under the vertical division. As a further example, when the division direction is a horizontal direction and a vertical direction, the processing device 112 may determine the one or more MPM lists under the horizontal division and the vertical division.

In some embodiments, the one or more MPM lists of the at least one coding sub-unit (e.g., one of the plurality of coding sub-units, the one of the plurality of regions) may include at least one first MPM list corresponding to the first reference line (e.g., index 0) closest to the at least one coding sub-unit and at least one second MPM list corresponding to the one or more second reference lines (e.g., index>0) of the at least one coding sub-unit.

The processing device 112 may determine the at least one second MPM list corresponding to the one or more second reference lines of the at least one coding sub-unit based on the at least one first MPM list corresponding to the first reference line closest to the at least one coding sub-unit.

In some embodiments, the processing device 112 may directly designate the at least one first MPM list corresponding to the first reference line (e.g., index 0) closest to the at least one coding sub-unit as the at least one second MPM list corresponding to the one or more second reference lines (e.g., index>0) of the at least one coding sub-unit. For example, under the horizontal division or the vertical division, for one of the plurality of coding sub-units, the processing device 112 may determine a first MPM list corresponding to the first reference line (e.g., index 0) closest to the coding sub-unit index 0 based on the first neighboring block and the second neighboring block adjacent to the coding sub-unit. Further, the processing device 112 may designate the first MPM list as a second MPM list corresponding to the one or more second reference lines (e.g., index>0) of the coding sub-unit. As another example, under the horizontal division and the vertical division, for one of the plurality of coding sub-units, the processing device 112 may determine a first MPM list corresponding to the horizontal division and a first MPM list corresponding to the vertical division. Further, the processing device 112 may designate the first MPM list corresponding to the horizontal division and the first MPM list corresponding to the vertical division as second MPM lists corresponding to the one or more second reference lines (e.g., index>0) of the coding sub-unit.

In some embodiments, the processing device 112 may determine the at least one second MPM list corresponding to the one or more second reference lines (e.g., index>0) of the at least one coding sub-unit by modifying the at least one first MPM list corresponding to the first reference line (e.g., index 0) closest to the at least one coding sub-unit.

For example, it is assumed that the division direction is a horizontal direction and a count of prediction modes (indicated as MPM [0], MPM [1], MPM [1], MPM [2], MPM [3], MPM [4], MPM [5], etc.) in a first MPM list corresponding to the horizontal division is 6. When prediction modes of the first neighboring block (e.g., L, L1, L2, L3, and L4 illustrated in images 2, 4, 6, and 8 in FIGS. 14A-D, L1, L2 and L3 illustrated in FIG. 17B) and the second neighboring block (e.g., A, A1, A2, A3, and A4 illustrated in images 2, 4, 6, and 8 in FIGS. 14A-D, A1, A2, and A3 illustrated in FIG. 17B) are not angle prediction modes, the processing device 112 may modify the prediction modes in the first MPM list as MPM [0]=H and MPM [1]=H±1, wherein the H indicates a horizontal prediction mode (e.g., the prediction mode with a sequence number "18" illustrated in FIG. 13) and H±1 indicates a prediction mode with a sequence number adjacent to the sequence number of the horizontal prediction mode. When the prediction modes of the first neighboring block and the second neighboring block are the same and sequence numbers of the prediction modes are larger than or equal to 34, the processing device 112 may modify the planar prediction mode in the first MPM list as H±1. When one of the prediction modes of the first neighboring block and the second neighboring block is an angle prediction mode, the processing device 112 may remove the planar prediction mode in the first MPM list and add Max{L, A}−3 into a last position in the first MPM list, wherein the Max{L, A}−3 indicates a prediction mode with a sequence number that is equal to a difference between a maximum value of the sequence number of the first neighboring block L and the sequence number of the second neighboring block A and 3.

As another example, it is assumed that the division direction is a vertical direction and a count of prediction modes in a first MPM list corresponding to the vertical division is 6. When the prediction modes of the first neighboring block (e.g., L, L1, L2, L3, and L4 illustrated in images 1, 3, 5, and 7 in FIGS. 14A-D, L1 and L2 illustrated in FIG. 17A) and the second neighboring block (e.g., A, A1, A2, A3, and A4 in images 1, 3, 5, and 7 in FIGS. 14A-D, A1 and A2 illustrated in FIG. 17A) are not angle prediction modes, the processing device 112 may modify the prediction modes in the first MPM list as MPM [0]=V and MPM [1]=V±1, wherein the V indicates a vertical prediction mode (e.g., the prediction mode with a sequence number "50" illustrated in FIG. 13) and V±1 indicates a prediction mode with a sequence number adjacent to the sequence number of the vertical prediction mode. When the prediction modes of the first neighboring block and the second neighboring block are the same and sequence numbers of the prediction modes are larger than or equal to 2 and less than 34, the processing device 112 may modify the planar prediction mode in the first MPM list as V±1. When one of the prediction modes of the first neighboring block and the second neighboring block is an angle prediction mode, the processing device 112 may remove the planar prediction mode in the first MPM list and add Max{L, A}−3 into a last position in the first MPM list.

The processing device 112 may determine the at least one second MPM list corresponding to the one or more second reference lines (e.g., index>0) of the at least one coding sub-unit based on a global MPM list corresponding to the one or more second reference lines (e.g., index>0) of the coding unit. The one or more reference lines of the coding unit may also include a first reference line (e.g., TR1 and LR1 illustrated in FIG. 10) closest to the coding unit and one or more second reference lines (e.g., index>0) (e.g., TR2 and LR2, TR3 and LR3, TRm and LRm illustrated in FIG. 10) other than the first reference line closest to the coding unit. More descriptions of the one or more reference lines of the coding unit may be found elsewhere in the present disclosure (e.g., FIG. 10 and the descriptions thereof).

In some embodiments, for the at least one coding sub-unit (e.g., one of the plurality of coding sub-units, the one of the plurality of regions) in the coding unit, the processing device 112 may obtain a global MPM list corresponding to the one or more second reference lines (e.g., index>0) of the coding unit from a storage device (e.g., the storage device 150). The global MPM list corresponding to the one or more second reference lines (e.g., index>0) of the coding unit may be determined under a non-ISP mode. The intra prediction of the coding unit under the non-ISP mode may refer to the coding unit is predicted as a whole instead of being divided into the plurality of coding sub-units. It is assumed that a count of prediction modes in the global MPM list is 6, the global MPM list may be shown in Table 1.

TABLE 1

| | Condition | MPM[0] | MPM[1] | MPM[2] | MPM[3] | MPM[4] | MPM[5] |
|---|---|---|---|---|---|---|---|
| | L < 2 & A < 2 | V | H | 2 | 34 | 66 | 26 |
| L = A | L ≥ 2 | L | L − 1 | L + 1 | L − 2 | L + 2 | L − 3 |
| L ≠ A | \|L − A\| = 1 & Min{L, A} ≥ 2 | L | A | Min{L, A} − 1 | Max{L, A} + 1 | Min{L, A} − 2 | Max{L, A} + 2 |
| | \|L − A\| = 2 & Min{L, A} ≥ 2 | L | A | Min{L, A} + 1 | Min{L, A} − 1 | Max{L, A} + 1 | Min{L, A} − 2 |
| | \|L − A\| ≥ 62 & Min{L, A} ≥ 2 | L | A | Min{L, A} + 1 | Max{L, A} − 1 | Min{L, A} + 2 | Max{L, A} − 2 |
| | 2 < \|L − A\| < 62 & Min{L, A} ≥ 2 | L | A | Min{L, A} − 1 | Min{L, A} + 1 | Max{L, A} + 1 | Max{L, A} + 1 |
| | L + A ≥ 2 & Min{L, A} < 2 | Max{L, A} | Max{L, A} − 1 | Max{L, A} + 1 | Max{L, A} − 2 | Max{L, A} + 2 | Max{L, A} − 3 |

There may be no DC mode in the global MPM list. In the table 1, A indicates the prediction mode of the second neighboring block (e.g., A, A1, A2, A3, and A4 illustrated in FIGS. 14A-D), L indicates the prediction mode of the first neighboring block (e.g., L, L1, L2, L3, and L4 illustrated in FIGS. 14A-D), V indicates the vertical prediction mode (e.g., the prediction mode with a sequence number "50" illustrated in FIG. 13), and H indicates the horizontal prediction mode (e.g., the prediction mode with a sequence number "18" illustrated in FIG. 13). Signs+/−indicates adding a certain value to or subtracting a certain value from a sequence number of a prediction mode. In particular, prediction modes with sequence numbers "66±1" may indicate a prediction mode with a sequence number "3" and a prediction mode with a sequence number "65", respectively, and prediction modes with sequence numbers "2±1" may indicate a prediction mode with a sequence number "65" and a prediction mode with a sequence number "3", respectively.

In some embodiments, the processing device 112 may designate the global MPM list corresponding to the one or more second reference lines (e.g., index>0) of the coding unit as a second MPM list corresponding to the one or more second reference lines (e.g., index>0) of the at least one coding sub-unit.

Additionally or alternatively, the processing device 112 may determine the at least one second MPM list corresponding to the one or more second reference lines (e.g., index>0) of the at least one coding sub-unit by modifying the global MPM list corresponding to the one or more second reference lines (e.g., index>0) of the coding unit. For example, it is assumed that a count of prediction modes in a global MPM list is 6. When the prediction modes of the first neighboring block and the second neighboring block are not angle prediction modes, if the division direction corresponding to the at least one coding sub-unit is a horizontal direction, the processing device 112 may modify prediction modes in the global MPM list as MPM [0]=H and MPM [1]=V.

In 550, the processing device 112 (e.g., the prediction mode determination module 450) (e.g., the processing circuits of the processor 220) may determine a target prediction mode corresponding to the at least one coding sub-unit (e.g., one of the plurality of coding sub-units, the one of the plurality of regions) based on the one or more MPM lists.

In some embodiments, the processing device 112 may determine a target candidate list associated with the at least one coding sub-unit based on the one or more MPM lists. The target candidate list may include a plurality of prediction modes for the at least one coding sub-unit. For example, the processing device 112 may determine an initial candidate list associated with the at least one coding sub-unit. The processing device 112 may determine an intermediate candidate list associated with the at least one coding sub-unit by updating the initial candidate list based on adjacent prediction modes of each of prediction modes in the initial candidate list. The processing device 112 may determine the target candidate list corresponding to the at least one coding sub-unit by updating the intermediate candidate list based on the one or more MPM lists. More descriptions of determining the target candidate list may be found elsewhere in the present disclosure (e.g., FIG. 18 and the descriptions thereof). Further, the processing device 112 may determine the target prediction mode corresponding to each of the at least one coding sub-unit based on the target candidate list. In some embodiments, the processing device 112 may determine RD costs corresponding to one or more prediction modes in the target candidate list and select a prediction mode with the smallest RD cost from the one or more prediction modes in the target candidate mode list as the target prediction mode corresponding to each of the at least one coding sub-unit.

In some embodiments, the processing device 112 may use a syntax element to indicate a location of the target prediction mode corresponding to the at least one coding sub-unit in the one or more MPM lists and store the syntax element into the storage device 150. In subsequent operations, the processing device 112 may read the syntax element to determine the target prediction mode from the one or more MPM lists.

In 560, the processing device 112 (e.g., the prediction module 460) (e.g., the processing circuits of the processor 220) may determine a predicted coding sub-unit corresponding to each of the at least one coding sub-unit based on the target prediction mode.

In some embodiments, the processing device 112 may determine whether a filtering condition is satisfied. In response to determining that the filtering condition is satisfied, the processing device 112 may perform a filtering operation on the plurality of reference pixels of each of the one or more reference lines corresponding to at least one the coding sub-unit to obtain filtered reference pixels. Further, the processing device 112 may determine the predicted coding sub-unit corresponding to each of the at least one coding sub-unit based on the target prediction mode and the filtered reference pixels. More descriptions of performing the filtering operation on the plurality of reference pixels may be found elsewhere in the present disclosure (e.g., FIG. 19 and the descriptions thereof).

In some embodiments, when the at least one coding sub-unit includes one single of the plurality of coding sub-units, for each of the at least one pixel in the one single coding sub-unit, the processing device 112 may determine a predicted value of the pixel based on the target prediction mode and the one or more reference lines corresponding to the one single coding sub-unit. Further, the processing device 112 may determine the predicted coding sub-unit corresponding to the one single coding sub-unit based on predicted value of the at least one pixel in the one single coding sub-unit.

In some embodiments, the at least one coding sub-unit may include multiple coding sub-units in one of the plurality of regions, the target prediction mode may correspond to each of the multiple coding sub-units included in the region. In this embodiments, the processing device 112 may determine the predicted coding sub-unit corresponding to each of the multiple coding sub-units in the region based on the target prediction mode and the one or more reference lines corresponding to the region.

In some embodiments, for each of the at least one pixel in each of the at least one coding sub-unit, the processing device 112 may determine a predicted value of the pixel by projecting the pixel onto the one or more reference lines corresponding to the at least one coding sub-unit along a prediction direction of the target prediction mode. For example, for each of the one or more reference lines corresponding to the at least one coding sub-unit, if a projection location of the pixel in the reference line is located at a reference pixel, the processing device 112 may determine a projected predicted value of the pixel to be a pixel value of the reference pixel; if the projection location of the pixel in the reference line is located between two adjacent reference pixels, the processing device 112 may determine the projected predicted value of the pixel to be an interpolation result of pixel values of the two adjacent reference pixels. Further, the processing device 112 may determine the predicted value of the pixel based on projected predicted values of the pixel corresponding to the one or more reference lines corresponding to the at least one coding sub-unit.

In some embodiments, for each of the at least one pixel in each of the at least one coding sub-unit, the processing device 112 may determine a preliminary predicted value of the pixel along a prediction direction of the target prediction mode based on the one or more one or more reference lines of the coding sub-unit. Further, the processing device 112 may perform a compensation operation on the preliminary predicted value of the pixel to determine the predicted value of the pixel. For example, the processing device 112 may determine whether the pixel is within a compensation region. The compensation region may be determined based on the target prediction mode and the size of the coding sub-unit. In response to determining that the pixel is within a compensation region, the processing device 112 may determine a compensation value of the pixel along an opposite direction of the prediction direction based on the one or more one or more reference lines of the coding sub-unit. In response to determining that the pixel is not within a compensation region, the processing device 112 may designate the preliminary predicted value of the pixel as a predicted value of the pixel. According to the preliminary predicted value and the compensation predicted value of the pixel, the processing device 112 may determine the predicted value of the pixel.

Additionally or alternatively, the processing device 112 may determine whether a size of the coding sub-unit is larger than a size threshold. As used herein, the size threshold may be a default setting of the image coding system 100 or may be adjustable under different situations. In response to determining that the size of the coding sub-unit is larger than the size threshold, the processing device 112 may perform the compensation operation on the preliminary predicted value of the pixel as described above. In response to determining that the size of the coding sub-unit is less than or equal to the size threshold, the processing device 112 may designate the preliminary predicted value of the pixel as the predicted value of the pixel.

Additionally or alternatively, the processing device 112 may whether the target prediction mode is within a mode range. As used herein, the mode range may be a default setting of the image coding system 100 or may be adjustable under different situations. In response to determining that the target prediction mode is within the mode range, the processing device 112 may perform the compensation operation on the preliminary predicted value of the pixel as described above. In response to determining that the target prediction mode is not within the mode range, the processing device 112 may designate the preliminary predicted value of the pixel as the predicted value of the pixel.

In some embodiments, for each of the at least one pixel in each of the at least one coding sub-unit, the processing device 112 may determine a reconstructed value of the pixel based on a raw value of the pixel and the predicted value of the pixel. For example, the processing device 112 may determine a difference between the raw value of the pixel and the predicted value of the pixel and further process (e.g., compression processing and decoding processing) the difference to obtain the processed difference. The processing device 112 may determine a sum of the processed difference and the predicted value of the pixel as the reconstructed value of the pixel. Further, the processing device 112 may determine the predicted coding sub-unit corresponding to each of the at least one coding sub-unit based on reconstructed value of the at least one pixel in each of the at least one coding sub-unit.

In 570, the processing device 112 (e.g., the prediction module 460) (e.g., the processing circuits of the processor 220) may determine a predicted coding unit corresponding to the coding unit based at least in part on the predicted coding sub-unit.

In some embodiments, the processing device 112 may generate a coded image corresponding to the image based on predicted coding units corresponding to a plurality of coding units in the image and transmit the coded image to one or more components (e.g., the user device 140, the storage device 150) of the image coding system 100 to be further processed. For example, after receiving the coded image, the user device 140 may decode the coded image and display the decoded image.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the process 500. In the storing operation, the processing device 112 may store information and/or data (e.g., the coding unit, the plurality of coding sub-units, the one or more MPM lists, the target prediction mode, the predicted coding sub-unit corresponding to each of the at least one coding sub-unit, the predicted coding unit corresponding to the coding unit) associated with the image coding in a storage device (e.g., the storage device 150) disclosed elsewhere in the present disclosure. As another example, operation 560 and operation 570 may be combined into a single operation in which the processing device 112 may determine the predicted coding sub-unit corresponding to each of the at least one coding sub-unit and the predicted coding unit corresponding to the coding unit.

FIGS. 6A-8 are schematic diagrams illustrating exemplary divisions of a coding unit according to some embodiments of the present disclosure. As described in connection with operation 510, the processing device 112 may divide the coding unit into the plurality of coding sub-units based on a division mode and the division mode may be defined by one or more division parameters including a division direction (e.g., a horizontal direction, a vertical direction, a horizontal direction and a vertical direction), a count of the plurality of coding sub-units, a ratio of lengths of two adjacent boundaries of the coding sub-units, a size of each of the plurality of coding sub-units, or the like, or any combination thereof.

Figure 6A:
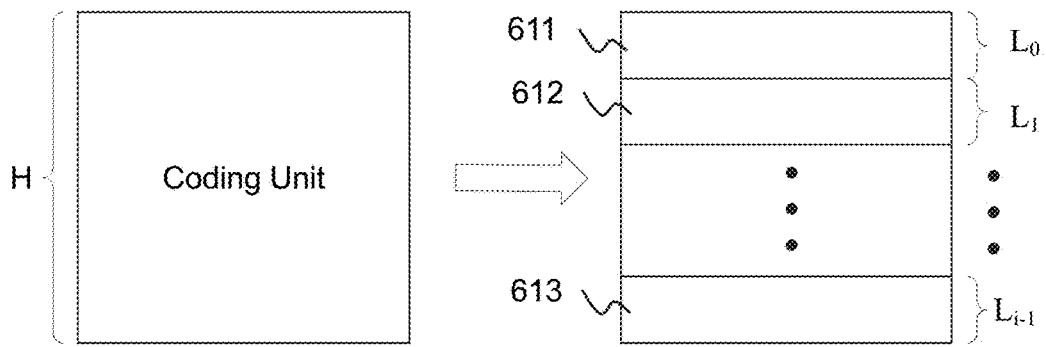
FIGS. 6A-6F are schematic diagrams illustrating exemplary divisions of a coding unit according to some embodiments of the present disclosure.

As illustrated in FIG. 6A, it is assumed that a height (denoted as "H") of the coding unit is equal to $2^n$ (n=2, 3, 4, 5, 6, . . . ) and a division direction is the horizontal direction, the coding unit may be divided into i (i=2, 3, 4, . . . , H) coding sub-units (e.g., 611, 612, 613) and heights (e.g., lengths of right boundaries) of the i coding sub-units arranged from top to bottom are $L_0, L_1, \ldots, L_{i-1}$ ($L_0$~$L_{i-1}$ are positive integers).

Figure 6B:
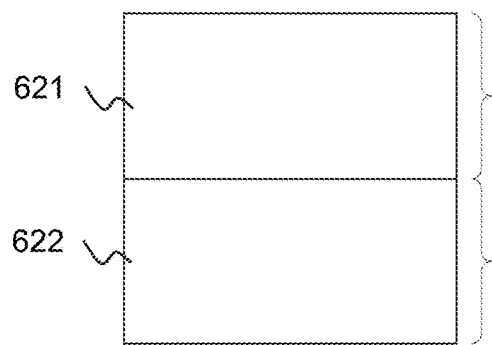
Figure 6C:
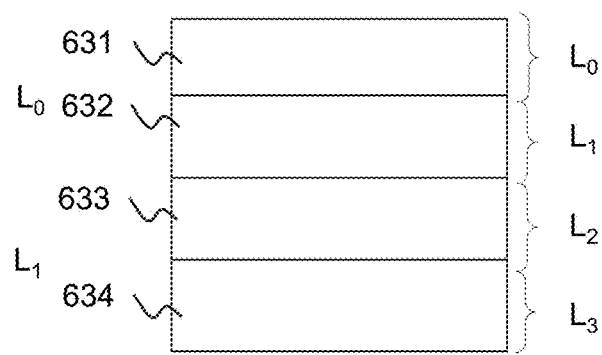

In some embodiments, the heights of the i coding sub-units may be equal (i.e., $L_0=L_1=\ldots=L_{i-1}$) and a ratio of the heights of the i coding sub-units is 1: 1: . . . : 1. For example, as illustrated in FIG. 6B, the coding unit is divided into two (i.e., i equal to 2) coding sub-units 621 and 622, a height of the coding sub-unit 621 is equal to a height of the coding sub-unit 622 (i.e., $L_0=L_1$), and a ratio of the height of the coding sub-unit 621 and the height of the coding sub-unit 622 is 1:1. The ratio of the height of the coding sub-unit 621 (or the height of the coding sub-unit 622) and the height H of the coding unit is 1:2. As another example, as illustrated in FIG. 6C, the coding unit is divided into four (i.e., i equal to 4) coding sub-units 631, 632, 633, and 634, the heights of the four coding sub-units 631, 632, 633, and 634 are equal (i.e., $L_0=L_1=L_2=L_3$), and a ratio of the heights of the four coding sub-units 631, 632, 633, and 634 is 1:1:1:1. The ratio of the height of the coding sub-unit 631 (or the height of the coding sub-unit 632, or the height of the coding sub-unit 633, or the height of the coding sub-unit 634) and the height H of the coding unit is 1:4.

Figure 6D:
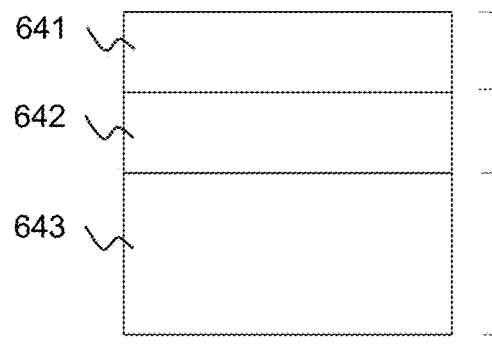
Figure 6E:
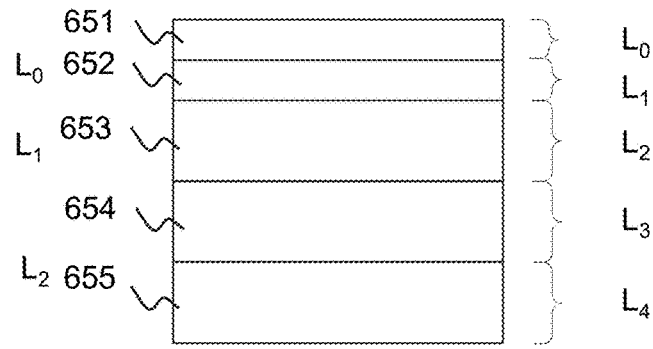
Figure 6F:
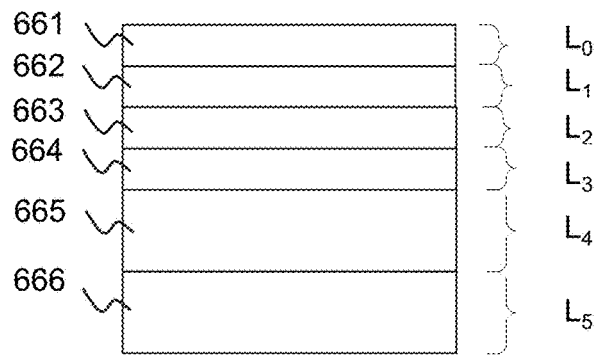

In some embodiments, the heights of at least two of the i coding sub-units may be not equal and the ratio of the heights of the i coding sub-units may be adjustable under different situations. For example, as illustrated in FIG. 6D, the coding unit is divided into three (i.e., i equal to 3) coding sub-units 641, 642, and 643, the heights of the coding sub-units 641 and 642 are equal (i.e., $L_0=L_1$), a height of any one of the coding sub-units 641 and 642 is not equal to a height of the coding sub-units 643 (i.e., $L_0 \neq L_2$, $L_1 \neq L_2$), and a ratio of the heights of the three coding sub-units 641, 642, and 643 is 1:1:2. As another example, as illustrated in FIG. 6E, the coding unit is divided into five (i.e., i equal to 5) coding sub-units 651, 652, 653, 654, and 655, the heights of the coding sub-units 651 and 652 are equal (i.e., $L_0=L_1$), the heights of the coding sub-units 653, 654, and 655 are equal (i.e., $L_2=L_3=L_4$), a height of any one of the coding sub-units 651 and 652 is not equal to a height of any one of the coding sub-units 653, 654, and 655, and a ratio of the heights of the five coding sub-units 651, 652, 653, 654, and 655 is 1:1:2:2:2. As a further example, as illustrated in FIG. 6F, the coding unit is divided into six (i.e., i equal to 6) coding sub-units 661, 662, 663, 664, 665, and 666, the heights of the coding sub-units 661, 662, 663, and 664 are equal (i.e., $L_0=L_1=L_2=L3$), the heights of the coding sub-units 665 and 666 are equal (i.e., $L_4=L_5$), a height of any one of the coding sub-units 661, 662, 663, and 664 is not equal to a height of any one of the coding sub-units 665 and 666, and a ratio of the heights of the six coding sub-units 661, 662, 663, 664, 665, and 666 is 1:1:1:1:2:2.

Figure 7A:
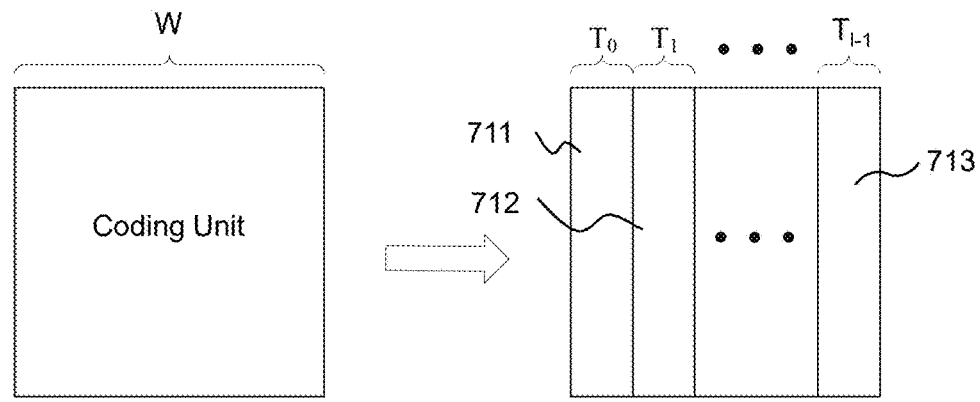
FIGS. 7A-7F are schematic diagrams illustrating exemplary divisions of a coding unit according to some embodiments of the present disclosure.

As illustrated in FIG. 7A, it is assumed that a width (denoted as "W") of the coding unit is equal to $2^m$ (m=2, 3, 4, 5, 6, . . . ) and a division direction is the vertical direction, the coding unit may be divided into l (l=2, 3, 4, . . . , W) coding sub-units (e.g., 711, 712, 713) and widths (e.g., lengths of upper boundaries) of the l coding sub-units arranged from left to right are $T_0, T_1, \ldots, T_{l-1}$ ($T_0 \cdot T_{l-1}$ are positive integers).

Figure 7B:
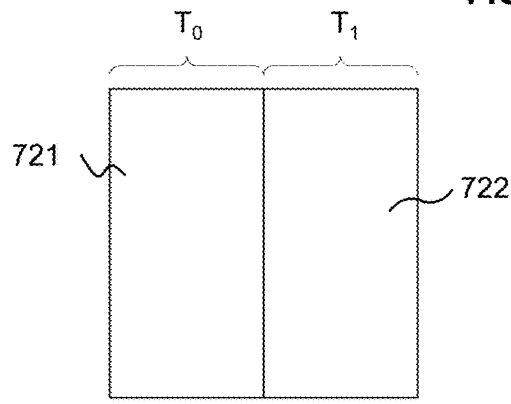
Figure 7C:
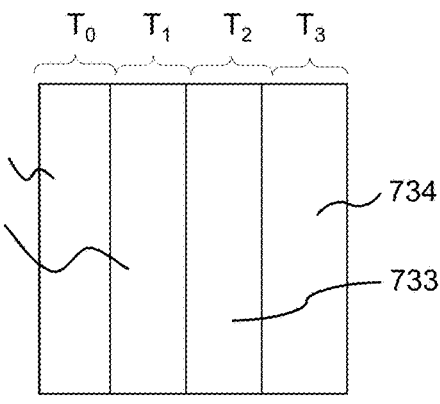

In some embodiments, the widths of the l coding sub-units may be equal (i.e., $T_0=T_1=\ldots=T_{l-1}$) and a ratio of the widths of the l coding sub-units is 1: 1: . . . : 1. For example, as illustrated in FIG. 7B, the coding unit is divided into two (i.e., l equal to 2) coding sub-units 721 and 722, a width of the coding sub-unit 721 is equal to a width of the coding sub-unit 722 (i.e., $T_0=T_1$), and a ratio of the width of the coding sub-unit 721 and the width of the coding sub-unit 722 is 1:1. The ratio of the width of the coding sub-unit 721 (or the width of the coding sub-unit 722) and the width of the coding unit is 1:2. As another example, as illustrated in FIG. 7C, the coding unit is divided into four (i.e., l equal to 4) coding sub-units 731, 732, 733, and 734, the widths of the four coding sub-units 731, 732, 733, and 734 are equal (i.e., $T=T_1=T_2=T_3$), and a ratio of the widths of the four coding sub-units 731, 732, 733, and 734 is 1:1:1:1. The ratio of the width of the coding sub-unit 731 (or the width of the coding sub-unit 732, or the width of the coding sub-unit 733, or the width of the coding sub-unit 734) and the width W of the coding unit is 1:4.

Figure 7D:
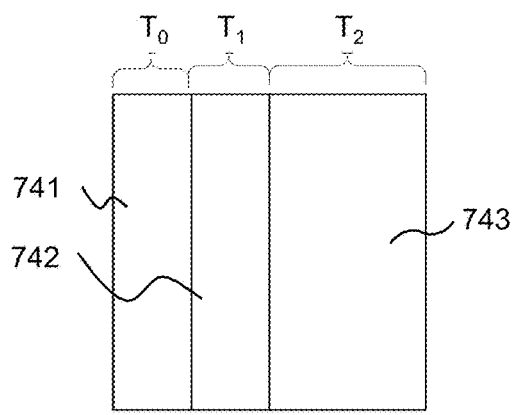
Figure 7E:
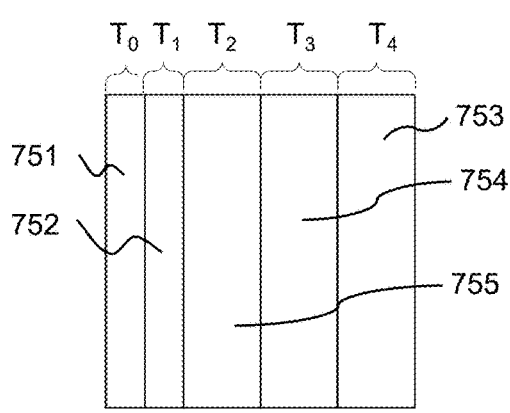
Figure 7F:
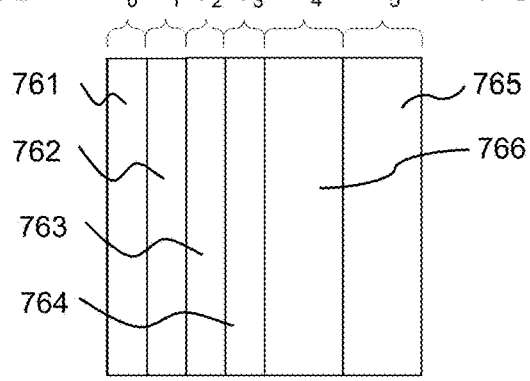

In some embodiments, the widths of at least two of the l coding sub-units may be not equal and the ratio of the widths of the l coding sub-units may be adjustable under different situations. For example, as illustrated in FIG. 7D, the coding unit is divided into three (i.e., l equal to 3) coding sub-units 741, 742, and 743, the widths of the coding sub-units 741 and 742 are equal (i.e., $T_0=T_1$), a width of any one of the coding sub-units 741 and 742 is not equal to a width of the coding sub-units 743 (i.e., $T_0 \neq T_2, T_1 \neq T_2$), and a ratio of the widths of the three coding sub-units 741, 742, and 743 is 1:1:2. As another example, as illustrated in FIG. 7E, the coding unit is divided into five (i.e., l equal to 5) coding sub-units 751, 752, 753, 754, and 755, the widths of the coding sub-units 751 and 752 are equal (i.e., $T_0=T_1$), the widths of the coding sub-units 753, 754, and 755 are equal (i.e., $T_2=T_3=T_4$), a width of any one of the coding sub-units 751 and 752 is not equal to a width of any one of the coding sub-units 753, 754, and 755, and a ratio of the widths of the five coding sub-units 751, 752, 753, 754, and 755 is 1:1:2:2:2. As a further example, as illustrated in FIG. 7F, the coding unit is divided into six (i.e., l equal to 6) coding sub-units 761, 762, 763, 764, 765, and 766, the widths of the coding sub-units 761, 762, 763, and 764 are equal (i.e., $T_0=T_1=T_2=T_3$), the widths of the coding sub-units 765 and 766 are equal (i.e., $T_4=T_5$), a width of any one of the coding sub-units 761, 762, 763, and 764 is not equal to a width of any one of the coding sub-units 765 and 766, and a ratio of the widths of the six coding sub-units 761, 762, 763, 764, 765, and 766 is 1:1:1:1:2:2.

Figure 8:
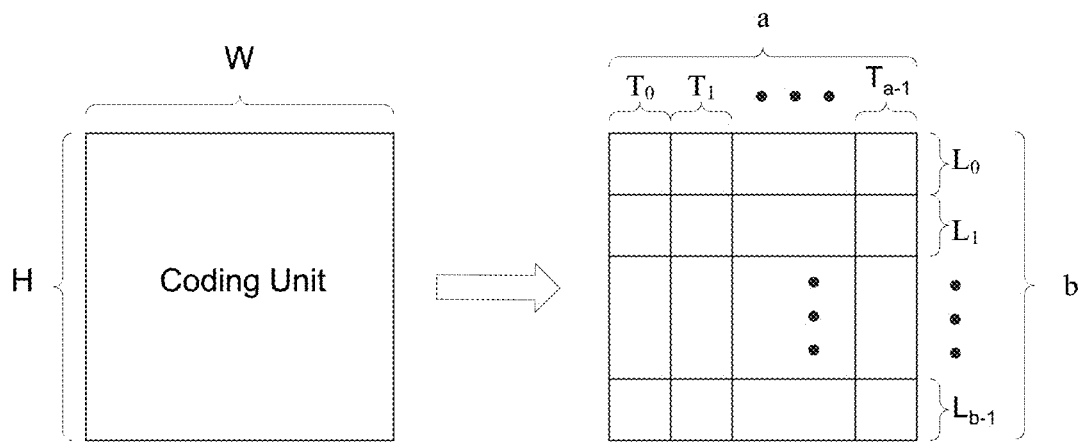
FIG. 8 is a schematic diagram illustrating exemplary division of a coding unit according to some embodiments of the present disclosure.

As illustrated in FIG. 8, it is assumed that a height (denoted as "H") of the coding unit is equal to $2^n$ (n=2, 3, 4, 5, 6, . . . ), a width (denoted as "W") of the coding unit is equal to $2^m$ (m=2, 3, 4, 5, 6, . . . ), and a division direction of the coding unit is the horizontal direction and the vertical direction, the coding unit may be divided into j (j=a*b) (a=2, 3, 4, . . . , W and b=2, 3, 4, . . . , H) coding sub-units. The heights (e.g., lengths of right boundaries) of the j coding sub-units arranged from top to bottom are $L_0, L_1, \ldots, L_{b-1}$ ($L_0 \sim L_{b-1}$ are positive integers). The widths (e.g., lengths of upper boundaries) of the j coding sub-units arranged from left to right are $T_0, T_1, \ldots, T_{a-1}$ ($T_0 \sim T_{a-1}$ are positive integers). In some embodiments, the heights of the j coding sub-units are equal (i.e., $L_0=L_1=\ldots=L_{b-1}$) and a ratio of the heights of the j coding sub-units is 1: 1: . . . : 1. Additionally or alternatively, the heights of at least two of the j coding sub-units may be not equal and the ratio of the heights of the j coding sub-units may be adjustable under different situations. In some embodiments, the widths of the j coding sub-units are equal (i.e., $T_0=T_1=\ldots=T_{a-1}$) and a ratio of the widths of the j coding sub-units is 1: 1: . . . : 1. Additionally or alternatively, the widths of at least two of the j coding sub-units may be not equal and the ratio of the widths of the j coding sub-units may be adjustable under different situations.

Figure 9:
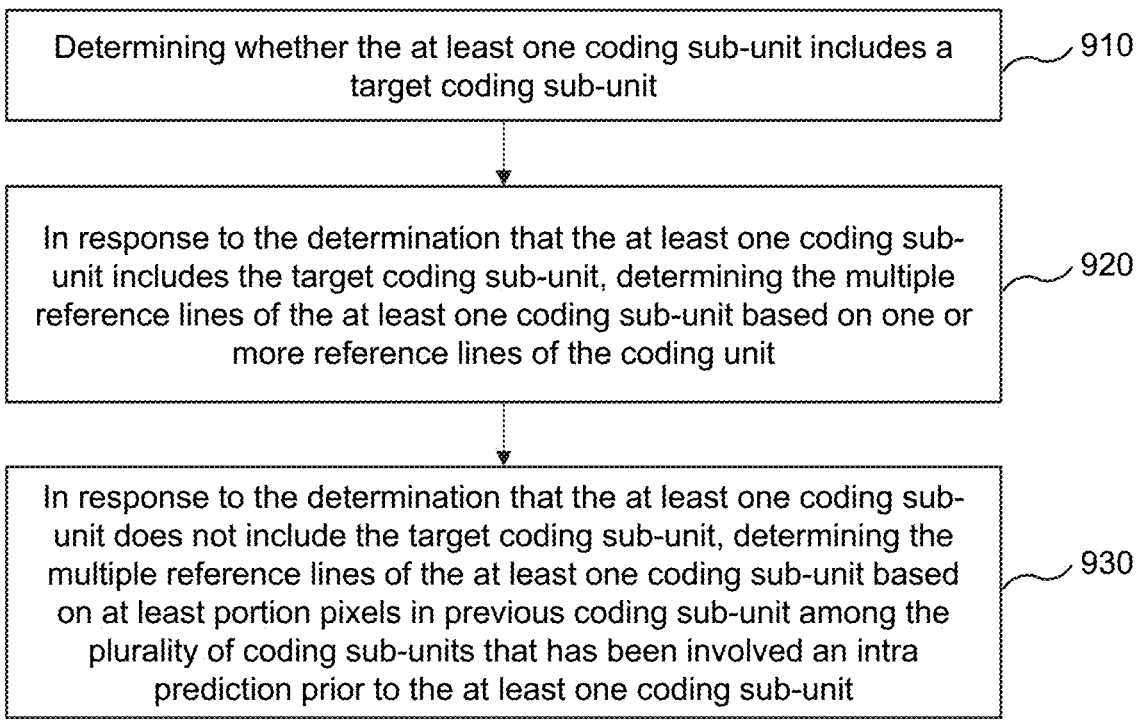
FIG. 9 is a flowchart illustrating an exemplary process for determining one or more reference lines of a coding sub-unit according to some embodiments of the present disclosure.

FIG. 9 is a flowchart illustrating an exemplary process for determining one or more reference lines of a coding sub-unit according to some embodiments of the present disclosure. In some embodiments, the process 900 may be implemented as a set of instructions (e.g., an application) stored in the storage ROM 230 or RAM 240. The processor 220 and/or the modules in FIG. 9 may execute the set of instructions, and when executing the instructions, the processor 220 and/or the modules may be configured to perform the process 900. The operations of the illustrated process presented below are intended to be illustrative. In some embodiments, the process 900 may be accomplished with one or more additional operations not described and/or without one or more of the operations herein discussed. Additionally, the order in which the operations of the process as illustrated in FIG. 9 and described below is not intended to be limiting. In some embodiments, the processing device 112 may perform operation 530 of the process 500 in FIG. 5 based on the process 900.

In 910, for one of the plurality of coding sub-units, the processing device 112 (e.g., the reference line determination module 430) (e.g., the processing circuits of the processor 220) may determine whether the coding sub-unit is a target coding sub-unit.

As used herein, the target coding sub-unit may refer to a coding sub-unit that is first predicted in the plurality of coding sub-units. For example, it is assumed that the order of coding the image is from the left to the right and from the top to the bottom. When the division direction of the coding unit is the horizontal direction, the prediction direction of the plurality of coding sub-units may be from the top to the bottom of the coding unit and the target coding sub-unit may be a coding sub-unit closest to an upper boundary of the coding unit. When the division direction of the coding unit is the vertical direction, the prediction direction of the plurality of coding sub-units may be from the left to the right of the coding unit and the target coding sub-unit may be a coding sub-unit closest to a left boundary of the coding unit. When the division direction of the coding unit is the horizontal direction and the vertical direction, the prediction direction of the plurality of coding sub-units may be from the left to the right and from the top to the bottom of the coding unit and the target coding sub-unit is a coding sub-unit located at a top left corner of the coding unit. Further, the processing device 112 may determine the one or more reference lines of the coding sub-unit based on a determination whether the coding sub-unit is the target coding sub-unit.

In 920, in response to the determination that the coding sub-unit is the target coding sub-unit, the processing device 112 (e.g., the reference line determination module 430) (e.g., the processing circuits of the processor 220) may determine the one or more reference lines of the coding sub-unit based on one or more reference lines of the coding unit. The one or more reference lines of the coding unit may be along a first boundary (e.g., a left boundary) and a second boundary (e.g., an upper boundary) of the coding unit. Each of the one or more reference lines of the coding unit may include a first portion along the first boundary of the coding unit and a second portion along the second boundary of the coding unit. For example, a reference line of a coding unit may include a first portion and a second portion with the same index (e.g., index 0) that are distributed along two adjacent boundaries (e.g., the left boundary and the upper boundary) of the coding unit, respectively. The first portion and the second portion of the reference line of the coding unit may be connected to form the integrated reference line of the coding unit. More descriptions of the one or more reference lines of the coding unit may be found elsewhere in the present disclosure (e.g., FIG. 10 and the descriptions thereof).

In some embodiments, the processing device 112 may designate the one or more reference lines of the coding unit as the one or more reference lines of the coding sub-unit. Additionally or alternatively, for each of the one or more reference lines of the coding unit, the processing device 112 may select a portion of the reference line of the coding unit as a reference line of the coding sub-unit corresponding to the reference line of the coding unit.

For example, when the division direction of the coding unit is the horizontal direction, the processing device 112 may designate a second portion of a reference line of the coding unit along the upper boundary of the coding unit as a second portion of a reference line of the coding sub-unit along the upper boundary of the coding sub-unit. Further, the processing device 112 may select a certain number or count (e.g., 2*height of the coding sub-unit) of reference pixels distributed along the left boundary of the coding sub-unit from a first portion of a reference line of the coding unit along the left boundary of the coding unit as a first portion of a reference line of the coding sub-unit along the left boundary of the coding sub-unit. The certain number may be a default setting (e.g., n*height of the coding sub-unit, n*width of the coding sub-unit, n is a positive integer) of the image coding system 100 or may be adjustable (e.g., adjusted according to a height or a width of the coding sub-unit) under different situations. Each reference line in the second portion of the one or more reference lines of the coding sub-unit along the boundary of the coding sub-unit corresponds to a respective one of reference lines in the first portion of the one or more reference lines of the coding sub-unit along the upper boundary of the coding sub-unit.

As another example, when the division direction of the coding unit is the vertical direction, the processing device 112 may designate a first portion of a reference line of the coding unit along the left boundary of the coding unit as a first portion of a reference line of the coding sub-unit along the left boundary of the coding sub-unit. Further, the processing device 112 may select a certain number or count (e.g., 2*width of the coding sub-unit) of reference pixels distributed along the upper boundary of the coding sub-unit from a second portion of a reference line of the coding unit along the boundary of the coding unit as a second portion of a reference line of the coding sub-unit along the upper boundary of the coding sub-unit.

As a further example, when the division direction of the coding unit is the horizontal direction and the vertical direction, the processing device 112 may select a certain number or count (e.g., 2*height of the coding sub-unit) of reference pixels distributed along the left boundary of the coding sub-unit from a first portion of a reference line of the coding unit along the left boundary of the coding unit as a first portion of a reference line of the coding sub-unit along the left boundary of the coding sub-unit. Further, the processing device 112 may select a certain number or count (e.g., 2*width of the coding sub-unit) of reference pixels distributed along the upper boundary of the coding sub-unit from a second portion of a reference line of the coding unit along the upper boundary of the coding unit as a second portion of a reference line of the coding sub-unit along the upper boundary of the coding sub-unit.

In 930, in response to the determination that the coding sub-unit is not the target coding sub-unit, the processing device 112 (e.g., the reference line determination module 430) (e.g., the processing circuits of the processor 220) may determine the one or more reference lines of the coding sub-unit based on at least portion pixels in a previous coding sub-unit among the plurality of coding sub-units that has been involved an intra prediction prior to the coding sub-unit. For example, the previous coding sub-unit of a specific coding sub-unit may refer to a coding sub-unit that is predicted before the current specific coding sub-unit according to a prediction direction and is adjacent to the specific coding unit.

In some embodiments, the processing device 112 may determine the one or more reference lines of the coding sub-unit based on predicted values of the at least portion pixels in the previous coding sub-unit. The processing device 112 may obtain a predicted value of each of the at least portion pixels in the previous coding sub-unit from a storage device (e.g., the storage device 150).

For example, when the division direction of the coding unit is the horizontal direction, the processing device 112 may select a certain number or count (e.g., 2*height of the coding sub-unit) of reference pixels distributed along the left boundary of the coding sub-unit from a first portion of a reference line of the coding unit along the left boundary of the coding unit as a first portion of a reference line of the coding sub-unit along the left boundary of the coding sub-unit. Further, the processing device 112 may select a row of pixels in the previous coding sub-unit as a second portion of a reference line of the coding sub-unit along the upper boundary of the coding sub-unit and designate predicted values of the row of pixels as pixel values of reference pixels in the second portion of the reference line of the coding sub-unit along the upper boundary of the coding sub-unit. Each of one or more rows of pixels in the previous coding sub-unit may correspond to the second portion of one of the one or more reference lines of the coding sub-unit. The determined first portion and the second portion may form a reference line of the coding sub-unit.

As another example, when the division direction of the coding unit is the vertical direction, the processing device 112 may select a certain number or count (e.g., 2*width of the coding sub-unit) of reference pixels distributed along the upper boundary of the coding sub-unit from a second portion of a reference line of the coding unit along the upper boundary of the coding unit as a second portion of a reference line of the coding sub-unit along the upper boundary of the coding sub-unit. Further, the processing device 112 may select a column of pixels in the previous coding sub-unit as a first portion of a reference line of the coding sub-unit along the left boundary of the coding sub-unit and designate predicted values of the column of pixels as pixel values of reference pixels in the first portion of the reference line of the coding sub-unit along the left boundary of the coding sub-unit. Each of one or more columns of pixels in the previous coding sub-unit may correspond to the first portion of one of the one or more reference lines of the coding sub-unit.

As a further example, when the division direction of the coding unit is the horizontal direction and the vertical direction, the processing device 112 may select a row of pixels in the previous coding sub-unit as a second portion of a reference line of the coding sub-unit along the upper boundary of the coding sub-unit and designate predicted values of the row of pixels as pixel values of reference pixels in the second portion of the reference line of the coding sub-unit along the upper boundary of the coding sub-unit. Further, the processing device 112 may select a column of pixels in the previous coding sub-unit as a first portion of a reference line of the coding sub-unit along the left boundary of the coding sub-unit and designate predicted values of the column of pixels as pixel values of reference pixels in the first portion of the reference line of the coding sub-unit along the left boundary of the coding sub-unit.

In some embodiments, the processing device 112 may determine whether a size parameter of the coding unit is larger than a threshold. The processing device 112 may determine the size parameter of the coding unit based on a width and a height of the coding unit. For example, the processing device 112 may determine the size parameter of the coding unit according to formula (2) below:

$$S = (\log 2W + \log 2H) >> 1 \quad (2),$$

where S refers to the size parameter of the coding unit, W refers to the width of the coding unit, H refers to the height of the coding unit, and >> refers to a right shift operator, the left of >> is an object to be shift right, and the right of >> is a right shift digit. In some embodiments, the threshold (denoted as v) may be a default setting (e.g., $3 \leq v \leq 6$) of the image coding system 100 or may be adjustable under different situations.

Further, the processing device 112 may determine the one or more reference lines of the coding sub-unit based on a determination whether the size parameter of the coding unit exceeds the threshold and the at least portion pixels in the previous coding sub-unit. In response to the determination that the size parameter of the coding unit is less than or equal to the threshold, the processing device 112 may determine the one or more reference lines of the coding sub-unit based on the predicted values of the at least portion pixels in the previous coding sub-unit. In response to the determination that the size parameter of the coding unit exceeds the threshold, the processing device 112 may determine the one or more reference lines of the coding sub-unit based on reconstructed values of the at least portion pixels in the previous coding sub-unit. For each of the at least portion pixels in the previous coding sub-unit, a reconstructed value of the pixel may be determined based on a predicted value of the pixel. The processing device 112 may obtain the reconstructed values of the at least portion pixels in the previous coding sub-unit from the storage device (e.g., the storage device 150).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 10:
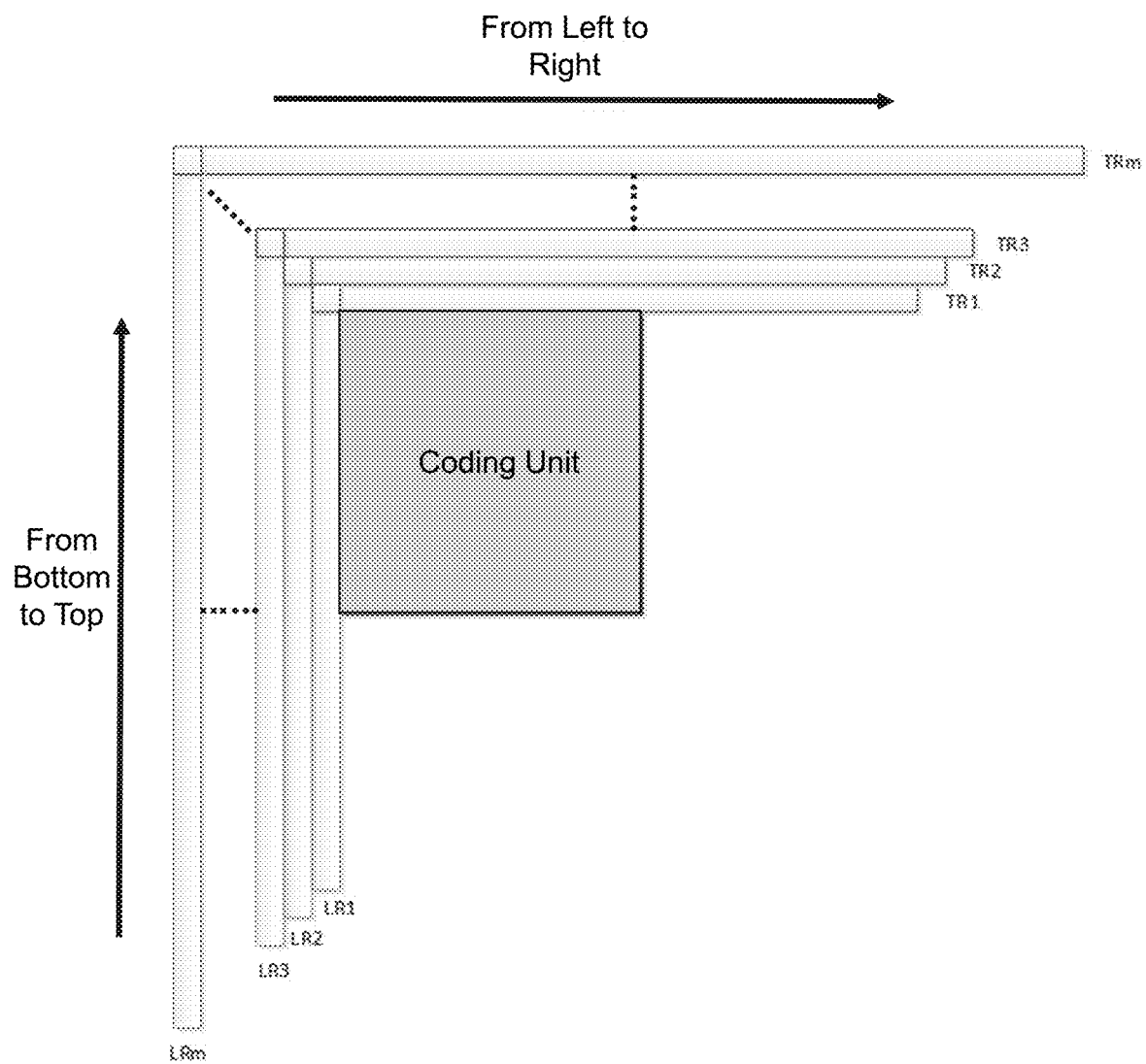
FIG. 10 is a schematic diagram illustrating exemplary reference lines of a coding unit according to some embodiments of the present disclosure.

FIG. 10 is a schematic diagram illustrating exemplary reference lines of a coding unit according to some embodiments of the present disclosure. As illustrated in FIG. 10, a coding unit may include m reference lines each of which may include a portion (e.g., LR1, LR2, LR3, . . . , LRm) located along a left boundary of the coding unit and a portion (e.g., TR1, TR2, TR3, . . . , TRm) located along an upper boundary of the coding unit. A portion (e.g., LR1, LR2, LR3, . . . , LRm) of a reference line located along the left boundary of the coding unit may also be referred to be a first portion of the reference line. A portion (e.g., TR1, TR2, TR3, . . . , TRm) of a reference line located along the upper boundary of the coding unit may also be referred to be a second portion of the reference line. The m reference lines may include a first reference line that is closest to the two adjacent boundaries of the coding unit and one or more second reference lines. The first reference line may also be referred to as a zero reference line with index 0. A second reference line may also be referred to as a non-zero reference line with index 1, 2, 3 . . . , etc.

Each of the m reference lines may include a plurality of reference pixels and pixel values of the plurality of reference pixels may be determined one by one along a specified direction (e.g., from bottom to top, from left to right) based on one or more pixel values of encoded pixels. For one of the plurality of reference pixels on a reference line, when a pixel value of the reference pixel is determined to be not available, i.e., the reference pixel has not been encoded, the pixel value of the reference pixel may be determined based on a pixel value of an encoded reference pixel or set as a default value. For example, for a $1^{st}$ reference pixel in one of the m reference lines, if the pixel value of the $1^{st}$ reference pixel is determined to be not available, whether pixel values of other reference pixels on the reference line are available may be determined one by one along the specified direction until a pixel value of a nth reference pixel on the reference line is determined to be available. Pixel values of reference pixels between the $1^{st}$ reference pixel and the nth reference pixel on the reference line may be set as the pixel value of the nth reference pixel. If the pixel values of other reference pixels on the reference line are determined to be not available, the pixel value of the $1^{st}$ reference pixel on the reference line may be set as a default value. As another example, for a non-$1^{st}$ reference pixel in one of the m reference lines, if the pixel value of the non-$1^{st}$ reference pixel is determined to be not available, the pixel value of the non-$1^{st}$ reference pixel may be set as a pixel value of a reference pixel prior to the non-$1^{st}$ reference pixel along the specified direction.

A count of the plurality of reference pixels on each of the m reference lines may be a default setting of the image coding system 100 or may be adjustable (e.g., adjusted according to actual needs) under different situations. For example, for a reference line (i.e., the first reference line) closest to the coding unit, a count (denoted as Ml) of the plurality of reference pixels on a first portion (e.g., LR1) of the first reference line located along the left boundary of the coding unit may be set as b*height and a count (denoted as Mt) the plurality of reference pixels on a second portion (e.g., TR1) of the first reference line located on the upper boundary of the coding unit may be set as a*width, wherein width refers to a width of the coding unit, height refers to a height of the coding unit, and a and b may be larger than or equal to 2. Further, for each of other reference lines (i.e., the second reference lines) of the coding unit, a count of the plurality of reference pixels on a first portion (e.g., LR2, LR3, . . . , LRm) of the second reference line located on the left boundary of the coding unit may be determined based on Ml; a count of the plurality of reference pixels on a second portion (e.g., TR2, TR3, . . . , TRm) of the second reference line located on the upper boundary of the coding unit may be determined based on Mt.

Figure 11A:
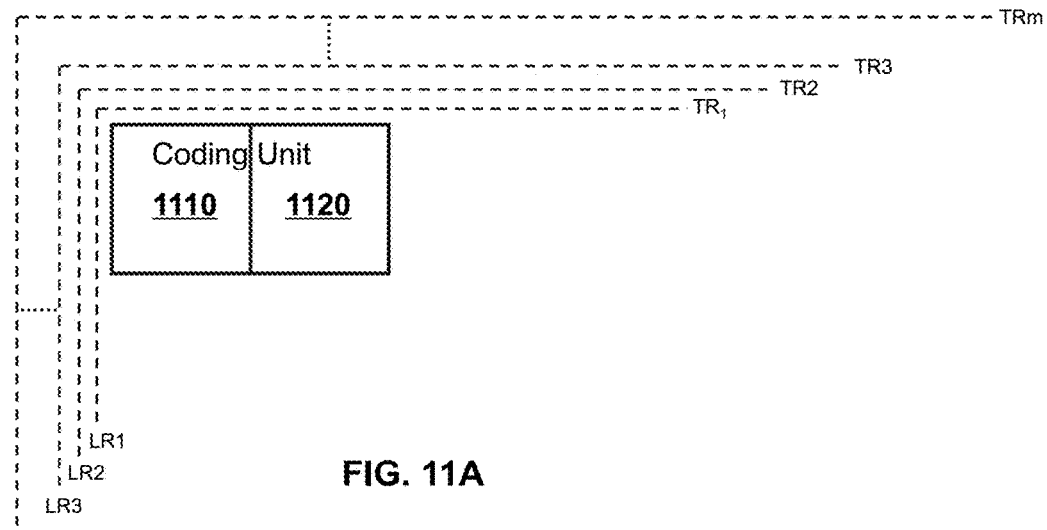
FIGS. 11A-11C are schematic diagrams illustrating exemplary reference lines of coding sub-units according to some embodiments of the present disclosure.
Figure 11B:
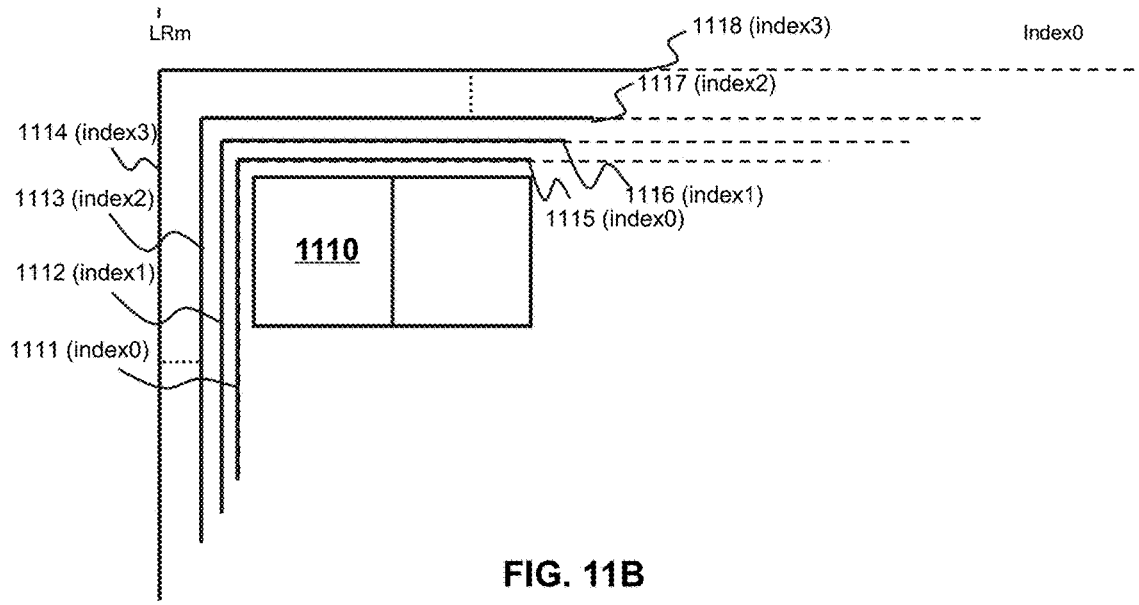
Figure 11C:
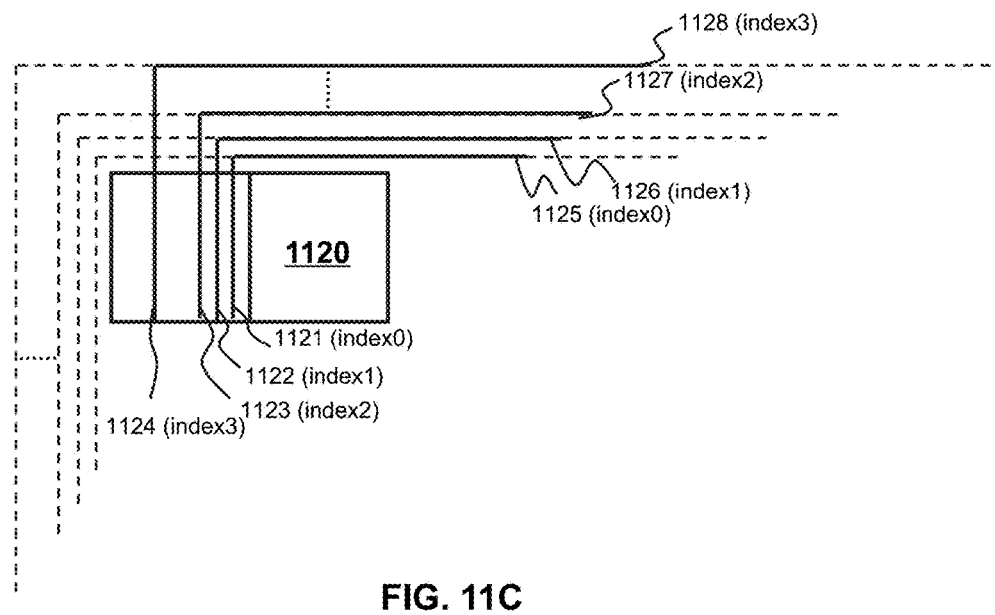

FIGS. 11A-11C are schematic diagrams illustrating exemplary reference lines of coding sub-units according to some embodiments of the present disclosure. For convenience, it is assumed that a coding unit is divided into two coding sub-units (e.g., 1110, 1120) along a vertical direction, a ratio of the widths of the two coding sub-units is 1:1, and for each of the two coding sub-units, a first boundary of the coding sub-unit is a left boundary of the coding sub-unit, a second boundary of the coding sub-unit is an upper boundary of the coding sub-unit. As illustrated in FIG. 11A, m reference lines (e.g., LR1, LR2, LR3, . . . , LRm, TR1, TR2, TR3, . . . , TRm) (indicated as dashed lines) of the coding unit are located along a left boundary and an upper boundary of the coding unit.

As described in connection with FIG. 9, when the division direction of the coding unit is the vertical direction, the target coding sub-unit is the coding sub-unit closest to the left boundary of the coding unit, i.e., the coding sub-unit 1110. As illustrated in FIG. 11B, the processing device 112 may designate a first portion of a reference line (e.g., LR1, LR2, LR3, LRm) of the coding unit along the left boundary of the coding unit as a first portion of a reference line (e.g., 1111, 1112, 1113, 1114) of the coding sub-unit 1110 along the first boundary of the coding sub-unit 1110. Further, the processing device 112 may determine a second portion of a reference line (e.g., 1115, 1116, 1117, 1118) of the coding sub-unit 1110 along the second boundary of the coding sub-unit 1110 by selecting a certain number of reference pixels from a second portion of a reference line (e.g., TR1, TR2, TR3, . . . , TRm) of the coding unit along the upper boundary of the coding unit. For example, the processing device 112 may select x (x equal to 2*width of the coding sub-unit 1110) reference pixels from the reference line TR1 as reference pixels of the reference line 1115 of the coding sub-unit 1110 and select y reference pixels from the reference line TR2 as reference pixels of the reference line 1116, wherein y may be determined based on x.

As illustrated in FIG. 11C, the coding sub-unit 1120 is not target coding sub-unit and the processing device 112 may determine a second portion of a reference line (e.g., 1125, 1126, 1127, 1128) of the coding sub-unit 1120 along the second boundary of the coding sub-unit 1120 by selecting a certain number of reference pixels from a second portion of a reference line (e.g., TR1, TR2, TR3, . . . , TRm) of the coding unit along the upper boundary of the coding unit. Further, the processing device 112 may select a column of pixels in the previous coding sub-unit 1110 as a first portion of a reference line (e.g., 1121, 1122, 1123, 1124) of the coding sub-unit 1120 along the first boundary of the coding sub-unit 1120 and designate predicted values or reconstructed values of the column of pixels as pixel values of reference pixels in the first portion of the reference line (e.g., 1121, 1122, 1123, 1124).

As described in connection with FIG. 5, each of the one or more reference lines of at least one coding sub-unit (e.g., 1110, 1120) may be identified with an index (e.g., index 0, index1, index2, index3). In some embodiments, the index and a syntax element (e.g., ISP_type) of each of the one or more reference lines of the coding sub-unit may be uploaded into the image coding system 100, wherein the syntax element may indicate a division mode of the coding unit corresponding to the reference line.

Figure 12:
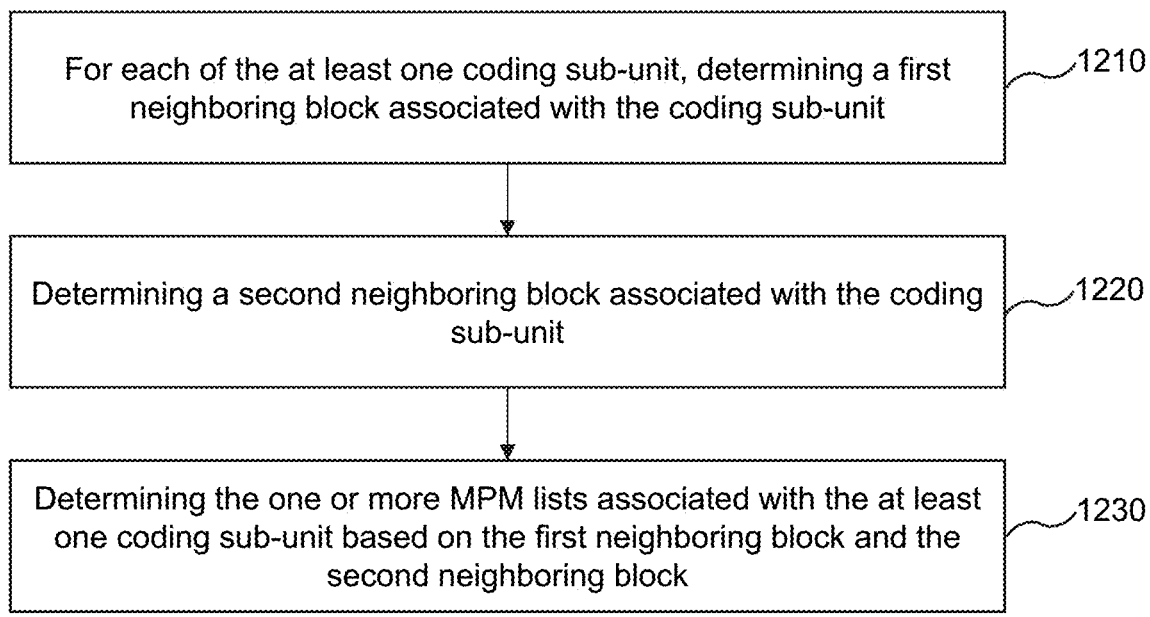
FIG. 12 is a flowchart illustrating an exemplary process for determining one or more MPM lists associated with at least one coding sub-unit.

FIG. 12 is a flowchart illustrating an exemplary process for determining one or more MPM lists associated with at least one coding sub-unit. In some embodiments, the process 1200 may be implemented as a set of instructions (e.g., an application) stored in the storage ROM 230 or RAM 240. The processor 220 and/or the modules in FIG. 12 may execute the set of instructions, and when executing the instructions, the processor 220 and/or the modules may be configured to perform the process 1200. The operations of the illustrated process presented below are intended to be illustrative. In some embodiments, the process 1200 may be accomplished with one or more additional operations not described and/or without one or more of the operations herein discussed. Additionally, the order in which the operations of the process as illustrated in FIG. 12 and described below is not intended to be limiting. In some embodiments, the processing device 112 may perform operation 540 of the process 500 in FIG. 5 based on the process 1200. For example, in operation 540, the processing device 112 may determine an individualized MPM list for one of the at least one coding unit according to process 1200 as illustrated in FIG. 12.

In 1210, for a coding sub-unit, the processing device 112 (e.g., the MPM list determination module 440) (e.g., the processing circuits of the processor 220) may determine a first neighboring block associated with the coding sub-unit. More descriptions for the coding sub-unit may be found elsewhere in the present disclosure (e.g., FIG. 5 and FIGS. 6A-8, and the descriptions thereof). For example, the coding sub-unit may be one of the at least one coding sub-unit as described in FIG. 5. As another example, the coding sub-unit may be obtained by dividing a coding unit according to a division mode. The first neighboring block may refer to a block that has been encoded of which a boundary is adjacent to a first boundary of the coding unit or the coding sub-unit, such as left coding unit L illustrated in FIG. 14A and FIG. 14B, and left coding units L1, L2, L3 and L4 illustrated in FIG. 14C and FIG. 14D.

In 1220, the processing device 112 (e.g., the MPM list determination module 440) (e.g., the processing circuits of the processor 220) may determine a second neighboring block associated with the coding sub-unit.

Figure 14A:
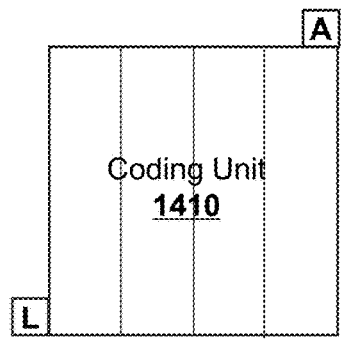
FIGS. 14A-14D are schematic diagrams illustrating exemplary neighboring blocks of a coding sub-unit according to some embodiments of the present disclosure.
Figure 14A:
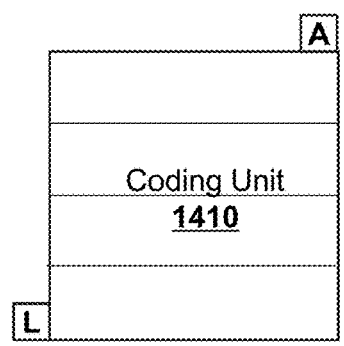
Figure 14B:
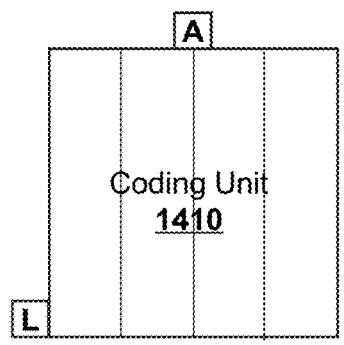
Figure 14B:
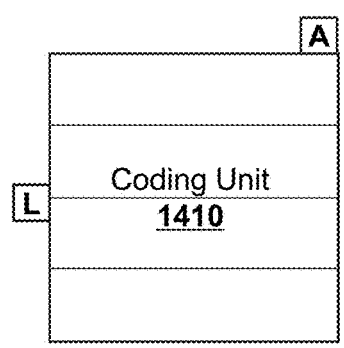
Figure 14C:
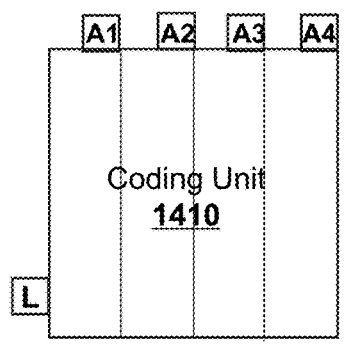
Figure 14C:
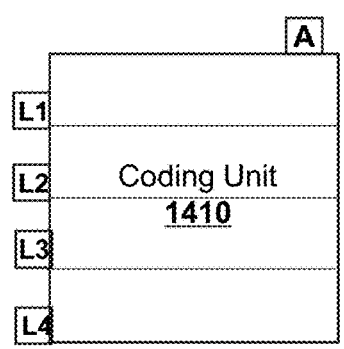
Figure 14D:
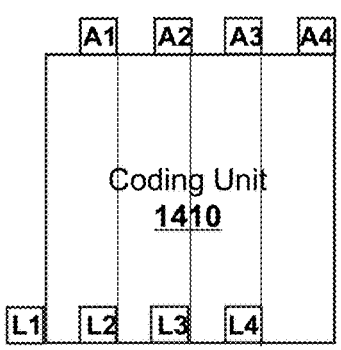
Figure 14D:
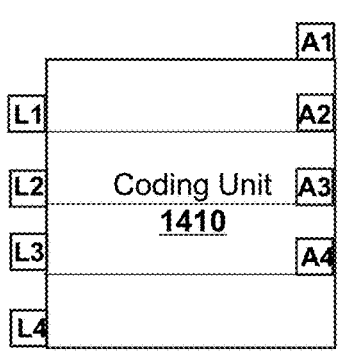

The second adjacent coding unit may refer to a block that has been encoded of which a boundary is adjacent to a second boundary of the coding unit or the coding sub-unit, such as top coding unit A illustrated in FIG. 14A and FIG. 14B, and top coding units A1, A2, A3 and A4 illustrated in FIG. 14C and FIG. 14D.

Each of the first neighboring block and the second neighboring block may include a plurality of pixels that have already been encoded in an image including the coding unit. The first neighboring block and the second neighboring block may be neighboring blocks of the coding sub-unit that are close to the coding sub-unit. The first neighboring block associated with the coding sub-unit may also be referred to as a first image block of the coding sub-unit. The second neighboring block associated with the coding sub-unit may also be referred to as a second image block of the coding sub-unit. As used herein, a neighboring block close to the coding sub-unit refers to that a distance between the neighboring block and the coding sub-unit along a vertical direction or a horizontal direction is less than a threshold, for example, less than a half of the height or width of the coding unit, or less than the height or width of the coding unit, etc.

The first neighboring block and the second neighboring block may be adjacent to a first boundary and a second boundary of the coding unit. In some embodiments, the first boundary and the second boundary may be two adjacent boundaries of the coding unit. For example, the first boundary may be a left boundary of the coding unit and the second boundary may be an upper boundary of the coding unit.

In some embodiments, a size of each of the first neighboring block and the second neighboring block may be equal to, greater than, or smaller than the size of the coding unit. For example, the number (or count) of the pixels in each of the first neighboring block and the second neighboring block may be equal to, greater than, or less than the number (or count) of the pixels in the coding unit. In some embodiments, each of the first neighboring block and the second neighboring block may be square or non-square (e.g., rectangular) in shape. In some embodiments, the shape of each of the first neighboring block and the second neighboring block may be the same as or different from the shape of the coding unit. In some embodiments, the sizes of the first neighboring block and the second neighboring block may be the same or different. In some embodiments, the shapes of the first neighboring block and the second neighboring block may be the same or different.

In some embodiments, the processing device 112 may obtain the first neighboring block and the second neighboring block based on an order of coding the image. For example, if the order of coding the image is from left to right and from top to bottom, the processing device 112 may obtain the first neighboring block (e.g., L, L1, L2, L3, and L4 illustrated in FIGS. 14A-D) and the second neighboring block (e.g., A, A1, A2, A3, and A4 illustrated in FIGS. 14A-D) located along the left boundary and/or the upper boundary of the coding unit to ensure that the obtained the first neighboring block and the second neighboring block include encoded pixels. For example, as illustrated in FIG. 14A, the processing device 112 may designate the image block L and the image block A as the first neighboring block and the second neighboring block of the coding unit 1410, respectively.

In some embodiments, the processing device 112 may determine an image block that is closest to the coding unit (i.e., adjacent to the coding unit) and is located along the first boundary of the coding unit as the first neighboring block of the coding unit. The processing device 112 may determine an image block that is closest to the coding unit (i.e., adjacent to the coding unit) and is located along the second boundary of the coding unit as the second neighboring block.

In some embodiments, the processing device 112 may determine an image block that is closest to the coding sub-unit (i.e., adjacent to the coding sub-unit) and is located along a first boundary of the coding sub-unit as the first neighboring block of the coding sub-unit. The processing device 112 may determine an image block that is closest to the coding sub-unit (i.e., adjacent to the coding sub-unit) and is located along the second boundary of the coding sub-unit as the second neighboring block of the coding sub-unit. More descriptions of first neighboring blocks and second neighboring blocks adjacent to coding sub-units may be found elsewhere in the present disclosure (e.g., FIGS. 14A-D and the descriptions thereof).

In 1230, the processing device 112 (e.g., the MPM list determination module 440) (e.g., the processing circuits of the processor 220) may determine the one or more MPM lists of the coding sub-unit based on the first neighboring block and the second neighboring block.

In some embodiments, the processing device 112 may determine an MPM list of the coding sub-unit based on a prediction mode of the first neighboring block, a prediction mode of the second neighboring block, and the division direction of the coding unit. The prediction mode of the first neighboring block may refer to a prediction mode used to code the first neighboring block and the prediction mode of the second neighboring block may refer to a prediction mode used to code the second neighboring block. For example, under a specific division direction of the coding unit, the processing device 112 may designate prediction modes in the MPM list of the coding sub-unit based comparison between a sequence number corresponding to the prediction mode of the first neighboring block, a sequence number corresponding to the prediction mode of the second neighboring block, a sum of sequence numbers corresponding to the prediction mode of the first neighboring block and the prediction mode of the second neighboring block, an absolute value of a difference between the sequence numbers corresponding to the prediction mode of the first neighboring block and the prediction mode of the second neighboring block, a minimum of the sequence numbers corresponding to the prediction mode of the first neighboring block and the prediction mode of the second neighboring block, and at least one preset sequence number. As used herein, the at least one preset sequence number may be a default setting (e.g., 1, 2, 34, 62) of the image coding system 100 or may be adjustable under different situations. As another example, as illustrated in the second row in Table 2 below, when the prediction mode of the first neighboring block and the prediction mode of the second neighboring block is less than a preset sequence number 2, the processing device 112 may designate prediction modes in the MPM list of the coding sub-unit as MPM [0]=planar, MPM [1]=H, MPM [2]=25, MPM [3]=10, MPM [4]=65, and MPM [5]=V.

In some embodiments, it is assumed that the division direction of the coding unit is a horizontal direction and a count of prediction modes in the MPM list of the coding sub-unit is 6, the MPM list of the coding sub-unit may be shown in Table 2.

TABLE 2

| | Condition | MPM[0] | MPM[1] | MPM[2] | MPM[3] | MPM[4] | MPM[5] |
|---|---|---|---|---|---|---|---|
| | L < 2&A < 2 | Planar | H | 25 | 10 | 65 | V |
| L = A | L ≥ 2&L < 34 | L | L − 1 | L + 1 | L − 2 | L + 2 | L − 3 |
| | L ≥ 34 | L | L − 1 | L + 1 | H | 5 | Planar |
| L ≠ A | \|L − A\| = 1 & Min{L, A} ≥ 2 | $M_0$ | $M_1$ | Min{L, A} − 1 | Max{L, A} + 1 | Min{L, A} − 2 | Max{L, A} + 2 |
| | \|L − A\| = 2 & Min{L, A} ≥ 2 | $M_0$ | $M_1$ | Min{L, A} + 1 | Min{L, A} − 1 | Max{L, A} + 1 | Min{L, A} − 2 |
| | \|L − A\| ≥ 62 & Min{L, A} ≥ 2 | $M_0$ | $M_1$ | Min{L, A} + 1 | Max{L, A} − 1 | Min{L, A} + 2 | Max{L, A} − 2 |
| | 2 < \|L − A\| < 62 & Min{L, A} ≥ 2 | $M_0$ | $M_1$ | Min{L, A} − 1 | Min{L, A} + 1 | Max{L, A} − 1 | Max{L, A} + 1 |

TABLE 2-continued

| Condition | MPM[0] | MPM[1] | MPM[2] | MPM[3] | MPM[4] | MPM[5] |
|---|---|---|---|---|---|---|
| L + A ≥ 2 & Min{L, A} < 2 | Planar | Max{L, A} | Max{L, A} − 1 | Max{L, A} + 1 | Max{L, A} − 2 | Max{L, A} + 2 |

There may be no DC mode in the MPM list. In the above table 2, $M_0$ indicates one of the prediction modes of the first neighboring block denoted as L or the second neighboring block denoted as A that is closer to a horizontal prediction mode corresponding to the horizontal direction, $M_1$ indicates one of the prediction modes of the first neighboring block L or the second neighboring block A that is farther from the horizontal prediction mode corresponding to the horizontal direction.

In some embodiments, it is assumed that the division direction of the coding unit is a vertical direction and the count of prediction modes in the MPM list of the coding sub-unit is 6, the MPM list of the coding sub-unit may be shown in Table 3.

TABLE 3

| | Condition | MPM[0] | MPM[1] | MPM[2] | MPM[3] | MPM[4] | MPM[5] |
|---|---|---|---|---|---|---|---|
| | L < 2 & A < 2 | Planar | V | 43 | 60 | 3 | H |
| L = A | L ≥ 34 | L | L − 1 | L + 1 | L − 2 | L + 2 | L − 3 |
| | L ≥ 2 & L < 34 | L | L − 1 | L + 1 | V | 63 | Planar |
| L ≠ A | |L − A| = 1 & Min{L, A} ≥ 2 | $M_0$ | $M_1$ | Min{L, A} − 1 | Max{L, A} + 1 | Min{L, A} − 2 | Max{L, A} + 2 |
| | |L − A| = 2 & Min{L, A} ≥ 2 | $M_0$ | $M_1$ | Min{L, A} + 1 | Max{L, A} − 1 | Max{L, A} + 1 | Min{L, A} − 2 |
| | |L − A| ≥ 62 & Min{L, A} ≥ 2 | $M_0$ | $M_1$ | Min{L, A} + 1 | Max{L, A} − 1 | Min{L, A} + 2 | Max{L, A} − 2 |
| | 2 < |L − A| < 62 & Min{L, A} ≥ 2 | $M_0$ | $M_1$ | Min{L, A} − 1 | Min{L, A} + 1 | Max{L, A} − 1 | Max{L, A} + 1 |
| | L + A ≥ 2 & Min{L, A} < 2 | Planar | Max{L, A} | Max{L, A} − 1 | Max{L, A} + 1 | Max{L, A} − 2 | Max{L, A} + 2 |

There may be no DC mode in the MPM list. In the above table 3, $M_0$ indicates one of the prediction modes of the first neighboring block L or the second neighboring block A that is closer to a vertical prediction mode corresponding to the vertical direction, $M_1$ indicates one of the prediction modes of the first neighboring block L or the second neighboring block A that is farther from the vertical prediction mode corresponding to the vertical direction.

In some embodiments, it is assumed that the division direction of the coding unit is a vertical direction and a horizontal direction, and the count of prediction modes in each MPM list of the coding sub-unit is 6, MPM lists of the coding sub-unit may be shown in Table 2 and Table 3.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 13:
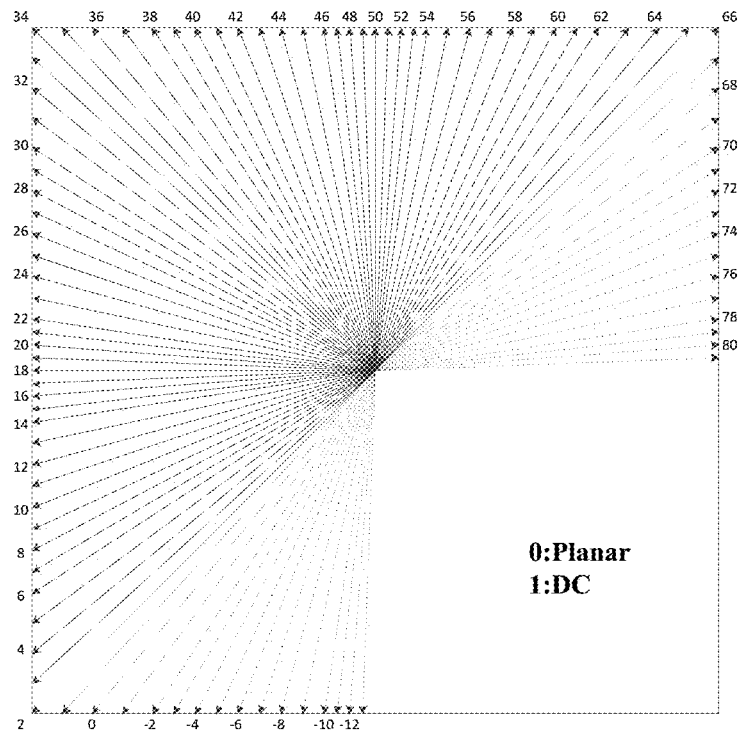
FIG. 13 is a schematic diagram illustrating exemplary prediction modes with different sequence numbers according to some embodiments of the present disclosure.

FIG. 13 is a schematic diagram illustrating exemplary prediction modes with different sequence numbers according to some embodiments of the present disclosure. As described in connection with FIG. 5, the at least one prediction mode may include a DC prediction mode, a planar prediction mode, and an angle prediction mode, etc. The angle prediction mode may include a normal angle prediction mode and a wide angle prediction mode. Each normal angle prediction mode may correspond to a specific sequence number within a range from 2 to h (h is an integer larger than 2). As illustrated in FIG. 13, it is assumed that h is equal to 66, normal angle prediction modes with sequence numbers "2," "34," and "66" are diagonal prediction modes; a normal angle prediction mode with a sequence number "18" is a horizontal prediction mode (denoted as "H"); a normal angle prediction mode with a sequence number "50" is a vertical prediction mode (denoted as "V"). In some embodiments, the DC prediction mode corresponds to a sequence number "1" (i.e., H=1) and the planar prediction mode corresponds to a sequence number "0" (i.e., H=0).

In some embodiments, each wide angle prediction mode may correspond to a wide angle sequence number. As illustrated in FIG. 13, it is still assumed that h is equal to 66, wide angle sequence numbers corresponding to wide angle prediction modes (denoted as dashed arrows) may be within a range from −13 to 1 and a range from 67 to 81. In some embodiments, for each prediction mode, a sequence number or a wide angle sequence number corresponding to the prediction mode may indicate a prediction direction of the prediction mode. For example, a prediction direction of a normal angle prediction mode with a sequence number "2" is a lower left direction.

FIGS. 14A-14D are schematic diagrams illustrating exemplary neighboring blocks of a coding sub-unit according to some embodiments of the present disclosure. For convenience, it is assumed that a coding unit 1410 is divided into four coding sub-units, and for each of the four coding sub-units, a first boundary of the coding sub-unit is a left boundary of the coding sub-unit, a second boundary of the coding sub-unit is an upper boundary of the coding sub-unit.

As illustrated in FIG. 14A, whether the coding unit 1410 is divided along a vertical direction (shown in image 1) or a horizontal direction (shown in image 2), the processing device 112 may determine an image block L that is adjacent to the left boundary of the coding unit 1410 and located at a left lower of the coding unit 1410 as a first neighboring block of each of the four coding sub-units of the coding unit 1410. The processing device 112 may determine an image block A that is adjacent to the upper boundary of the coding unit 1410 and located at an upper right of the coding unit

1410 as a second neighboring block of each of the four coding sub-units of the coding unit 1410.

As illustrated in FIG. 14B, whether the coding unit 1410 is divided along the vertical direction (shown in image 3) or the horizontal direction (shown in image 4), the processing device 112 may determine an image block L that is adjacent to the left boundary of the coding unit 1410 and located at an arbitrary position (e.g., a left lower of the coding unit 1410 shown in image 3, a middle position along the first boundary of coding unit 1410 shown in image 4) along the first boundary of coding unit 1410 as a first neighboring block of each of the four coding sub-units of the coding unit 1410. The processing device 112 may determine an image block A that is adjacent to the upper boundary of the coding unit 1410 and located at an arbitrary position (e.g., a middle position along the second boundary of coding unit 1410 shown in image 3, an upper right of the coding unit 1410 shown in image 4) along the second boundary of coding unit 1410 as a second neighboring block of each of the four coding sub-units of the coding unit 1410.

As illustrated in FIG. 14C, when the coding unit 1410 is divided along the vertical direction (shown in image 5), the processing device 112 may determine an image block L that is adjacent to the first boundary of coding unit 1410 and located at an arbitrary position along the first boundary of coding unit 1410 as a first neighboring block of each of the four coding sub-units of the coding unit 1410. The processing device 112 may determine four image blocks (e.g., A1, A2, A3, A4) that are adjacent to the second boundary of the coding unit 1410 as second neighboring blocks of the four coding sub-units, respectively. Each of the four image blocks may correspond to respective one of the four coding sub-units and may be located at an arbitrary position along the upper boundary of the corresponding coding sub-unit. Additionally or alternatively, the processing device 112 may determine four different image blocks that are located along the first boundary of the coding unit 1410 as four first neighboring blocks, wherein each of the four first neighboring blocks corresponds to respective one of the four coding sub-units.

As illustrated in FIG. 14C, when the coding unit 1410 is divided along the horizontal direction (shown in image 6), the processing device 112 may determine an image block A that is adjacent to the second boundary of the coding unit 1410 and located at an arbitrary position along the second boundary of coding unit 1410 as a second neighboring block of each of the four coding sub-units in the coding unit 1410. The processing device 112 may determine four image blocks (e.g., L1, L2, L3, L4) that are adjacent to the first boundary of the coding unit 1410 as first neighboring blocks of the four coding sub-units, respectively. Each of the four image blocks may be located at an arbitrary position along the upper boundary of the corresponding coding sub-unit and each of the four image blocks (e.g., L1, L2, L3, L4) may correspond to respective one of the four coding sub-units. Additionally or alternatively, the processing device 112 may determine four different image blocks that are adjacent to the second boundary of the coding unit 1410 as four second neighboring blocks, wherein each of the four second neighboring blocks corresponds to respective one of the four coding sub-units.

As illustrated in FIG. 14D, whether the coding unit 1410 is divided along the vertical direction (shown in image 7) or the horizontal direction (shown in image 8), for each of the four coding sub-units, the processing device 112 may determine an image block (e.g., L1, L2, L3, L4) that is adjacent to the first boundary of the coding sub-unit and located at an arbitrary position along the first boundary of coding sub-unit as a first neighboring block of the coding sub-unit and an image block (e.g., A1, A2, A3, A4) that is adjacent to the second boundary of the coding sub-unit and located at an arbitrary position along the second boundary of coding sub-unit as a second neighboring block of the coding sub-unit.

In some embodiments, as illustrated in FIG. 14A and FIG. 14B, because the four coding sub-units in the coding unit 1410 correspond to the same first neighboring block (i.e., the image block L) and the same second neighboring block (i.e., the image block A), the processing device 112 may determine an MPM list for the four coding sub-units under one division direction. In other words, MPM lists for the four coding sub-units under the vertical direction or the horizontal direction may be the same. In some embodiments, as illustrated in FIG. 14C and FIG. 14D, because the four coding sub-units in the coding unit 1410 correspond to the different first neighboring block (e.g., L1, L2, L3, L4) and/or the different second neighboring block (e.g., A1, A2, A3, A4), the processing device 112 may determine an MPM list for each of the four coding sub-units under one division direction. In other words, MPM lists of the four coding sub-units may be different. MPM lists for the same coding sub-units under the vertical direction and the horizontal direction may be different.

Figure 15:
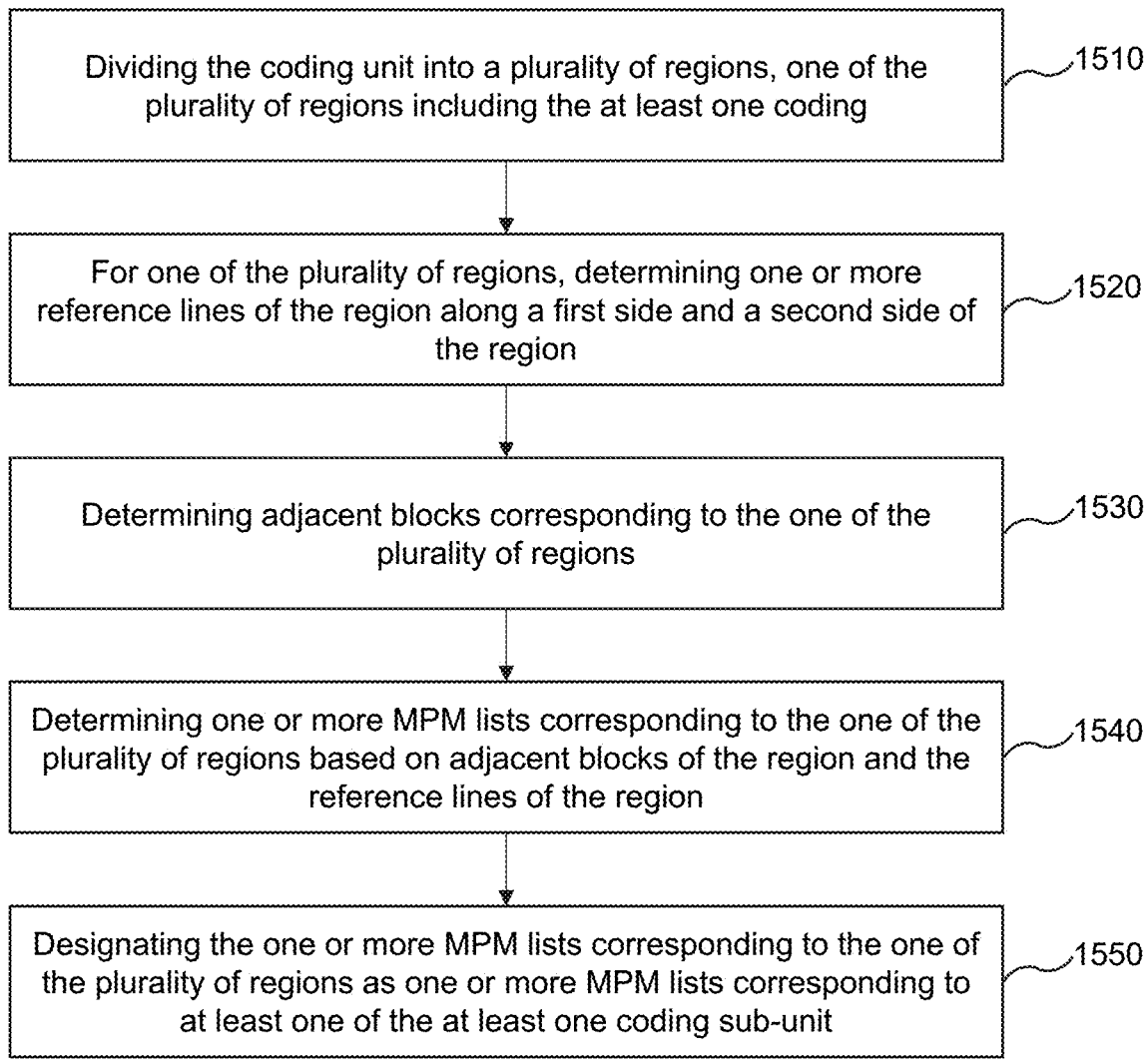
FIG. 15 is a flowchart illustrating an exemplary process for determining one or more MPM lists corresponding to one of a plurality of regions according to some embodiments of the present disclosure.

FIG. 15 is a flowchart illustrating an exemplary process for determining one or more MPM lists corresponding to one of a plurality of regions according to some embodiments of the present disclosure. In some embodiments, the process 1500 may be implemented as a set of instructions (e.g., an application) stored in the storage ROM 230 or RAM 240. The processor 220 and/or the modules in FIG. 15 may execute the set of instructions, and when executing the instructions, the processor 220 and/or the modules may be configured to perform the process 1500. The operations of the illustrated process presented below are intended to be illustrative. In some embodiments, the process 1500 may be accomplished with one or more additional operations not described and/or without one or more of the operations herein discussed. Additionally, the order in which the operations of the process as illustrated in FIG. 15 and described below is not intended to be limiting. In some embodiments, the processing device 112 may perform operations 530 and 540 of the process 500 in FIG. 5 based at least in part on the process 1500. For example, in operation 540, the processing device 112 may determine a local MPM list for the at least one coding unit according to process 1500 as illustrated in FIG. 15.

In 1510, the processing device 112 (e.g., the MPM list determination module 440) (e.g., the processing circuits of the processor 220) may divide the coding unit into a plurality of regions, one of the plurality of regions including the at least one coding sub-unit. The at least one coding sub-unit may be obtained as described in connection with operation 520 as described in FIG. 5. The count or number of coding sub-units in at least two of the plurality of regions may be the same or different. For example, each of the plurality of regions may include the same count of coding sub-units. As another example, one of the plurality of regions may include one single coding sub-unit and one of the plurality of regions may include at least two coding-sub-units. The division direction for obtaining the plurality of regions may be same as the division direction for obtaining the at least one coding sub-unit.

In 1520, for one of the plurality of regions, the processing device 112 may determine one or more reference lines of the region along a first side (e.g., a left side) and a second side (e.g., an upper side) of the region.

For one of the plurality of regions, the processing device 112 may determine whether the region is a target region. As used herein, the target region may refer to a region that is first predicted in the plurality of regions. For example, when the division direction for obtaining the plurality of regions is the horizontal direction, the prediction direction of the plurality of regions may be from the top to the bottom of the coding unit and the target region may be a region closest to an upper boundary of the coding unit. When the division direction for obtaining the plurality of regions is the vertical direction, the prediction direction of the plurality of regions may be from the left to the right of the coding unit and the target region may be a region closest to a left boundary of the coding unit. When the division direction for obtaining the plurality of regions is the horizontal direction and the vertical direction, the prediction direction of the plurality of regions may be from the left to the right and from the top to the bottom of the coding unit and the target region is a region located at a top left corner of the coding unit. Further, the processing device 112 may determine the one or more reference lines of the region based on a determination whether the region is the target region.

In response to the determination that the region is the target region, the processing device 112 may determine the one or more reference lines of the region based on one or more reference lines of the coding unit. More descriptions of the one or more reference lines of the coding unit may be found in connection with FIG. 10 and the descriptions thereof. In some embodiments, the processing device 112 may designate the one or more reference lines of the coding unit as the one or more reference lines of the region. Additionally or alternatively, for each of the one or more reference lines of the coding unit, the processing device 112 may select a portion of the reference line of the coding unit as a reference line of the region corresponding to the reference line of the coding unit.

In response to the determination that the region is not the target region, the processing device 112 may determine the one or more reference lines of the region based on at least portion pixels in a previous region among the plurality of regions that have been involved an intra prediction prior to the region. For example, for a specific region in a specific coding unit, the previous region of the specific region may refer to a region that is predicted before the specific region according to a prediction direction and is adjacent to the specific coding unit. More descriptions of determining the one or more reference lines of the region may be found elsewhere in the present disclosure (e.g., FIG. 16A-C and the descriptions thereof).

In 1530, the processing device 112 (e.g., the MPM list determination module 440) (e.g., the processing circuits of the processor 220) may determine adjacent blocks corresponding to the one of the plurality of regions. As used herein, an adjacent block of a region may refer to an image block that has been already encoded in the image and is located along a boundary of the region.

In some embodiments, the processing device 112 may determine a first adjacent block (e.g., image block L1 and L2 illustrated in FIG. 17A, image block L1, L2, and L3 illustrated in FIG. 17B) closest to the one of the plurality of regions (i.e., adjacent to the region) along a first boundary of the one of the plurality of regions and a second adjacent block (e.g., image block A1 and A2 illustrated in FIG. 17A, image block A1, A2, and A3 illustrated in FIG. 17B) closest to the one of the plurality of regions (i.e., adjacent to the region) along a second boundary of the one of the plurality of regions. In some embodiments, the first boundary and the second boundary may be two adjacent boundaries of the region. For example, the first boundary may be a left boundary of the region and the second boundary may be an upper boundary of the region.

In some embodiments, a size of each of the first adjacent block and the second adjacent block may be equal to, greater than, or smaller than the size of the coding unit. In some embodiments, each of the first adjacent block and the second adjacent block may be square or non-square (e.g., rectangular) in shape. In some embodiments, the shape of each of the first adjacent block and the second adjacent block may be the same as or different from the shape of the coding unit. In some embodiments, the sizes of the first adjacent block and the second adjacent block may be the same or different. In some embodiments, the shapes of the first adjacent block and the second adjacent block may be the same or different.

Figure 17A:
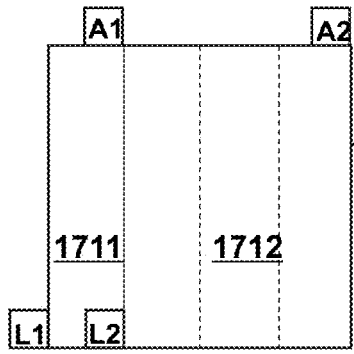
FIGS. 17A-17B are schematic diagrams illustrating exemplary image blocks adjacent to a region according to some embodiments of the present disclosure.

In some embodiments, the processing device 112 may obtain the first adjacent block and the second adjacent block based on an order of coding the image. For example, if the order of coding the image is from left to right and from top to bottom, the processing device 112 may obtain the first adjacent block and the second adjacent block located along the left boundary and/or the upper boundary of the coding unit to ensure that the obtained the first adjacent block and the second adjacent block include encoded pixels. For example, as illustrated in FIG. 17A, the processing device 112 may designate the image block L1 and the image block A1 as the first adjacent block and the second adjacent block of the coding unit 1711, respectively. More descriptions of adjacent blocks corresponding to the regions may be found elsewhere in the present disclosure (e.g., FIGS. 17A-B and the descriptions thereof).

In 1540, the processing device 112 (e.g., the MPM list determination module 440) (e.g., the processing circuits of the processor 220) may determine one or more MPM lists corresponding to the one of the plurality of regions based on adjacent blocks of the region and the reference lines of the region.

The processing device 112 may determine the one or more MPM lists based on the first adjacent block and the second adjacent block. For the one of the plurality of regions, the processing device 112 may determine an MPM list corresponding to the region based on a prediction mode of the first adjacent block, a prediction mode of the second adjacent block, and the division direction for obtaining the plurality of regions. The prediction mode of the first adjacent block may refer to a prediction mode used to code the first adjacent block and the prediction mode of the second adjacent block may refer to a prediction mode used to code the second adjacent block. In some embodiments, it is assumed that the division direction for obtaining the plurality of regions is a horizontal direction and a count of prediction modes in the MPM list of the region is 6, the processing device 112 may determine the MPM list corresponding to the region as the MPM list shown in Table 2 illustrated in FIG. 12. In some embodiments, it is assumed that the division direction for obtaining the plurality of regions is a vertical direction and the count of prediction modes in the MPM list of the region is 6, the processing device 112 may determine the MPM list corresponding to the region as the MPM list shown in Table 3 illustrated in FIG. 12. In some embodiments, it is assumed that the division direction for obtaining the plurality of regions is a vertical direction and a horizontal direction, and the count of prediction modes in each MPM list of the region is 6, the processing device 112 may determine MPM lists corresponding to the region as MPM lists shown in Table 2 and Table 3 illustrated in FIG. 12.

In some embodiments, the one or more reference lines of a region may include a first reference line that is closest to the region (also referred to as zero reference line) and one or more second reference lines (also referred to as non-zero reference line) other than the first reference line closest to region. The processing device 112 may determine at least one second MPM list corresponding to the second reference lines of the region based on at least one first MPM list corresponding to the first reference line of the region. In some embodiments, under a specific division direction, the processing device 112 may determine a first MPM list corresponding to the first reference line based on the first adjacent block and the second adjacent block of the region. Further, the processing device 112 may directly designate the first MPM list as a second MPM list corresponding to the one or more second reference lines of the region. Alternatively, the processing device 112 may determine the second MPM list corresponding to the one or more second reference lines of the region by modifying the first MPM list.

Additionally or alternatively, the processing device 112 may determine the at least one second MPM list corresponding to the second reference lines of the region based on a global MPM list corresponding to the second reference lines of the coding unit. The global MPM list may be obtained as described in connection with operation 540 as described in FIG. 5. In some embodiments, the processing device 112 may designate the global MPM list as a second MPM list corresponding to the one or more second reference lines of the region. Alternatively, the processing device 112 may determine the at least one second MPM list corresponding to the one or more second reference lines of the region by modifying the global MPM list.

In 1550, the processing device 112 (e.g., the MPM list determination module 440) (e.g., the processing circuits of the processor 220) may designate the one or more MPM lists corresponding to the one of the plurality of regions as one or more MPM lists corresponding to at least one of the at least one coding sub-unit.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 16A:
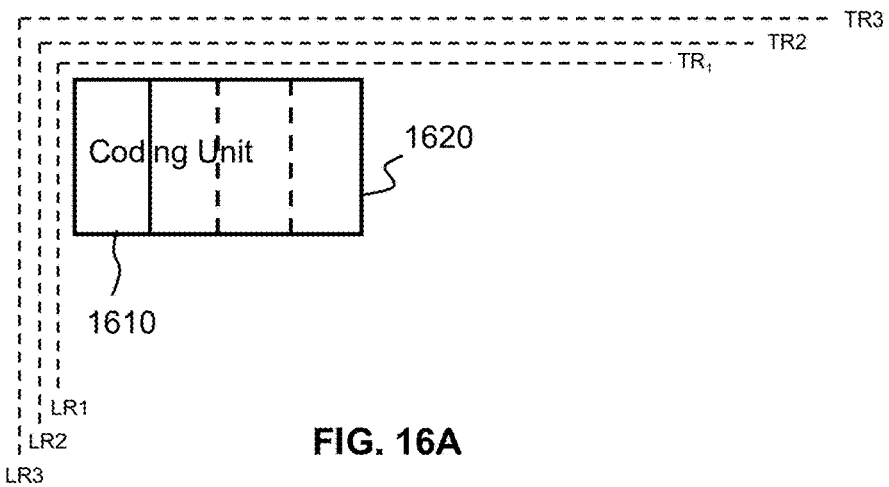
FIGS. 16A-16C are schematic diagrams illustrating exemplary reference lines of regions according to some embodiments of the present disclosure.
Figure 16B:
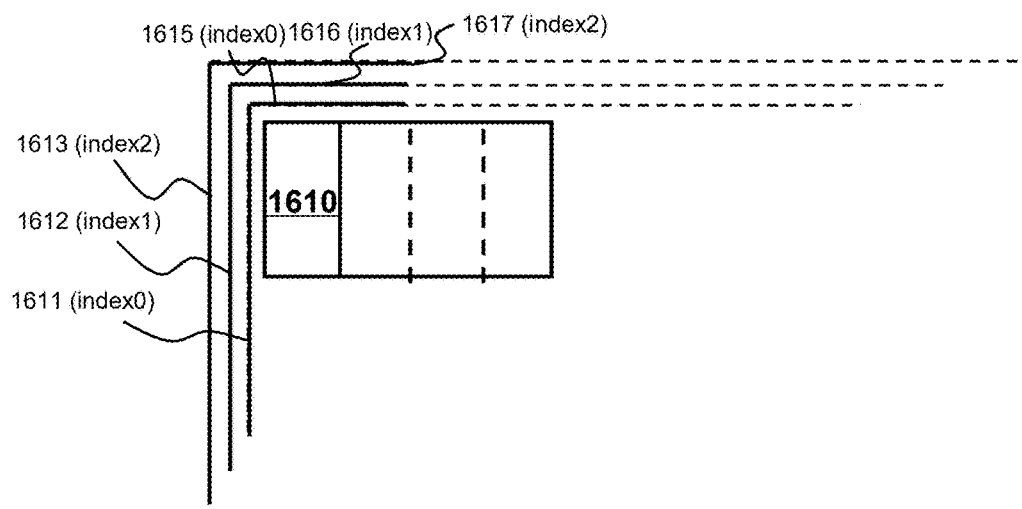
Figure 16C:
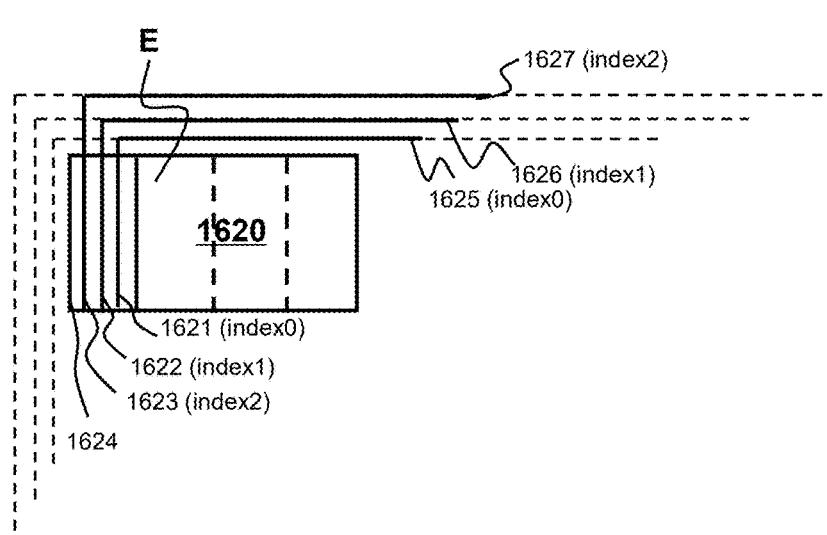

FIGS. 16A-16C are schematic diagrams illustrating exemplary reference lines of regions according to some embodiments of the present disclosure. As illustrated in FIG. 16A, a coding unit is divided into two regions 1610 and 1620 along a vertical direction. The region 1610 includes one coding sub-unit and the region 1620 includes three coding sub-units. One or more reference lines (e.g., LR1, LR2, LR3, TR1, TR2, TR3) (indicated as dashed lines) of the coding unit are located on a left side and an upper side of the coding unit.

As described in connection with FIG. 15, when the division direction for obtaining the plurality of regions is the vertical direction, the target region is the region closest to the left boundary of the coding unit, i.e., the region 1610. As illustrated in FIG. 16B, the processing device 112 may designate first portions (e.g., LR1, LR2, LR3) of the one or more reference lines of the coding unit along the left side of the coding unit as first portions (e.g., 1611, 1612, 1613) of the one or more reference lines of the region 1610 along the left side of the region 1610, respectively. Further, the processing device 112 may determine a section of each of second portions (e.g., TR1, TR2, TR3) of the one or more reference lines of the coding unit as a second portion (e.g., 1615, 1616, 1617) of one of the one or more reference lines of the region 1610 along the upper side of the region 1610, respectively. The length of a second portion of a reference line of the region 1610 that is located on the upper side of the coding unit may be determined based on the width of the region 1610.

As illustrated in FIG. 16C, the region 1620 is not the target region and the processing device 112 may select a column of pixels in the previous region 1610 as a first portion (e.g., 1621, 1622, 1623, 1624) of one of the one or more reference lines of the region 1620 that is located on the left side of the region 1620, and designate pixel values of the column of pixels as pixel values of reference pixels in the first portion of the one of the one or more reference lines of the region 1620. Further, the processing device 112 may determine a section of each of second portions (e.g., TR1, TR2, TR3) of the one or more reference lines of the coding unit as a second portion (e.g., 1625, 1626, 1627) of one of the one or more reference lines of the region 1620 that is located on the upper side of the region 1620. For example, the processing device 112 may determine the second section (e.g., 1625, 1626, 1627) of one of the one or more reference lines of the region 1620 along the upper side of the region 1620 by selecting a certain number or count of reference pixels from the second portion of one of the one or more reference lines (e.g., TR1, TR2, TR3) of the coding unit along the upper side of the coding unit. The certain number may be a default setting (e.g., n*height of the region 1620, n*width of the region 1620, n is a positive integer) of the image coding system 100 or may be adjustable (e.g., adjusted according to a height or a width of the region 1620) under different situations. For example, the certain number of reference pixels from the second portion of one of the one or more reference lines (e.g., TR1, TR2, TR3) of the coding unit may be equal to n*height of the region 1620+n*width of the region 1620). In some embodiments, each of the one or more reference lines of the region (e.g., 1610, 1620) may be identified with an index (e.g., index 0, index1, index2).

Figure 17B:
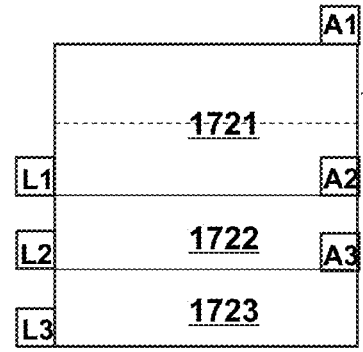

FIGS. 17A-17B are schematic diagrams illustrating exemplary image blocks adjacent to a region according to some embodiments of the present disclosure. For convenience, it is assumed that, for each region, a first boundary of the region is a left boundary of the region, a second boundary of the region is an upper boundary of the region.

As illustrated in FIG. 17A, a coding unit 1710 is divided into two regions 1711 and 1712 along a vertical direction, wherein the region 1711 includes one coding sub-unit and the region 1712 includes three coding sub-units. A first boundary (also referred to as left boundary) of the coding unit 1710 may be along the vertical direction and a second boundary (also referred to as upper boundary) of the coding unit may be along the horizontal direction. For the region 1711, the processing device 112 may determine an image block L1 that is located along a first boundary of the region 1711 (e.g., located at a bottom left side of the region 1711) as a first adjacent block of the region 1711. The processing device 112 may determine an image block A1 that is located along a second boundary of the region 1711 (e.g., located at a top right side of the region 1711) as a second adjacent block of the region 1711. For the region 1712, the processing device 112 may determine an image block L2 that is located along a first boundary of the region 1712 (e.g., located at a bottom left side of the region 1712) as a first adjacent of the region 1712. The processing device 1712 may determine an image block A2 that is located along a second boundary of the region 1712 (e.g., located at a top right side of the region 1712) as a second adjacent block of the region 1712.

As illustrated in FIG. 17B, a coding unit 1720 is divided into three regions 1721, 1722, and 1723 along a horizontal direction, wherein the region 1721 includes two coding sub-units and the region 1722 and the region 1723 include one coding sub-unit, respectively. For the region 1721, the processing device 112 may determine an image block L1 that is located along a first boundary of the region 1721 (e.g., located at a bottom left side of the region 1721) as a first adjacent block of the region 1721. The processing device 112 may determine an image block A1 that is located along a second boundary of the region 1721 (e.g., located at a top right side of the region 1721) as a second adjacent block of the region 1721. For the region 1722, the processing device 112 may determine an image block L2 that is located along a first boundary of the region 1722 (e.g., located at a bottom left side of the region 1722) as a first adjacent block of the region 1722. The processing device 112 may determine an image block A2 that is located along a second boundary of the region 1722 (e.g., located at a top right side of the region 1722) as a second adjacent block of the region 1722. For the region 1723, the processing device 112 may determine an image block L3 that is located along a first boundary of the region 1723 (e.g., located at a bottom left side of the region 1723) as a first adjacent block of the region 1723. The processing device 112 may determine an image block A3 that is located along a second boundary of the region 1723 (e.g., located at a top right side of the region 1723) as a second adjacent block of the region 1723.

Figure 18:
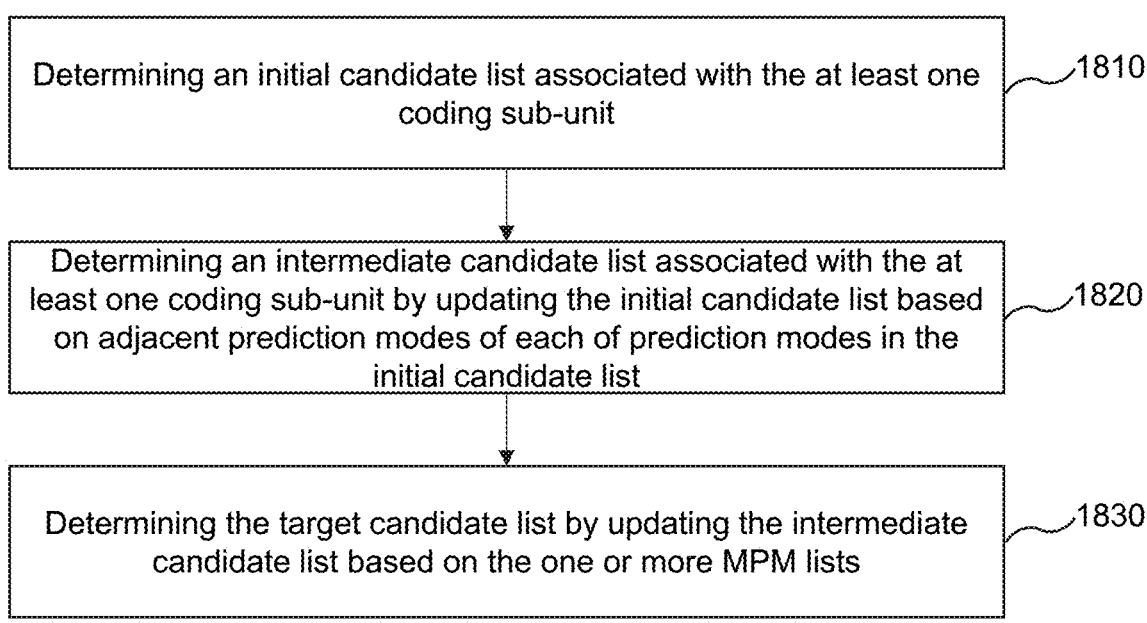
FIG. 18 is a flowchart illustrating an exemplary process for determining the target candidate list associated with at least one coding sub-unit according to some embodiments of the present disclosure.

FIG. 18 is a flowchart illustrating an exemplary process for determining the target candidate list associated with at least one coding sub-unit according to some embodiments of the present disclosure. In some embodiments, the process 1800 may be implemented as a set of instructions (e.g., an application) stored in the storage ROM 230 or RAM 240. The processor 220 and/or the modules in FIG. 18 may execute the set of instructions, and when executing the instructions, the processor 220 and/or the modules may be configured to perform the process 1800. The operations of the illustrated process presented below are intended to be illustrative. In some embodiments, the process 1800 may be accomplished with one or more additional operations not described and/or without one or more of the operations herein discussed. Additionally, the order in which the operations of the process as illustrated in FIG. 18 and described below is not intended to be limiting. In some embodiments, the processing device 112 may perform operation 550 of the process 500 in FIG. 5 based at least in part on the process 1800.

In 1810, the processing device 112 (e.g., the prediction mode determination module 450) (e.g., the processing circuits of the processor 220) may determine an initial candidate list associated with the at least one coding sub-unit (e.g., a coding sub-unit, a region). The at least one coding sub-unit may be obtained as described in connection with operation 520 as described in FIG. 5.

The initial candidate list may include one or more preliminary prediction modes. The processing device 112 may determine the one or more preliminary prediction modes from a plurality of prediction modes. The plurality of prediction mode may include the planar prediction mode, the DC prediction mode, angle prediction modes of which the sequence numbers are even (e.g., prediction modes with sequence numbers 6, 30, 48, etc. shown in FIG. 13), etc. In some embodiments, the processing device 112 may select, based on the RD costs corresponding to the plurality of prediction modes, the one or more preliminary modes from the plurality of prediction modes. For example, the processing device 112 may select 3 preliminary modes corresponding to 3 smallest RD costs among the plurality of prediction modes as the initial candidate list. In some embodiments, the processing device 112 may record the index of the reference line and the RD cost corresponding to each of the one or more preliminary prediction modes in the initial candidate list.

In 1820, the processing device 112 (e.g., the prediction mode determination module 450) (e.g., the processing circuits of the processor 220) may determine an intermediate candidate list associated with the at least one coding sub-unit by updating the initial candidate list based on one or more adjacent prediction modes of each of preliminary prediction modes in the initial candidate list. As used herein, an adjacent prediction mode of a preliminary prediction mode may refer to a prediction mode with a sequence number that is close to or in a range (e.g., 1, 2, 3, 4, etc.) of a sequence number of the preliminary prediction mode. For example, the adjacent prediction modes of a preliminary mode with a sequence number m may include, but is not limited to, prediction modes with sequence numbers m±1, prediction modes with sequence numbers m±2, and prediction modes with sequence numbers m±3.

In some embodiments, for each preliminary prediction mode in the initial candidate list, the processing device 112 may determine the RD cost corresponding to at least one adjacent prediction mode of the preliminary prediction mode. Further, the processing device 112 may update the initial candidate list based on the RD cost corresponding to the at least one adjacent prediction mode of the preliminary prediction mode. For example, the processing device 112 may compare the RD cost corresponding to the preliminary prediction mode and the RD cost corresponding to the at least one adjacent prediction mode of the preliminary prediction mode, and retain the prediction mode with the smallest RD cost based on the comparison to update the initial candidate list. If the RD cost of the at least one adjacent prediction mode of the preliminary prediction mode is less than the RD cost of the preliminary prediction mode, the processing device 112 may replace the preliminary prediction mode in the initial candidate list using the one adjacent prediction mode of the preliminary prediction mode to update the initial candidate list. If the RD cost of the at least one adjacent prediction mode of the preliminary prediction mode exceeds the RD cost of the preliminary prediction mode, the processing device 112 may retain the preliminary prediction mode in the initial candidate list. If the RD cost of the at least one adjacent prediction mode of the preliminary prediction mode is equal to the RD cost of the preliminary prediction mode, the processing device 112 may retain the preliminary prediction mode in the initial candidate list or replace the preliminary prediction mode in the initial candidate list using the one adjacent prediction mode of the preliminary prediction mode to update the initial candidate list. In some embodiments, the processing device 112 may record the index of the reference line and the RD cost corresponding to each of one or more prediction modes in the intermediate candidate list.

In 1830, the processing device 112 (e.g., the prediction mode determination module 450) (e.g., the processing circuits of the processor 220) may determine a target candidate list corresponding to the at least one coding sub-unit by updating the intermediate candidate list based on one or more MPM lists.

The processing device 112 may update the intermediate candidate list based on the at least one first MPM list corresponding to the first reference line (e.g., a reference line with an index 0) of the at least one coding sub-unit and the at least one second MPM list corresponding to the one or more second reference lines (e.g., reference lines with index>0) of the at least one coding sub-unit. The at least one first MPM list corresponding to the first reference line and the at least one second MPM list corresponding to the one or more second reference lines of the at least one coding sub-unit may be determined as described in FIG. 5.

In some embodiments, the processing device 112 may determine RD costs corresponding to one or more prediction modes in the second MPM list and compare these RD costs with the RD costs of the prediction modes in the intermediate candidate list. Further, the processing device 112 may select, based on the comparison, one or more (e.g., 3) prediction modes corresponding to one or more (e.g., 3) smallest RD costs among the one or more prediction modes in the second MPM list and the prediction modes in the intermediate candidate list as an updated intermediate candidate list. In some embodiments, the processing device 112 may record the index of the reference line and the RD cost corresponding to each of the one or more prediction modes in the updated intermediate candidate list. In some embodiments, the processing device 112 may determine the RD costs using the SATD in operations 1810-1830.

In some embodiments, the processing device 112 may add at least one prediction mode (e.g., the first one, two, or three prediction modes) in the first MPM list and/or at least one prediction mode (e.g., the first one, two, or three prediction modes) in the second MPM list to the updated intermediate candidate list, and merge the same prediction modes (both the prediction mode and the index of the reference line corresponding to the prediction mode are the same) to obtain a merged candidate list. Further, for each of one or more prediction modes in the merged candidate list, the processing device 112 may determine whether the prediction mode is within the MPM lists corresponding to the reference line (e.g., the second MPM list, the first MPM list, etc.) associated with the prediction mode. For example, if an index of the reference line associated with the prediction mode in the merged candidate list is 0, the processing device 112 may determine whether the prediction mode in the merged candidate list is within the first MPM lists; if the index of the reference line associated with the prediction mode in the merged candidate list larger than 0, the processing device 112 may determine whether the prediction mode in the merged candidate list is within the second MPM lists. In response to the determination that the prediction mode is not within the MPM lists, the processing device 112 may remove the prediction mode from the merged candidate list. After performing the above operations, the processing device 112 may obtain the target candidate list corresponding to the at least one coding sub-unit.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 19:
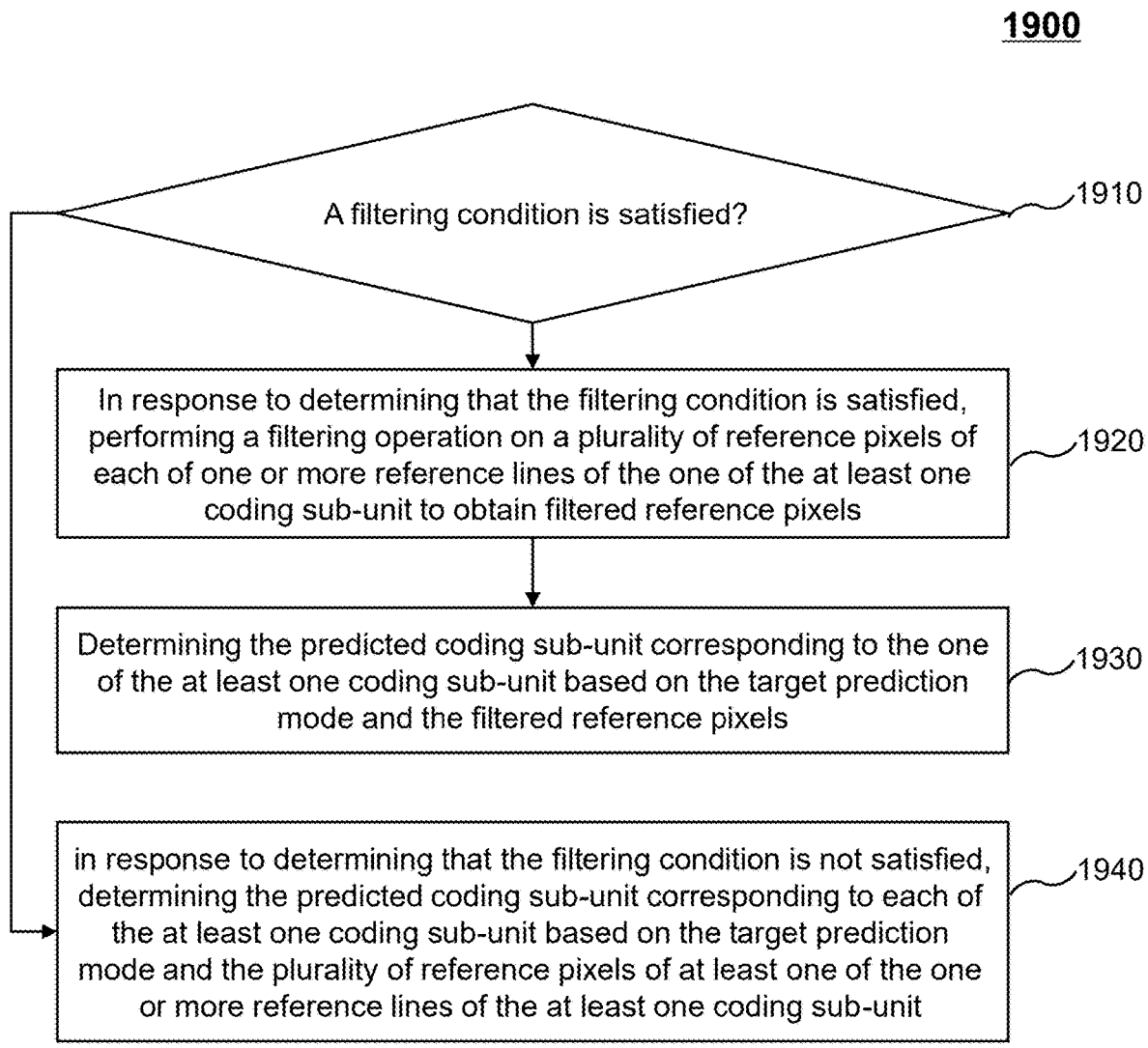
FIG. 19 is a flowchart illustrating an exemplary process for performing a filtering operation on a plurality of reference pixels of each of one or more reference lines of at least one coding sub-unit according to some embodiments of the present disclosure.

FIG. 19 is a flowchart illustrating an exemplary process for performing a filtering operation on a plurality of reference pixels of each of one or more reference lines of at least one coding sub-unit according to some embodiments of the present disclosure. In some embodiments, the process 1900 may be implemented as a set of instructions (e.g., an application) stored in the storage ROM 230 or RAM 240. The processor 220 and/or the modules in FIG. 19 may execute the set of instructions, and when executing the instructions, the processor 220 and/or the modules may be configured to perform the process 1900. The operations of the illustrated process presented below are intended to be illustrative. In some embodiments, the process 1900 may be accomplished with one or more additional operations not described and/or without one or more of the operations herein discussed. Additionally, the order in which the operations of the process as illustrated in FIG. 19 and described below is not intended to be limiting. In some embodiments, the processing device 112 may perform operation 570 of the process 500 in FIG. 5 based at least in part on the process 1900.

In 1910, the processing device 112 (e.g., the prediction module 460) (e.g., the processing circuits of the processor 220) may determine whether a filtering condition is satisfied.

In some embodiments, the processing device 112 may determine whether a filtering condition is satisfied based on a target prediction mode used for determining a predicted coding sub-unit corresponding to one of at least one coding sub-unit. The target prediction mode used for determining the predicted coding sub-unit corresponding to one of the at least one coding sub-unit may be determined as described in connection with operation 560 as described in FIG. 5. A type of the target prediction mode may include a DC prediction mode, a planar prediction mode, an angle prediction mode (e.g., a normal angle prediction mode, a wide angle prediction mode), etc. For example, when the type of the target prediction mode is not the DC prediction mode, the processing device 112 may determine that the filtering condition is satisfied.

In some embodiments, the processing device 112 may determine whether the filtering condition is satisfied based on the target prediction mode and the size parameter of the coding unit. The size parameter of the coding unit may be determined according to formula (2) illustrated in FIG. 9. In some embodiments, intra-prediction modes may be divided into 4 groups (e.g., a first group, a second group, a third group, and a fourth group), wherein the first group includes the horizontal prediction mode (e.g., the prediction mode with sequence numbers "18" illustrated in FIG. 13) and the vertical prediction mode (e.g., the prediction mode with sequence numbers "50" illustrated in FIG. 13), the second group includes the diagonal prediction modes (e.g., the prediction modes with sequence numbers "2", "34", and "66" illustrated in FIG. 13), the third group includes normal angle prediction modes (e.g., the prediction modes with sequence numbers within a range from 3 to 17, a range from 19 to 33, a range from 35 to 49, and a range from 51 to 65 illustrated in FIG. 13) other than the horizontal prediction mode, the vertical prediction mode, and the diagonal prediction modes, and the fourth group includes wide angle prediction modes (e.g., the wide angle prediction modes with wide angle sequence numbers within a range from −13 to 1 and a range from 67 to 81 illustrated in FIG. 13). For example, when the size parameter of the coding unit is equal to 2 and the target prediction mode is not within the first group and the second group, the processing device 112 may determine that the filtering condition is satisfied. As another example, when the size parameter of the coding unit is equal to 3, 4, 5, or 6 and the target prediction mode is not within the first group, the processing device 112 may determine that the filtering condition is satisfied.

In 1920, in response to determining that the filtering condition is satisfied, the processing device 112 (e.g., the prediction module 460) (e.g., the processing circuits of the processor 220) may perform a filtering operation on the plurality of reference pixels of each of one or more reference lines of the at least one coding sub-unit to obtain filtered reference pixels. The one or more reference lines of the at least one coding sub-unit may be determined as described in connection with operation 530 in FIG. 5.

The filtering operation may be used to avoid or reduce a direction boundary (e.g., a directional stripe) which may occur in the predicted coding sub-unit corresponding to each of the at least one coding sub-unit determined based on the reference pixels, thereby reducing noises and improving visual effects.

For each of the at least one coding sub-unit, the processing device 112 may determine a filter of a type according to at least one of the target prediction mode, a width of the coding sub-unit, or a height of the coding sub-unit and perform the filtering operation on the plurality of reference pixels of each of the one or more reference lines of the coding sub-unit using the filter. In some embodiments, in response to the target prediction mode is a planar prediction mode or a diagonal prediction mode, the processing device 112 may determine a [1 2 1] filter as the filter of the type.

In some embodiments, the processing device 112 may compare at least one of the width of the coding sub-unit or the height of the coding sub-unit with a threshold. As used herein, the threshold may be a default setting (e.g., 1, 2, 4, 8, 16) of the image coding system 100 or may be adjustable (e.g., adjusted according to actual needs) under different situations. According to the comparison, the processing device 112 may designate one of a Gaussian filter and a discrete cosine transform-based interpolation filter (DCT-IF) chroma filter as the filter of the type. For convenience, it is assumed that h is equal to 66 (as illustrated in FIG. 13). For example, when a sequence number corresponding to the target prediction mode is within a range from 3 to 17, a range from 19 to 33, or a range from −13 to 1, in response to the height of the coding sub-unit is less than or equal to the threshold, the processing device 112 may designate the DCT-IF chroma filter as the filter of the type; in response to the height of the coding sub-unit is larger than the threshold, the processing device 112 may designate the Gaussian filter as the filter of the type. As another example, when the sequence number corresponding to the target prediction mode is within a range from 35 to 49, a range from 51 to 65, or a range from 67 to 81, in response to the width of the coding sub-unit is less than or equal to the threshold, the processing device 112 may designate the DCT-IF chroma filter as the filter of the type; in response to the height of the coding sub-unit is larger than the threshold, the processing device 112 may designate the Gaussian filter as the filter of the type.

In some embodiments, the processing device 112 may compare the width of the coding sub-unit and the height of the coding sub-unit. According to at least in part on the comparison, the processing device 112 may designate one of the Gaussian filter and the DCT-IF chroma filter as the filter of the type. For example, in response to the width of the coding sub-unit is equal to the height of the coding sub-unit, as described above, the processing device 112 may designate one of the Gaussian filter and the DCT-IF chroma filter as the filter of the type based on the comparison of the at least one of the width of the coding sub-unit or the height of the coding sub-unit with the threshold. As another example, when the sequence number corresponding to the target prediction mode is within a range from 3 to 17, a range from 19 to 33, or a range from −13 to 1, in response to the width of the coding sub-unit is larger than the height of the coding sub-unit, the processing device 112 may designate the DCT-IF chroma filter as the filter of the type; in response to the width of the coding sub-unit is less than the height of the coding sub-unit, the processing device 112 may designate the Gaussian filter as the filter of the type. As a further example, when the sequence number corresponding to the target prediction mode is within a range from 35 to 49, a range from 51 to 65, or a range from 67 to 81, in response to the width of the coding sub-unit is larger than the height of the coding sub-unit, the processing device 112 may designate the Gaussian filter as the filter of the type; in response to the width of the coding sub-unit is less than the height of the coding sub-unit, the processing device 112 may designate the DCT-IF chroma filter as the filter of the type.

In some embodiments, the processing device 112 may designate one of the [1 2 1] filter, the Gaussian filter, and the DCT-IF chroma filter as the filter of the type based on the target prediction mode and the size parameter of the coding unit. For example, when the size parameter of the coding unit is equal to 2, in response to the target prediction mode is within the third group, the processing device 112 may designate the DCT-IF chroma filter as the filter of the type; in response to the target prediction mode is within the fourth group, the processing device 112 may designate the Gaussian filter as the filter of the type.

As another example, when the size parameter of the coding unit is equal to 3, in response to the target prediction mode is within the second group, the processing device 112 may designate the [1 2 1] filter as the filter of the type; in response to the target prediction mode is within the third group and the sequence number corresponding to the target prediction mode is 3, 33, 35, or 65, the processing device 112 may designate the Gaussian filter as the filter of the type; in response to the target prediction mode is within the third group and the sequence number corresponding to the target prediction mode is not 3, 33, 35, or 65, the processing device 112 may designate the DCT-IF chroma filter as the filter of the type; in response to the target prediction mode is within the fourth group, the processing device 112 may designate the Gaussian filter as the filter of the type.

As a further example, when the size parameter of the coding unit is equal to 4, in response to the target prediction mode is within the second group, the processing device 112 may designate the [1 2 1] filter as the filter of the type; in response to the target prediction mode is within the third group and the sequence number corresponding to the target prediction mode is within 21-33, 35-47, or 53-65, the processing device 112 may designate the Gaussian filter as the filter of the type; in response to the target prediction mode is within the third group and the sequence number corresponding to the target prediction mode is not within 21-33, 35-47, or 53-65, the processing device 112 may designate the DCT-IF chroma filter as the filter of the type; in response to the target prediction mode is within the fourth group, the processing device 112 may designate the Gaussian filter as the filter of the type.

As a still further example, when the size parameter of the coding unit is equal to 5 or 6, in response to the target prediction mode is within the second group, the processing device 112 may designate the [1 2 1] filter as the filter of the type; in response to the target prediction mode is within the third group or the fourth group, the processing device 112 may designate the Gaussian filter as the filter of the type.

In 1930, the processing device 112 (e.g., the prediction module 460) (e.g., the processing circuits of the processor 220) may determine the predicted coding sub-unit corresponding to each of the at least one coding sub-unit based on the target prediction mode and the filtered reference pixels.

In 1940, in response to determining that the filtering condition is not satisfied, the processing device 112 (e.g., the prediction module 460) (e.g., the processing circuits of the processor 220) may determine the predicted coding sub-unit corresponding to each of the at least one coding sub-unit based on the target prediction mode and the plurality of reference pixels of at least one of the one or more reference lines of the at least one coding sub-unit.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or comlocation of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PUP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:
1. A system, comprising:
   at least one non-transitory storage medium including a set of instructions; and
   at least one processor in communication with the at least one non-transitory storage medium, wherein when executing the set of instructions, the at least one processor is directed to cause the system to:

extract a coding unit from an image;

divide the coding unit into a plurality of coding sub-units;

for at least one coding sub-unit of the plurality of coding sub-units, construct multiple reference lines of the at least one coding sub-unit based on multiple reference lines of the coding unit, for each of the multiple reference lines of each coding sub-unit, at least a portion of a plurality of reference pixels in the reference line of the coding sub-unit being obtained by selecting, based on a size of the coding sub-unit, a certain number of reference pixels distributed along a reference line of the coding unit corresponding to the reference line of the coding sub-unit;

determine whether a filtering condition is satisfied, the filtering condition being related to a target prediction mode and a size parameter of the coding unit, the size parameter of the coding unit being obtained according to formula below:

$$S=(\log_2 W + \log_2 H) >> 1$$

where S refers to the size parameter of the coding unit, W refers to a width of the coding unit, H refers to a height of the coding unit, and >> refers to a right shift operator and indicates a value of ($\log_2$ W+$\log_2$ H) be shifted right 1, wherein the size parameter is equal to 2, 3, 4, 5, or 6;

in response to determining that the filtering condition is satisfied, designate one of a [1 2 1] filter, a Gaussian filter, and a discrete cosine transform-based interpolation filter (DCT-IF) chroma filter as a filter of a type of a filtering operation based on the target prediction mode and the size parameter of the coding unit by:

when the size parameter of the coding unit is equal to 2, in response to a sequence number corresponding to the target prediction mode is within a range from 3 to 17, a range from 19 to 33, a range from 35 to 49, or a range from 51 to 65, designating the DCT-IF chroma filter as the filter of the type; and in response to the sequence number corresponding to the target prediction mode is within a range from −13 to 1 or a range from 67 to 81, designating the Gaussian filter as the filter of the type; and perform, using the filter, the filtering operation on a plurality of reference pixels of each of one or more reference lines of the one of the at least one coding sub-unit to obtain filtered reference pixels; and determine, based on the target prediction mode and the filtered reference pixels, a predicted coding sub-unit corresponding to the one of the at least one coding sub-unit; and predict pixel values in the coding unit based at least in part on the predicted coding sub-unit to obtain a predicted coding unit corresponding to the coding unit.

2. The system of claim 1, wherein to determine the filter of the type, the at least one processor is directed to cause the system to:

determine the filter of the type according to at least one of the target prediction mode, a width of the one of the at least one coding sub-unit, or a height of the one of the at least one coding sub-unit.

3. The system of claim 2, wherein to determine the filter of the type according to the at least one of the target prediction mode, the width of the one of the at least one coding sub-unit, or the height of the one of the at least one coding sub-unit, the at least one processor is directed to cause the system to:

in response to the target prediction mode is a planar prediction mode or a diagonal prediction mode, determine the [1 2 1] filter as the filter of the type.

4. The system of claim 2, wherein to determine the filter of the type according to the at least one of the target prediction mode, the width of the one of the at least one coding sub-unit, or the height of the one of the at least one coding sub-unit, the at least one processor is directed to cause the system to:

determine whether the width or height of the one of the at least one coding sub-unit is less than or equal to a threshold; and designate, based at least in part on a determination result of whether the width or height of the one of the at least one coding sub-unit is less than or equal to the threshold, one of the Gaussian filter and the DCT-IF chroma filter as the filter of the type.

5. The system of claim 2, wherein to determine the filter of the type according to the at least one of the target prediction mode, the width of the one of the at least one coding sub-unit, or the height of the one of the at least one coding sub-unit, the at least one processor is directed to cause the system to:

determine whether the width of the one of the at least one coding sub-unit is larger than the height of the one of the at least one coding sub-unit; and designate, based at least in part on a determination result of whether the width of the one of the at least one coding sub-unit is larger than the height of the one of the at least one coding sub-unit, one of the Gaussian filter and the DCT-IF chroma filter as the filter of the type.

6. The system of claim 1, wherein the sequence number corresponding to the target prediction mode is within a range from −13 to 81, and, to determine whether the filtering condition is satisfied, the at least one processor is directed to cause the system to:

when the size parameter of the coding unit is equal to 2 and the sequence number corresponding to the target prediction mode is not 2, 18, 34, 50, and 66, determine that the filtering condition is satisfied; or when the size parameter of the coding unit is equal to 3, 4, 5, or 6 and the sequence number corresponding to the target prediction mode is not 18 and 50, determine that the filtering condition is satisfied.

7. The system of claim 4, wherein the at least one processor is directed to cause the system to:

when the sequence number corresponding to the target prediction mode is within a range from 3 to 17, a range from 19 to 33, or a range from −13 to 1, in response to the height of the coding sub-unit being less than or equal to the threshold, designate the DCT-IF chroma filter as the filter of the type; and in response to the height of the coding sub-unit being larger than the threshold, designate the Gaussian filter as the filter of the type.

8. The system of claim 7, wherein the at least one processor is directed to cause the system to:
when the sequence number corresponding to the target prediction mode is within a range from 35 to 49, a range from 51 to 65, or a range from 67 to 81,
in response to the width of the coding sub-unit being less than or equal to the threshold, designate the DCT-IF chroma filter as the filter of the type; and
in response to the height of the coding sub-unit being larger than the threshold, designate the Gaussian filter as the filter of the type.

9. The system of claim 5, wherein the at least one processor is directed to cause the system to:
in response to the width of the coding sub-unit being equal to the height of the coding sub-unit, designate one of the Gaussian filter and the DCT-IF chroma filter as the filter of the type based on a determination result of whether the width or height of the coding sub-unit is less than or equal to a threshold.

10. The system of claim 5, wherein the at least one processor is directed to cause the system to:
when the sequence number corresponding to the target prediction mode is within a range from 3 to 17, a range from 19 to 33, or a range from −13 to 1,
in response to the width of the coding sub-unit being larger than the height of the coding sub-unit, designate the DCT-IF chroma filter as the filter of the type; and
in response to the width of the coding sub-unit being less than the height of the coding sub-unit, designate the Gaussian filter as the filter of the type.

11. The system of claim 10, wherein the at least one processor is directed to cause the system to:
when the sequence number corresponding to the target prediction mode is within a range from 35 to 49, a range from 51 to 65, or a range from 67 to 81,
in response to the width of the coding sub-unit being larger than the height of the coding sub-unit, designate the Gaussian filter as the filter of the type; and
in response to the width of the coding sub-unit being less than the height of the coding sub-unit, designate the DCT-IF chroma filter as the filter of the type.

12. The system of claim 1, wherein to designate the one of the [1 2 1] filter, the Gaussian filter, and the DCT-IF chroma filter as the filter of the type of the filtering operation, the at least one processor is directed to cause the system to:
when the size parameter of the coding unit is equal to 3,
in response to the sequence number corresponding to the target prediction mode is 2, 34, or 66, designate the [1 2 1] filter as the filter of the type;
in response to the sequence number corresponding to the target prediction mode is 3, 33, 35, or 65, designate the Gaussian filter as the filter of the type;
in response to the sequence number corresponding to the target prediction mode is within a range from 3 to 17, a range from 19 to 33, a range from 35 to 49, and a range from 51 to 65 and not 3, 33, 35, or 65, designate the DCT-IF chroma filter as the filter of the type; and
in response to the sequence number corresponding to the target prediction mode is within a range from −13 to 1 or a range from 67 to 81, designate the Gaussian filter as the filter of the type.

13. The system of claim 1, wherein to designate the one of the [1 2 1] filter, the Gaussian filter, and the DCT-IF chroma filter as the filter of the type of the filtering operation, the at least one processor is directed to cause the system to:
when the size parameter of the coding unit is equal to 4,
in response to the sequence number corresponding to the target prediction mode is 2, 34, or 66, designate the [1 2 1] filter as the filter of the type;
in response to the sequence number corresponding to the target prediction mode is within 21-33, 35-47, or 53-65, designate the Gaussian filter as the filter of the type;
in response to the sequence number corresponding to the target prediction mode is not within 21-33, 35-47, or 53-65, designate the DCT-IF chroma filter as the filter of the type; and
in response to the sequence number corresponding to the target prediction mode is within a range from −13 to 1 or a range from 67 to 81, designate the Gaussian filter as the filter of the type.

14. The system of claim 1, wherein to designate the one of the [1 2 1] filter, the Gaussian filter, and the DCT-IF chroma filter as the filter of the type of the filtering operation, the at least one processor is directed to cause the system to:
when the size parameter of the coding unit is equal to 5 or 6,
in response to the sequence number corresponding to the target prediction mode is 2, 34, or 66, designate the [1 2 1] filter as the filter of the type; and
in response to the sequence number corresponding to the target prediction mode is a range from 3 to 17, a range from 19 to 33, a range from 35 to 49, a range from 51 to 65, a range from −13 to 1, or a range from 67 to 81, designate the Gaussian filter as the filter of the type.

15. A method implemented on a computing device including at least one processor, at least one non-transitory storage medium, and a communication platform connected to a network, the method comprising:
extracting a coding unit from an image;
dividing the coding unit into a plurality of coding sub-units;
for at least one coding sub-unit of the plurality of coding sub-units, constructing multiple reference lines of the at least one coding sub-unit based on multiple reference lines of the coding unit, for each of the multiple reference lines of each coding sub-unit, at least a portion of a plurality of reference pixels in the reference line of the coding sub-unit being obtained by selecting, based on a size of the coding sub-unit, a certain number of reference pixels distributed along a reference line of the coding unit corresponding to the reference line of the coding sub-unit;
determining whether a filtering condition is satisfied, the filtering condition being related to a target prediction mode and a size parameter of the coding unit, the size parameter of the coding unit being obtained according to formula below:

$$S=(\log_2 W+\log_2 H)>>1$$

where S refers to the size parameter of the coding unit, W refers to a width of the coding unit, H refers to a height of the coding unit, and >> refers to a right shift operator and indicates a value of ($\log_2 W+\log_2 H$) be shifted right 1, wherein the size parameter is equal to 2, 3, 4, 5, or 6;

in response to determining that the filtering condition is satisfied,
designating one of a [1 2 1] filter, a Gaussian filter, and a discrete cosine transform-based interpolation filter (DCT-IF) chroma filter as a filter of a type of a filtering operation based on the target prediction mode and the size parameter of the coding unit by:
when the size parameter of the coding unit is equal to 2,
in response to a sequence number corresponding to the target prediction mode is within a range from 3 to 17, a range from 19 to 33, a range from 35 to 49, or a range from 51 to 65, designating the DCT-IF chroma filter as the filter of the type; and
in response to the sequence number corresponding to the target prediction mode is within a range from −13 to 1 or a range from 67 to 81, designating the Gaussian filter as the filter of the type,
when the size parameter of the coding unit is equal to 3,
in response to the sequence number corresponding to the target prediction mode is 2, 34, or 66, designating the [1 2 1] filter as the filter of the type;
in response to the sequence number corresponding to the target prediction mode is 3, 33, 35, or 65, designating the Gaussian filter as the filter of the type;
in response to the sequence number corresponding to the target prediction mode is within a range from 3 to 17, a range from 19 to 33, a range from 35 to 49, and a range from 51 to 65 and not 3, 33, 35, or 65, designating the DCT-IF chroma filter as the filter of the type; and
in response to the sequence number corresponding to the target prediction mode is within a range from −13 to 1 or a range from 67 to 81, designating the Gaussian filter as the filter of the type,
when the size parameter of the coding unit is equal to 4,
in response to the sequence number corresponding to the target prediction mode is 2, 34, or 66, designating the [1 2 1] filter as the filter of the type;
in response to the sequence number corresponding to the target prediction mode is within 21-33, 35-47, or 53-65, designating the Gaussian filter as the filter of the type;
in response to the sequence number corresponding to the target prediction mode is not within 21-33, 35-47, or 53-65, designating the DCT-IF chroma filter as the filter of the type; and
in response to the sequence number corresponding to the target prediction mode is within a range from −13 to 1 or a range from 67 to 81, designating the Gaussian filter as the filter of the type, and
when the size parameter of the coding unit is equal to 5 or 6,
in response to the sequence number corresponding to the target prediction mode is 2, 34, or 66, designating the [1 2 1] filter as the filter of the type;

in response to the sequence number corresponding to the target prediction mode is a range from 3 to 17, a range from 19 to 33, a range from 35 to 49, a range from 51 to 65, a range from −13 to 1, or a range from 67 to 81, designating the Gaussian filter as the filter of the type; and
performing, using the filter, the filtering operation on a plurality of reference pixels of each of one or more reference lines of the one of the at least one coding sub-unit to obtain filtered reference pixels; and
determining, based on the target prediction mode and the filtered reference pixels, a predicted coding sub-unit corresponding to the one of the at least one coding sub-unit; and
predicting pixel values in the coding unit based at least in part on the predicted coding sub-unit to obtain a predicted coding unit corresponding to the coding unit.

16. A non-transitory computer readable medium, comprising executable instructions that, when executed by at least one processor, direct the at least one processor to perform a method, the method comprising:
extracting a coding unit from an image;
dividing the coding unit into a plurality of coding sub-units;
for at least one coding sub-unit of the plurality of coding sub-units, constructing multiple reference lines of the at least one coding sub-unit based on multiple reference lines of the coding unit, for each of the multiple reference lines of each coding sub-unit, at least a portion of a plurality of reference pixels in the reference line of the coding sub-unit being obtained by selecting, based on a size of the coding sub-unit, a certain number of reference pixels distributed along a reference line of the coding unit corresponding to the reference line of the coding sub-unit;
determining whether a filtering condition is satisfied, the filtering condition being related to a target prediction mode and a size parameter of the coding unit, the size parameter of the coding unit being obtained according to formula below:

$$S=(\log_2 W+\log_2 H)>>1$$

where S refers to the size parameter of the coding unit, W refers to a width of the coding unit, H refers to a height of the coding unit, and >> refers to a right shift operator and indicates a value of (log, W+log, H) be shifted right 1, wherein the size parameter is equal to 2, 3, 4, 5, or 6;
in response to determining that the filtering condition is satisfied,
designating one of a [1 2 1] filter, a Gaussian filter, and a discrete cosine transform-based interpolation filter (DCT-IF) chroma filter as a filter of a type of a filtering operation based on the target prediction mode and the size parameter of the coding unit by:
when the size parameter of the coding unit is equal to 2,
in response to a sequence number corresponding to the target prediction mode is within a range from 3 to 17, a range from 19 to 33, a range from 35 to 49, or a range from 51 to 65, designating the DCT-IF chroma filter as the filter of the type; and in response to the sequence number corresponding to the target prediction mode is within a range from −13 to 1 or a range from 67 to 81, designating the Gaussian filter as the filter of the type; and performing, using the filter, the filtering operation on a plurality of reference pixels of each of one or more reference lines of the one of the at least one coding sub-unit to obtain filtered reference pixels; and determining, based on the target prediction mode and the filtered reference pixels, a predicted coding sub-unit corresponding to the one of the at least one coding sub-unit; and predicting pixel values in the coding unit based at least in part on the predicted coding sub-unit to obtain a predicted coding unit corresponding to the coding unit.

* * * * *